(12) United States Patent
Unger et al.

(10) Patent No.: US 10,936,538 B1
(45) Date of Patent: Mar. 2, 2021

(54) FAIR SAMPLING OF ALTERNATE DATA STREAM METRICS FOR FILE SYSTEMS

(71) Applicant: Qumulo, Inc., Seattle, WA (US)

(72) Inventors: Thomas R. Unger, Seattle, WA (US); Michael Patrick Kirby, Lynnwood, WA (US); Thomas Scott Urban, Seattle, WA (US); Michael R. Fitz, Seattle, WA (US); Boyu Zhang, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 16/883,922

(22) Filed: May 26, 2020

Related U.S. Application Data

(60) Provisional application No. 63/002,196, filed on Mar. 30, 2020.

(51) Int. Cl.
    *G06F 11/14* (2006.01)
    *G06F 16/11* (2019.01)
    *G06F 16/182* (2019.01)

(52) U.S. Cl.
    CPC .......... *G06F 16/11* (2019.01); *G06F 16/182* (2019.01)

(58) Field of Classification Search
    None
    See application file for complete search history.

(56) References Cited

U.S. PATENT DOCUMENTS

| | | |
|---|---|---|
| 5,165,031 A | 11/1992 | Pruul et al. |
| 5,319,773 A | 6/1994 | Britton et al. |
| 5,410,684 A | 4/1995 | Ainsworth et al. |
| 5,410,719 A | 4/1995 | Shackleford |
| 5,442,561 A | 8/1995 | Yoshizawa et al. |

(Continued)

FOREIGN PATENT DOCUMENTS

| | | |
|---|---|---|
| EP | 1217551 A2 | 6/2002 |
| EP | 1498829 A1 | 1/2005 |

(Continued)

OTHER PUBLICATIONS

Office Communication for U.S. Appl. No. 16/226,587 dated Aug. 5, 2019, pp. 1-54.

(Continued)

*Primary Examiner* — Thu N Nguyen
(74) *Attorney, Agent, or Firm* — John W. Branch; Branch Partners PLLC

(57) ABSTRACT

Embodiments are directed to managing data in a file system. A query may be provided to determine characteristics associated with a file system and a sampling model. The sampling model may be employed to determine objects in the file system based on a traversal of the file system. The sampling model may be employed to determine metrics associated with the alternate data streams (ADSs) included in the objects such that each of the objects that includes a separate main data stream and the ADSs may be associated with data blocks and the ADSs may each be associated with other data blocks. The sampling model and the query may be employed to sample the objects to provide partial results such that the sampling may be distributed between the objects based on the sampling model and the metrics. A result to the query may be provided based on the partial results.

16 Claims, 30 Drawing Sheets

(56) References Cited

U.S. PATENT DOCUMENTS

| | | | |
|---|---|---|---|
| 5,953,719 A | 9/1999 | Kleewein et al. |
| 6,236,996 B1 | 5/2001 | Bapat et al. |
| 6,385,641 B1 | 5/2002 | Jiang et al. |
| 6,415,283 B1 | 7/2002 | Conklin |
| 6,496,944 B1 | 12/2002 | Hsiao et al. |
| 6,529,998 B1 | 3/2003 | Yochai et al. |
| 6,772,435 B1 | 8/2004 | Thexton et al. |
| 6,874,130 B1 | 3/2005 | Baweja et al. |
| 6,892,211 B2 | 5/2005 | Hitz et al. |
| 6,965,903 B1 | 11/2005 | Agarwal et al. |
| 6,965,936 B1 | 11/2005 | Wipfel et al. |
| 7,213,040 B1 | 5/2007 | Stokes et al. |
| 7,594,138 B2 | 9/2009 | Abdulvahid |
| 7,636,743 B2 | 12/2009 | Erofeev |
| 7,693,876 B2 | 4/2010 | Hackworth et al. |
| 7,757,056 B1 | 7/2010 | Fair |
| 7,844,580 B2 | 11/2010 | Srivastava et al. |
| 7,933,870 B1 | 4/2011 | Webster |
| 7,937,421 B2 | 5/2011 | Mikesell et al. |
| 7,962,709 B2 | 6/2011 | Agrawal |
| 7,966,293 B1 | 6/2011 | Owara et al. |
| 8,027,827 B2 | 9/2011 | Bitar et al. |
| 8,046,378 B1 | 10/2011 | Zhuge et al. |
| 8,108,429 B2 | 1/2012 | Sim-Tang et al. |
| 8,296,312 B1 | 10/2012 | Leung et al. |
| 8,364,648 B1 | 1/2013 | Sim-Tang |
| 8,423,733 B1 | 4/2013 | Ozdemir |
| 8,448,170 B2 | 5/2013 | Wipfel et al. |
| 8,463,825 B1 | 6/2013 | Harty et al. |
| 8,489,656 B2 | 7/2013 | Erofeev |
| 8,504,733 B1 | 8/2013 | Iyer et al. |
| 8,515,911 B1 | 8/2013 | Zhou et al. |
| 8,612,404 B2 | 12/2013 | Bone et al. |
| 8,612,488 B1 | 12/2013 | Subramanya et al. |
| 8,645,323 B2 | 2/2014 | Jackiewicz et al. |
| 8,661,447 B1 | 2/2014 | Olliff et al. |
| 8,776,050 B2 | 7/2014 | Plouffe et al. |
| 8,782,655 B2 | 7/2014 | Blanding et al. |
| 8,806,154 B1 | 8/2014 | Gupta et al. |
| 8,838,887 B1 | 9/2014 | Burke et al. |
| 8,838,931 B1 | 9/2014 | Marshak et al. |
| 8,849,764 B1 | 9/2014 | Long et al. |
| 8,868,797 B1 | 10/2014 | Kirac et al. |
| 8,924,364 B1 | 12/2014 | Zhong et al. |
| 8,972,694 B1 | 3/2015 | Dolan et al. |
| 9,015,214 B2 | 4/2015 | Nishida et al. |
| 9,026,765 B1 | 5/2015 | Marshak et al. |
| 9,047,017 B1 | 6/2015 | Dolan et al. |
| 9,141,633 B1 * | 9/2015 | Li | G06F 16/1752 |
| 9,143,379 B1 | 9/2015 | Berger et al. |
| 9,158,653 B2 | 10/2015 | Gold |
| 9,171,145 B2 | 10/2015 | Dash et al. |
| 9,244,975 B2 | 1/2016 | Das et al. |
| 9,244,976 B1 | 1/2016 | Zhang et al. |
| 9,384,252 B2 | 7/2016 | Akirav et al. |
| 9,501,487 B1 | 11/2016 | Yuan et al. |
| 9,547,560 B1 | 1/2017 | Lee |
| 9,600,193 B2 | 3/2017 | Ahrens et al. |
| 9,747,171 B2 | 8/2017 | Beeken et al. |
| 9,753,782 B2 | 9/2017 | Fang et al. |
| 9,753,932 B1 | 9/2017 | Brow et al. |
| 9,785,377 B2 | 10/2017 | Shin et al. |
| 10,140,185 B1 | 11/2018 | Lopez et al. |
| 10,261,668 B2 | 4/2019 | Brown et al. |
| 10,275,493 B1 * | 4/2019 | Mostak | G06F 16/24569 |
| 10,303,561 B2 | 5/2019 | Beeken et al. |
| 10,318,401 B2 | 6/2019 | Rothschilds et al. |
| 10,437,509 B1 | 10/2019 | Alexeev et al. |
| 2001/0039622 A1 | 11/2001 | Hitz et al. |
| 2002/0083073 A1 | 6/2002 | Vaidya et al. |
| 2002/0099691 A1 | 7/2002 | Lore et al. |
| 2002/0178271 A1 | 11/2002 | Graham et al. |
| 2003/0033308 A1 | 2/2003 | Patel et al. |
| 2003/0145009 A1 | 7/2003 | Forman et al. |
| 2003/0177379 A1 | 9/2003 | Hori et al. |
| 2003/0182313 A1 | 9/2003 | Federwisch et al. |
| 2004/0153479 A1 | 8/2004 | Mikesell et al. |
| 2004/0255048 A1 | 12/2004 | Lev Ran et al. |
| 2005/0015674 A1 | 1/2005 | Haugh |
| 2005/0027748 A1 | 2/2005 | Kisley |
| 2005/0091663 A1 | 4/2005 | Bagsby |
| 2005/0114726 A1 | 5/2005 | Ouchi |
| 2005/0119996 A1 | 6/2005 | Ohata et al. |
| 2005/0154866 A1 | 7/2005 | Steely, Jr. et al. |
| 2005/0195660 A1 | 9/2005 | Kavuri et al. |
| 2005/0223019 A1 | 10/2005 | Das et al. |
| 2006/0004890 A1 | 1/2006 | Semple et al. |
| 2006/0053139 A1 | 3/2006 | Marzinski et al. |
| 2006/0089982 A1 | 4/2006 | Abbott et al. |
| 2006/0123005 A1 | 6/2006 | Burnett et al. |
| 2006/0173842 A1 | 8/2006 | Horvitz et al. |
| 2006/0271604 A1 | 11/2006 | Shoens |
| 2007/0011302 A1 | 1/2007 | Groner et al. |
| 2007/0027985 A1 | 2/2007 | Ramany et al. |
| 2007/0100855 A1 | 5/2007 | Kohl |
| 2007/0118561 A1 | 5/2007 | Idicula et al. |
| 2008/0028006 A1 | 1/2008 | Liu et al. |
| 2008/0059399 A1 | 3/2008 | DeLorme et al. |
| 2008/0059541 A1 | 3/2008 | Fachan et al. |
| 2008/0082593 A1 | 4/2008 | Komarov et al. |
| 2008/0172366 A1 | 7/2008 | Hannel et al. |
| 2008/0228772 A1 | 9/2008 | Plamondon |
| 2008/0250357 A1 | 10/2008 | Lee et al. |
| 2008/0256474 A1 | 10/2008 | Chakra et al. |
| 2008/0270469 A1 | 10/2008 | Myerson et al. |
| 2008/0270928 A1 | 10/2008 | Chakra et al. |
| 2008/0282244 A1 | 11/2008 | Wu et al. |
| 2008/0288306 A1 | 11/2008 | MacIntyre et al. |
| 2008/0301256 A1 | 12/2008 | McWilliams et al. |
| 2008/0313217 A1 | 12/2008 | Dunsmore et al. |
| 2009/0077087 A1 | 3/2009 | Urano et al. |
| 2009/0138500 A1 | 5/2009 | Yuan et al. |
| 2009/0199190 A1 | 8/2009 | Chen et al. |
| 2009/0222509 A1 | 9/2009 | King et al. |
| 2009/0274047 A1 | 11/2009 | Kruys et al. |
| 2009/0319566 A1 | 12/2009 | Wald et al. |
| 2010/0036895 A1 | 2/2010 | Boyd et al. |
| 2010/0088317 A1 | 4/2010 | Bone et al. |
| 2010/0161557 A1 | 6/2010 | Anderson et al. |
| 2010/0179959 A1 | 7/2010 | Shoens |
| 2010/0217948 A1 | 8/2010 | Mason et al. |
| 2010/0241668 A1 | 9/2010 | Susanto et al. |
| 2010/0281214 A1 | 11/2010 | Jernigan, IV |
| 2010/0287512 A1 | 11/2010 | Gan et al. |
| 2011/0039622 A1 | 2/2011 | Levenson |
| 2011/0066668 A1 | 3/2011 | Guarraci |
| 2011/0125799 A1 | 5/2011 | Kandasamy et al. |
| 2011/0125973 A1 | 5/2011 | Lev et al. |
| 2011/0161381 A1 | 6/2011 | Wang et al. |
| 2011/0196833 A1 | 8/2011 | Drobychev et al. |
| 2011/0196899 A1 | 8/2011 | Hughes et al. |
| 2011/0202925 A1 | 8/2011 | Banerjee et al. |
| 2011/0246724 A1 | 10/2011 | Marathe et al. |
| 2012/0036463 A1 | 2/2012 | Krakovsky et al. |
| 2012/0066179 A1 | 3/2012 | Saika |
| 2012/0096059 A1 | 4/2012 | Shimizu et al. |
| 2012/0136843 A1 | 5/2012 | Bone et al. |
| 2012/0151438 A1 | 6/2012 | Bach et al. |
| 2012/0166478 A1 | 6/2012 | Das et al. |
| 2012/0204060 A1 | 8/2012 | Swift et al. |
| 2012/0317079 A1 | 12/2012 | Shoens et al. |
| 2013/0019072 A1 | 1/2013 | Strasser et al. |
| 2013/0073819 A1 | 3/2013 | Havewala et al. |
| 2013/0091168 A1 | 4/2013 | Bhave et al. |
| 2013/0110787 A1 | 5/2013 | Garimella et al. |
| 2013/0191355 A1 | 7/2013 | Bone et al. |
| 2013/0227236 A1 | 8/2013 | Flynn et al. |
| 2013/0311454 A1 | 11/2013 | Ezzat |
| 2013/0318194 A1 | 11/2013 | Timbs |
| 2013/0339406 A1 | 12/2013 | Kanfi |
| 2014/0006354 A1 | 1/2014 | Parkinson et al. |
| 2014/0040199 A1 | 2/2014 | Golab et al. |
| 2014/0040693 A1 | 2/2014 | Kim et al. |
| 2014/0095249 A1 | 4/2014 | Tarakad et al. |

(56) References Cited

U.S. PATENT DOCUMENTS

| | | |
|---|---|---|
| 2014/0101389 A1 | 4/2014 | Nellans et al. |
| 2014/0156956 A1 | 6/2014 | Ezra |
| 2014/0181441 A1 | 6/2014 | Kottomtharayil et al. |
| 2014/0258609 A1 | 9/2014 | Cui et al. |
| 2014/0280485 A1 | 9/2014 | Hummaida et al. |
| 2014/0281307 A1 | 9/2014 | Peterson et al. |
| 2014/0281411 A1 | 9/2014 | Abdallah |
| 2014/0344222 A1 | 11/2014 | Morris et al. |
| 2014/0372384 A1 | 12/2014 | Long et al. |
| 2014/0372607 A1 | 12/2014 | Gladwin et al. |
| 2014/0373032 A1 | 12/2014 | Merry et al. |
| 2015/0067086 A1 | 3/2015 | Adriaens et al. |
| 2015/0067142 A1 | 3/2015 | Renkema |
| 2015/0106145 A1 | 4/2015 | Hamilton et al. |
| 2015/0135331 A1 | 5/2015 | Das |
| 2015/0193347 A1 | 7/2015 | Kluesing et al. |
| 2015/0215405 A1 | 7/2015 | Baek et al. |
| 2015/0234879 A1 | 8/2015 | Baldwin et al. |
| 2015/0242263 A1 | 8/2015 | Klose |
| 2015/0278282 A1 | 10/2015 | Sardina et al. |
| 2016/0034356 A1 | 2/2016 | Aron et al. |
| 2016/0139836 A1 | 5/2016 | Nallathambi et al. |
| 2016/0224430 A1 | 8/2016 | Long et al. |
| 2016/0246816 A1 | 8/2016 | Abiri et al. |
| 2016/0306810 A1 | 10/2016 | Ni et al. |
| 2016/0314046 A1 | 10/2016 | Kumarasamy |
| 2016/0335278 A1 | 11/2016 | Tabaaloute et al. |
| 2016/0357677 A1 | 12/2016 | Hooker et al. |
| 2016/0359859 A1 | 12/2016 | Capone |
| 2016/0371297 A1 | 12/2016 | Okun et al. |
| 2016/0380878 A1 | 12/2016 | Bugenhagen et al. |
| 2017/0046143 A1 | 2/2017 | Kochhar et al. |
| 2017/0091046 A1 | 3/2017 | Bangalore et al. |
| 2017/0123883 A1 | 5/2017 | Hall |
| 2017/0163728 A1 | 6/2017 | Chawla et al. |
| 2017/0201582 A1 | 7/2017 | Zhang et al. |
| 2017/0206231 A1 | 7/2017 | Binder et al. |
| 2017/0286455 A1 | 10/2017 | Li et al. |
| 2017/0316321 A1 | 11/2017 | Whitney et al. |
| 2017/0344598 A1 | 11/2017 | Constantinescu et al. |
| 2017/0344905 A1 | 11/2017 | Hack et al. |
| 2018/0040029 A1 | 2/2018 | Zeng et al. |
| 2018/0288057 A1 | 10/2018 | Varadamma et al. |
| 2018/0314423 A1 | 11/2018 | Gong et al. |
| 2019/0095112 A1 | 3/2019 | Lingarajappa |
| 2019/0102700 A1 | 4/2019 | Babu et al. |
| 2019/0163591 A1 | 5/2019 | Ouyang et al. |
| 2020/0004977 A1 | 1/2020 | Araujo et al. |

FOREIGN PATENT DOCUMENTS

| | | | |
|---|---|---|---|
| WO | 1999044145 | A1 | 9/1999 |
| WO | 0072201 | A1 | 11/2000 |
| WO | 2009007250 | A2 | 1/2009 |

OTHER PUBLICATIONS

Office Communication for U.S. Appl. No. 16/228,716 dated Jun. 24, 2019, pp. 1-28.
Office Communication for U.S. Appl. No. 16/231,354 dated Jul. 10, 2019, pp. 1-16.
Office Communication for U.S. Appl. No. 16/262,756 dated Aug. 5, 2019, pp. 1-48.
Office Communication for U.S. Appl. No. 15/967,499 dated Jun. 27, 2018, pp. 1-25.
Office Communication for U.S. Appl. No. 16/226,587 dated Feb. 25, 2019, pp. 1-65.
Office Communication for U.S. Appl. No. 16/228,716 dated Feb. 28, 2019, pp. 1-28.
Office Communication for U.S. Appl. No. 16/231,354 dated Mar. 25, 2019, pp. 1-19.
Office Communication for U.S. Appl. No. 16/262,756 dated Apr. 2, 2019, pp. 1-40.
Office Communication for U.S. Appl. No. 16/262,790 dated Aug. 23, 2019, pp. 1-20.
Office Communication for U.S. Appl. No. 16/262,790 dated Apr. 18, 2019, pp. 1-24.
Office Communication for U.S. Appl. No. 16/262,756 dated Oct. 25, 2019, pp. 1-6.
Office Communication for U.S. Appl. No. 16/659,488 dated Dec. 30, 2019, pp. 1-35.
Office Communication for U.S. Appl. No. 14/595,598 dated Dec. 31, 2019, pp. 1-23.
Office Communication for U.S. Appl. No. 16/004,208 dated Aug. 27, 2018, pp. 1-11.
Office Communication for U.S. Appl. No. 16/234,395 dated Aug. 8, 2019, pp. 1-28.
Office Communication for U.S. Appl. No. 16/234,334 dated Apr. 5, 2019, pp. 1-24.
Office Communication for U.S. Appl. No. 16/234,395 dated Mar. 28, 2019, pp. 1-36.
Kappes et al. "Dike: Virtualization-aware Access Control for Multitenant Filesysterns", Feb. 18, 2013, pp. 1-6.
Hitz et al. "Merging NT and UNIX filesystem Permissions", Proceedings of the 2nd USENIX Windows NT Symposium, Seattle, Washington, Aug. 3-4, 1998, pp. 1-10.
Office Communication for U.S. Appl. No. 16/234,334 dated Oct. 11, 2019, pp. 1-22.
Office Communication for U.S. Appl. No. 15/473,051 dated Jun. 30, 2017, pp. 1-22.
Extended European Search Report for European Patent Application No. 18155779.4 dated Apr. 17, 2018, pp. 1-15.
Office Communication for U.S. Appl. No. 16/004,182 dated Aug. 23, 2018, pp. 1-46.
Office Communication for U.S. Appl. No. 16/004,182 dated Mar. 5, 2019, pp. 1-46.
Office Communication for U.S. Appl. No. 16/004,182 dated Jul. 3, 2019, pp. 1-50.
Office Communication for U.S. Appl. No. 15/694,604 dated Jun. 3, 2019, pp. 1-14.
Office Communication for U.S. Appl. No. 16/004,182 dated May 22, 2019, pp. 1-6.
Office Communication for U.S. Appl. No. 14/595,043 dated May 4, 2017, pp. 1-38.
Office Communication for U.S. Appl. No. 14/595,043 dated Feb. 23, 2018, pp. 1-22.
Office Communication for U.S. Appl. No. 14/595,043 dated May 25, 2018, pp. 1-14.
Office Communication for U.S. Appl. No. 14/595,043 dated Oct. 5, 2018, pp. 1-26.
Office Communication for U.S. Appl. No. 14/595,043 dated Jun. 7, 2019, pp. 1-29.
Office Communication for U.S. Appl. No. 14/595,043 dated Aug. 27, 2019, pp. 1-34.
Office Communication for U.S. Appl. No. 14/658,015 dated Apr. 27, 2017, pp. 1-8.
Office Communication for U.S. Appl. No. 14/658,015 dated Jan. 4, 2018, pp. 1-35.
Office Communication for U.S. Appl. No. 14/658,015 dated Jul. 13, 2018, pp. 1-18.
Office Communication for U.S. Appl. No. 14/859,061 dated Sep. 22, 2017, pp. 1-29.
Office Communication for U.S. Appl. No. 15/831,236 dated Mar. 30, 2018, pp. 1-8.
Office Communication for U.S. Appl. No. 15/831,236 dated Aug. 15, 2018, pp. 1-27.
Office Communication for U.S. Appl. No. 14/859,114 dated Jul. 24, 2017, pp. 1-165.
Office Communication for U.S. Appl. No. 14/859,114 dated Feb. 21, 2018, pp. 1-27.
Office Communication for U.S. Appl. No. 14/859,114 dated May 11, 2018, pp. 1-7.
Office Communication for U.S. Appl. No. 14/859,114 dated Jun. 27, 2018, pp. 1-40.
Office Communication for U.S. Appl. No. 14/859,114 dated Nov. 19, 2018, pp. 1-41.

(56) References Cited

OTHER PUBLICATIONS

Office Communication for U.S. Appl. No. 14/859,114 dated Jan. 31, 2019, pp. 1-5.
Office Communication for U.S. Appl. No. 14/859,114 dated Mar. 7, 2019, pp. 1-39.
Office Communication for U.S. Appl. No. 14/859,114 dated Jun. 26, 2019, pp. 1-66.
Office Communication for U.S. Appl. No. 14/859,114 dated Sep. 13, 2019, pp. 1-8.
Office Communication for U.S. Appl. No. 14/859,114 dated Nov. 26, 2019, pp. 1-43.
Office Communication for U.S. Appl. No. 15/288,853 dated Sep. 19, 2018, pp. 1-27.
Chimera, "Value Bars: An Information Visualization and Navigation Tool for Multi-attribute Listings", CHI '92, Monterey, CA, May 3-7, 1992, pp. 293-294.
Office Communication for U.S. Appl. No. 15/288,853 dated Mar. 25, 2019, pp. 1-25.
Cudre-Mauroux, et al., "TrajStore: An Adaptive Storage System for Very Large Trajectory Sets", ICDE 2010, Long Beach, CA, Mar. 1-6, 2010, pp. 109-120.
Office Communication for U.S. Appl. No. 16/436,825 dated Jul. 11, 2019, pp. 1-22.
Office Communication for U.S. Appl. No. 15/474,047 dated Sep. 18, 2017, pp. 1-24.
Office Communication for U.S. Appl. No. 15/474,047 dated Mar. 9, 2018, pp. 1-12.
Office Communication for U.S. Appl. No. 15/474,047 dated Jun. 11, 2018, pp. 1-7.
Office Communication for U.S. Appl. No. 15/474,047 dated Aug. 15, 2018, pp. 1-24.
Office Communication for U.S. Appl. No. 15/957,809 dated Jun. 28, 2018, pp. 1-42.
Office Communication for U.S. Appl. No. 15/957,809 dated Jan. 24, 2019, pp. 1-24.
Office Communication for U.S. Appl. No. 16/434,157 dated Jul. 25, 2019, pp. 1-16.
Office Communication for U.S. Appl. No. 15/854,447 dated May 6, 2019, pp. 1-31.
Office Communication for U.S. Appl. No. 16/505,562 dated Aug. 30, 2019, pp. 1-46.
Extended European Search Report for European Patent Application No. 17206518.7 dated Apr. 5, 2018, pp. 1-8.
Karatza et al. "Epoch load sharing in a network of workstations," Simulation Symposium, 2001. Proceedings. 34th Annual Apr. 22-26, 2001, Piscataway, NJ, USA, IEEE, Apr. 22, 2001 (Apr. 22, 2001), pp. 36-42, XP010541274, ISBN: 978-0-7695-1092-7.
Office Communication for U.S. Appl. No. 16/004,182 dated Jan. 7, 2020, pp. 1-54.
Office Communication for U.S. Appl. No. 16/125,573 dated Nov. 21, 2019, pp. 1-24.
Office Communication for U.S. Appl. No. 16/226,587 dated Oct. 24, 2019, pp. 1-6.
Office Communication for U.S. Appl. No. 16/262,790 dated Dec. 12, 2019, pp. 1-23.
Office Communication for U.S. Appl. No. 16/234,334 dated Jan. 16, 2020, pp. 1-8.
Office Communication for U.S. Appl. No. 15/694,604 dated Nov. 20, 2019, pp. 1-24.
Office Communication for U.S. Appl. No. 16/262,756 dated Jan. 28, 2020, pp. 1-27.
Office Communication for U.S. Appl. No. 16/434,157 dated Jan. 29, 2020, pp. 1-12.
Office Communication for U.S. Appl. No. 16/262,790 dated Feb. 6, 2020, pp. 1-8.
Office Communication for U.S. Appl. No. 14/859,114 dated Mar. 13, 2020, pp. 1-22.
Office Communication for U.S. Appl. No. 16/752,451 dated Mar. 12, 2020, pp. 1-14.
Office Communication for U.S. Appl. No. 16/775,041 dated Mar. 11, 2020, pp. 1-8.
Office Communication for U.S. Appl. No. 16/779,362 dated Mar. 26, 2020, pp. 1-10.
Wikipedia clustered file system page from date Jul. 9, 2019, retrieved using the WayBackMachine, From https://web.archive.org/web/20190709083400/https://en.wikipedia.org/wiki/Clustered_file_system (Year: 2019), pp. 1-6.
Wikipedia raft page from date Jul. 16, 2019, retrieved using the WayBackMachine, from https://web.archive.org/web/20190716115001/https://en.wikipedia.org/wiki/Raft (computer_science) (Year: 2019), pp. 1-4.
Office Communication for U.S. Appl. No. 16/004,182 dated Mar. 23, 2020, pp. 1-6.
Office Communication for U.S. Appl. No. 16/752,509 dated Apr. 2, 2020, pp. 1-42.
Office Communication for U.S. Appl. No. 16/152,277 dated Apr. 3, 2020, pp. 1-10.
Office Communication for U.S. Appl. No. 16/004,182 dated Apr. 28, 2020, pp. 1-52.
Office Communication for U.S. Appl. No. 16/152,259 dated Apr. 29, 2020, pp. 1-19.
Office Communication for U.S. Appl. No. 14/659,114 dated Jun. 5, 2020, pp. 1-6.
Office Communication for U.S. Appl. No. 16/262,756 dated Jun. 8, 2020, pp. 1-43.
Office Communication for U.S. Appl. No. 14/595,598 dated Jul. 9, 2020, pp. 1-26.
Office Communication for U.S. Appl. No. 16/752,451 dated Jul. 23, 2020, pp. 1-31.
Office Communication for U.S. Appl. No. 14/859,114 dated Jul. 23, 2020, pp. 1-28.
Office Communication for U.S. Appl. No. 16/152,615 dated Aug. 6, 2020, pp. 1-18.
Office Communication for U.S. Appl. No. 16/779,362 dated Aug. 7, 2020, pp. 1-33.
Office Communication for U.S. Appl. No. 16/883,879 dated Sep. 1, 2020, pp. 1-18.
Office Communication for U.S. Appl. No. 16/775,041 dated Aug. 18, 2020, pp. 1-17.
Extended European Search Report for European Patent Application No. 16812585.4 dated Nov. 7, 2018, pp. 1-9.
Comer, Douglas, "The Ubiquitous B-Tree," Computing Surveys, vol. 11, No. 2, Jun. 1979, Computer Science Department, Purdue University, West Lafayette, Indiana 47907, pp. 121-137.
Office Communication for European Patent Application No. 16812585.4 dated Jan. 2, 2020, pp. 1-6.
International Search Report and Written Opinion for Application No. PCT/US2016/38242 dated Oct. 11, 2016, pp. 1-11.
Office Communication for U.S. Appl. No. 16/752,509 dated Aug. 11, 2020, pp. 1-7.
Office Communication for U.S. Appl. No. 14/595,598 dated Jul. 31, 2019, pp. 1-5.
Office Communication for U.S. Appl. No. 14/595,598 dated Sep. 20, 2018, pp. 1-18.
Office Communication for U.S. Appl. No. 14/595,598 dated Dec. 15, 2017, pp. 1-18.
Office Communication for U.S. Appl. No. 14/595,598 dated Feb. 24, 2017, pp. 1-8.
Office Communication for U.S. Appl. No. 14/595,598 dated Apr. 19, 2018, pp. 1-3.
Bloom, Burton H. "Space/Time Trade-offs in Hash Coding with Allowable Errors," Communications of the ACM, vol. 13, No. 7, Jul. 1970. Computer Usage Company, Newton Upper Falls, Massachusetts, pp. 422-426.
Office Communication for U.S. Appl. No. 16/262,756 dated Aug. 24, 2020, pp. 1-21.
Office Communication for European Patent Application No. 18155779.4 dated Oct. 8, 2019, pp. 1-4.
Office Communication for U.S. Appl. No. 16/152,259 dated Aug. 28, 2020, pp. 1-5.
Office Communication for U.S. Appl. No. 14/595,598 dated Sep. 25, 2020, pp. 1-7.

(56) References Cited

OTHER PUBLICATIONS

Office Communication for U.S. Appl. No. 16/152,277 dated Oct. 16, 2020, pp. 1-10.
Office Communication for U.S. Appl. No. 16/152,615 dated Oct. 20, 2020, pp. 1-7.
Office Communication for U.S. Appl. No. 16/775,041 dated Nov. 3, 2020, pp. 1-5.
Office Communication for U.S. Appl. No. 17/062,500 dated Nov. 12, 2020, pp. 1-12.

* cited by examiner

| file | filesize (KB) | time-weighted size |
|---|---|---|
| /USR/file1 | 1 | 0 |
| /USR/file2 | 32 | 0 |
| /USR/USER1/file1 | 30 | 7.5 |
| /USR/USER1/file2 | 43,534 | 0 |
| /USR/USER1/music/file1 | 2,345 | 0 |
| /USR/USER1/music/file2 | 435 | 0 |
| /USR/USER1/photos/file1 | 546 | 0 |
| /USR/USER1/photos/file2 | 4 | 0 |
| /USR/USER2/file1 | 234,545 | 234,545 | music-a — 1402

| Dashboard | Analytics ▼ | Sharing ▼ | Cluster ▼ |

Qumulo QEFS | Signed in as admin
Friday, September 26, 2014
11:54 AM
America/Los Angeles

Integrated Analytics

In view: /

Name — 1404
/
Size — 1406    Used — 1408    Overall
277.5 GB       99.7%          5.69%
Permissions
0777
Created          Last Modified — 1410
09/15/2014       09/26/2014
2:31 PM — 1412   11:02 AM — 1416
Directories      Files — 1414
8288             56877

Top IOPS Activity
84.32  /user/john/company_remote/src/
       lm_not_quite_the_fastest
15.53  /music/bob/BIG_FILE_2
10.08  /music/zed/mp3/musician1/
       music_for_airports-01-
       1_1.mp3.pvdrxZ
7.85   /music/bob/ALAC/musician2/
       album1/07 - song.m4a
5.13   /music/bob/ALAC/musician2/
       album1/06 - song.m4a
4.55   /music/bob/ALAC/musician2/
       album1/05 - song.m4a IOPS: Namespace  ☑Reads ☑Writes  File ☑Reads ☑Writes
                                      — 1422
        — 1420
— 1418

| music | zed | mp3 | [More] |
|       | john |    |        |
|       |      |    | TV Shows / Compilations |
|       | jane | shared music library | [More] |
|       |      |    | Compilations |
|       | bob —1430 | Music | [More] |
|       |      | BIG_FILE_2 |  |
|       |      | ALAC |  |
|       |      | BIG_FILE | [More] |
| [More] | | | |

1426   1428   1424

*FIG. 14* music-a

Qumulo QEFS | Signed in as admin |
Thursday, October 9, 2014
4:22 PM
America/Los Angeles

| Dashboard | Analytics ▶ | Sharing ▶ | Cluster ▶ |

IOPS: Namespace ☑Reads ☑Writes  File ☑Reads ☑Writes

Integrated Analytics ⎯⎯ 1500

In view: / music / zoso ⎯⎯ 1502

Name
zoso

Size      Used
167.0 GB  3.4%

Permissions
0755

Created        Last Modified
09/30/2014     10/03/2014
4:49 PM        1:57 PM

Directories    Files
2755           29004

Top IOPS Activity
No significant IOPS activity 1512  1514  1516

| Janis Joplin | | 01. [Janis Joplin] |
| Elton John | | 1 Studio albums |
| Top 1000 Pop Hits of the 80s (4.32 gb) | | |
| Pink Floyd | | |
| Bob Dylan | | | zoso

FAIR SAMPLING OF ALTERNATE DATA STREAM METRICS FOR FILE SYSTEMS

CROSS-REFERENCE TO RELATED APPLICATION

This application is a Utility Patent application based on previously filed U.S. Provisional Patent Application No. 63/002,196 filed on Mar. 30, 2020, the benefit of the filing date of which is hereby claimed under 35 U.S.C. § 119(e) and which is further incorporated in entirety by reference.

TECHNICAL FIELD

The present invention relates generally to file systems, and more particularly, but not exclusively, to providing metrics for data in a distributed file system environment.

BACKGROUND

Modern computing often requires the collection, processing, or storage of very large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on.

The demand for scalable storage resources and the ability to provide rapid access to content stored thereby is a key concern to end-users. Enterprises, businesses, and individuals alike now use large scale filesystems to store data that is remotely accessible via various types of networks. Such filesystems are often accessible via closed (e.g., enterprise) and open (e.g., Internet) networks and allow concurrent access via multiple client devices. Various implementations of largescale filesystems relying on network access have been developed. Some of the differences between such filesystems are (1) that they use different protocols for the client devices and servers to communicate to read and write data and (2) that the data and corresponding metadata are stored in different ways.

Users benefit from knowing the amount of available storage resources as well as the allocation of those resources to various portions of the filesystem, such as directories, sub-directories, and files in a filesystem hierarchy, to facilitate management of the filesystem. For example, system administrators may choose to allocate system resources to frequently accessed nodes. Also, a system administrator may use various kinds of filesystem queries to manage the filesystem. For example, the system administrator may choose to generate a list of all files created in the past hour. In some cases, file systems may include files that include multiple alternative streams in the same files that may results in disadvantageous performance or functionality of convention file system analysis tools. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 14 is an example screenshot of a graphical user interface displayed on a client computer in accordance with one or more of the various embodiments;

FIG. 15C shows an example screenshot of a graphical user interface displaying analytics in accordance with one or more of the various embodiments;

BRIEF DESCRIPTION OF THE VARIOUS EMBODIMENTS

Figure 1:
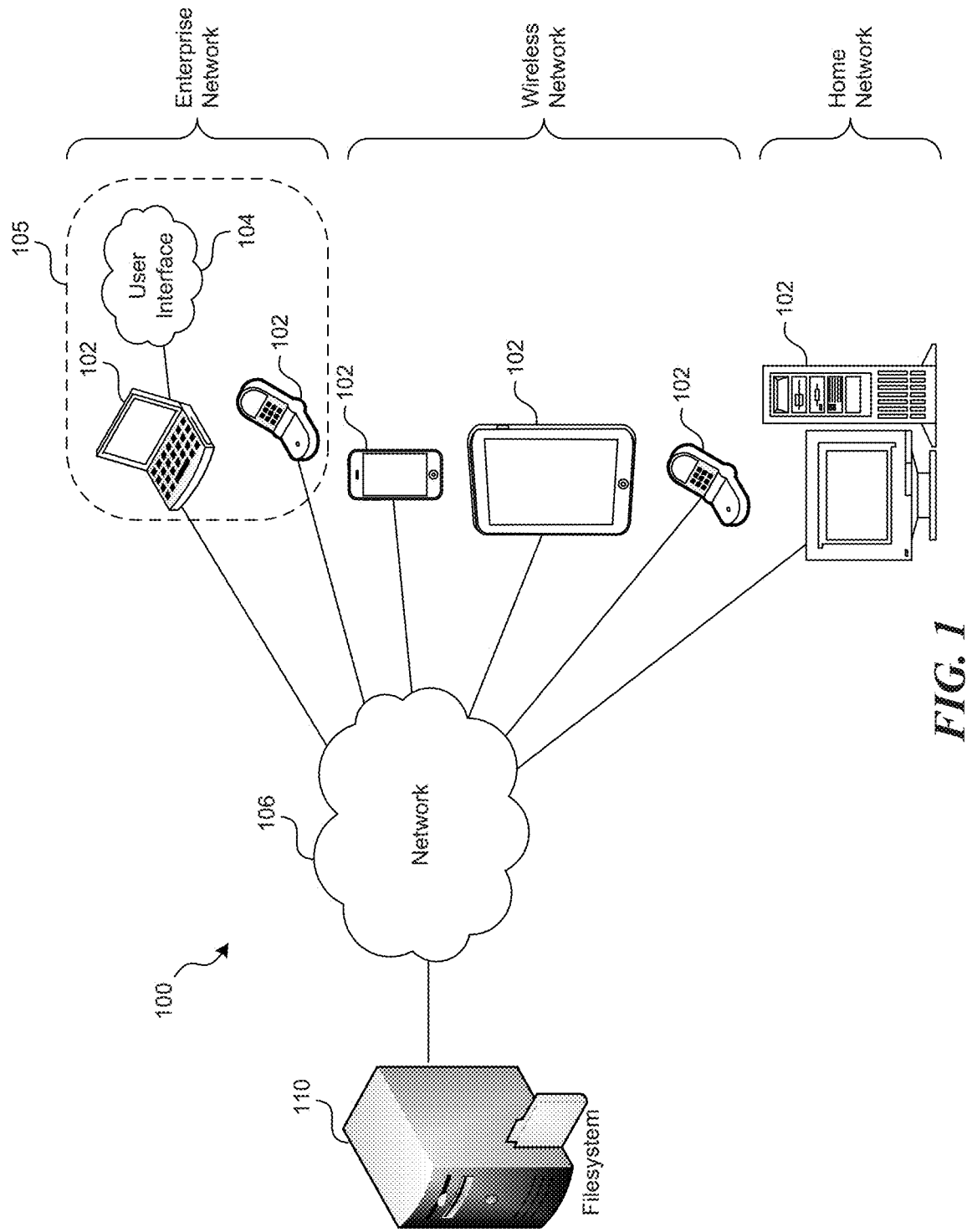
FIG. 1 illustrates an environment in which the file system facilities may operate in accordance with one or more of the various embodiments.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C #, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "file system object," or "object" refer to entities stored in a file system. These may include files, directories, or the like. In this document for brevity and clarity all objects stored in a file system may be referred to as file system objects.

As used herein the terms "block," or "file system object block" refer to the file system data objects that comprise a file system object. For example, small sized file system objects, such as, directory objects or small files may be comprised of a single block. Whereas, larger file system objects, such as large document files may be comprised of many blocks. Blocks usually are arranged to have a fixed size to simplify the management of a file system. This may include fixing blocks to a particular size based on requirements associated with underlying storage hardware, such as, solid state drives (SSDs) or hard disk drives (HDDs), or the like. However, file system objects, such as, files may be of various sizes, comprised of the number of blocks necessary to represent or contain the entire file system object.

As used herein the term, "alternate data streams" (ADS) refers to a feature for storing blocks in different data streams of a single filesystem object such as a file object. An exemplary use of ADS include storing extended metadata about a particular file or a directory with inode data in such a way that the extended metadata stays alongside its corresponding data but does not act as a part of the data.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Conventional filesystems may incur significant latency in aggregating metadata attributes of files to obtain hierarchical aggregate metric values ("metric values") that provide a user with visibility into the filesystem. Traditionally, in tree-structured filesystems, to satisfy a request for metrics for a subtree of the filesystem, it was necessary to systemically and recursively traverse an entire subtree in response to the request. The tree-structured filesystems discussed herein comprise a hierarchical tree of filesystem objects—directories and files—that include a root directory. Each filesystem object contains inode data that includes filesystem administration information. The filesystem object may be directly accessed by the filesystem via filesystem path or address, and the data contained in the inode data may be used by the filesystem to manage the hierarchy.

For example, if a user wants to know how much storage capacity is available in a particular user space, such as in a subtree of the filesystem hierarchy contained by a directory, a conventional filesystem must synchronously aggregate a file size metadata attribute value for each file in each filesystem object in the subtree to return the aggregated value to the user. In another example, if the user wants to know how much storage is dedicated to .crw files in the filesystem, conventional filesystems must synchronously check each file's type and aggregate the size of each that is a .crw file. Not only is does this create an imbalance in system performance, but it imposes a high cost in terms of number of Input/Output operations. More importantly, it may take hours to return the requested value to the user, depending on the size of the filesystem and its hardware components.

In addition, for conventional filesystems in which numerous users concurrently access the files, the returned values may fail to reflect any modifications to data that occur during the slow scan. Using the prior example, a second user may access the system and delete 2 TB (terabytes) of .crw files in a particular directory. However, if the scan accesses the directory containing those files prior to the deletion and returns the result subsequent to the deletion, that result is inaccurate and will fail to reflect the modified data.

To avoid latency, performance fluctuations, increased I/O costs, and other issues, each directory maintains in a filesystem tree, persistent hierarchical aggregates or "metric values" for file attributes of the filesystem objects contained by the subtree defined by that directory. Accordingly, a request for such metrics for a particular subtree can be satisfied without exhaustively traversing each level of the subtree of the filesystem tree structure in response.

A software and hardware facility described herein ("the facility") addresses these issues by persistently maintaining metrics on directories at different levels within a filesystem tree. The facility may operate with respect to a distributed or monolithic filesystem, such as one maintained by a number of networked nodes in a cluster. In particular, in some embodiments, the facility aggregates attributes of filesystem objects using, for example, a deterministic function, and stores them as metric values in each directory within a tree. In some embodiments, the values stored in a directory represent data summed or otherwise aggregated from filesystem objects contained by an entire subtree of filesystem objects—directories and files—defined by that directory. In some embodiments, the metric values may represent such measures as total space consumed by a filesystem object and all the descendant objects, total number of files within an filesystem object, total data blocks used by a filesystem object and its descendant filesystem objects (if any), etc.

In some embodiments, the metrics stored in a directory containing no other directories is determined by performing an aggregation or other logical operation on attributes of the files contained by the directory. In some embodiments, the metrics stored in other directories are each determined by performing an aggregation or other logical operation on the attributes of the files contained by the directory itself, further aggregated with the corresponding metrics of the child directories. For example, metric values may provide: a most recently accessed filesystem object including all its descendant objects, a most frequently accessed filesystem object in a tree or subtree, a largest filesystem object in set of objects in a tree or subtree, and the like.

In some embodiments, the facility provides additional aggregates or metric values, such as checksum aggregates, MIN and/or MAX aggregates, sameness bits, bloom filter aggregates, queryable user tags, moving average aggregates, b-tree aggregates, and so on. Checksum aggregates represent a checksum of all files stored in a particular folder and its subfolders. A MIN aggregate for a folder represents, for a given attribute, the minimum value of that attribute for all files and folders in the folder and its subfolders, such as the minimum filesize or last modified time. A MAX aggregate for a folder represents, for a given attribute, the maximum value of that attribute for all files and folders in the folder and its subfolders, such as the maximum number of users that have accessed a file or creation time. A sameness bit for an attribute represents whether all files in a folder have the same value for the given attribute and can be aggregated for a folder by AND-ing the corresponding sameness bit of each of subfolder of the folder. A bloom filter aggregate for a folder can be used to determine whether the folder or its subfolders may or does not contain a file with a particular attribute value. A queryable user tag allows a user to create custom attributes or metadata for files that can then be indexed, aggregated, and so on. A moving average aggregate provides an estimate of diskspace usage for a given period. Furthermore, these aggregates or metric values may be applied to a variety of hierarchical structures, such as a b-tree, b+tree, b*-tree, binary tree, and so on. In some exemplary embodiments, aggregates are stored as separate, additional data values within blocks or nodes of a hierarchical structure, while in other examples the aggregates are stored within other data structures, such as standard keys of a b-tree.

Additionally, in one or more embodiments, a file system protocol, e.g., SMB, may employ an alternate data streams (ADS) feature to create a single filesystem object based on two or more streams of data, e.g., a file object or a directory object. The ADS feature provides for storing extended metadata about a particular filesystem object or directory object in such a way that the extended metadata stays with the corresponding file data object but does In one or more of the various embodiments, two new metadata fields are added to inode data to indicate and identify each alternate data stream that is used to create a filesystem object, e.g., a file or a directory in the file system. One new metadata field is employed to identify a count of alternate data streams and the other metadata field is used to provide a count of a number of data blocks that are provided by the alternate data streams. In one or more embodiments, the two new metadata fields are used by the facility to reconcile upstream nodes when an alternate data stream is employed to create a filesystem object.

In one or more embodiments, the ADS feature includes adding two metadata fields to the main attribute key space of a filesystem object. First, a stream sequence identifier (ID) metadata filed is added that represents a monotonically increasing counter for allocation of stable stream IDs for a file object or directory object. Second, a stream catalog metadata field is added that encodes each alternate data stream corresponding to the filesystem object. Also, the encoding of alternate data stream catalog information may include a stream sequence ID, name, slot identifier (ID), size, version, and used data blocks.

By performing in some or all of the ways described above, the facility enables rapid access to metric values based on file attributes and aggregates stored at various levels in the filesystem. Because the metric values for those attributes are maintained in each directory and are updated frequently, the facility typically does not need to traverse significant portions of the filesystem tree in order to determine corresponding metric value. Also, the facility is able to scale the implementation of aggregations to filesystems that have very large directories.

Accordingly, in one or more of the various embodiments, one or more alternate data streams (ADSs) of an object in a file system may be modified based on a request from a client and one or more metrics associated with the one or more ADSs may be modified.

In one or more of the various embodiments, one or more values for one or more reconcile fields that are associated with the object may be set based on the one or more modified metrics such that the object with the one or more modified ADSs may be included in a reconcile list. And, such that an acknowledgment of the request may be provided to the client based on the reconcile list.

In one or more of the various embodiments, in response to accessing the object from the reconcile list further actions may be performed, including: determining a parent object of the object based on the file system; determining one or more other metrics associated with the parent object based on the one or more reconcile fields of the object; modifying the one or more other metrics based on the one or more reconcile fields of the object; setting one or more values for the one or more other reconcile fields associated with the parent object based on the one or more modified other metrics; unsetting the one or more values of the one or more reconcile fields of the object; removing the object from the reconcile list and including the parent object in the reconcile list; or the like.

In one or more of the various embodiments, the provided file system may include a plurality of objects such that the object may be one of the plurality of objects that includes a main data stream and one or more ADSs, and such that the main data stream may be separate from the one or more ADSs.

In one or more of the various embodiments, the one or more other metrics associated with the parent object may be provided based on aggregating a plurality of metrics associated with one or more child objects of the parent object such that the object is included in the one or more child objects.

In one or more of the various embodiments, setting the one or more values of the one or more reconcile fields associated with the object, may include: determining one or more original values of the one or more metrics; determining one or more modified values of the one or more modified metrics; storing the one or more original values and the one or more modified values in the one or more reconcile fields such that each reconcile field is an ordered pair that includes one original value and one modified value that corresponds to one of the one or more metrics; or the like.

In one or more of the various embodiments, modifying the one or more alternate data streams (ADSs) of the object may include modifying one or more data blocks associated with the one or more ADSs such that the modifications include: one or more of adding the one or more data blocks to the one or more ADSs; deleting the one or more data blocks from the one or more ADSs; modifying one or more portions of content of the one or more data blocks associated with the one or more ADSs; moving the one or more data blocks from a main data stream to the one or more ADS; moving the one or more data blocks from the one or more ADSs to the main data stream; or the like.

Also, in one or more of the various embodiments, a query may be provided to determine one or more characteristics associated with a portion of a file system and a sampling model. In one or more of the various embodiments, the sampling model may include one or more rules for a statistically fair sampling of the one or more objects based on the one or more metrics associated with the one or more ADSs.

In one or more of the various embodiments, the sampling model may be employed to determine one or more objects in the file system based on a traversal of the portion of the file system such that a path of the traversal may be based on the sampling model and the file system.

In one or more of the various embodiments, the sampling model may be employed to determine one or more metrics associated with the one or more alternate data streams (ADSs) included in the one or more objects such that each of the one or more objects that includes a separate main data stream and the one or more ADSs may be associated with one or more data blocks and the one or more ADSs may each be associated with one or more other data blocks.

In one or more of the various embodiments, the sampling model and the query may be employed to sample the one or more objects to provide one or more partial results such that the sampling may be distributed between the one or more objects based on the sampling model and the one or more metrics. In one or more of the various embodiments, distributing the sampling between the one or more objects may include: determining one or more first metrics of a first object such that the one or more first metrics are associated with each ADS that is included in the first object; determining one or more second metrics of a second object such that the one or more second metrics are associated with each ADS that is included in the second object; and determining a number of first samples to measure from the first object based on a ratio of the one or more first metrics and the one or more second metrics such that the number of first samples measured from the first object may be greater than a number of second samples measured from the second object if values of the one or more first metrics may be greater than values of the one or more second metrics.

In one or more of the various embodiments, a result to the query may be provided based on the one or more partial results.

In one or more of the various embodiments, the one or more metrics associated with the one or more alternate data streams (ADSs) may include one or more of an amount of ADSs in the object, a number of data blocks included in each ADSs in the object, or the like.

In one or more of the various embodiments, a descent traversal of the file system may be terminated based on the one or more metrics matching one or more conditions defined in the sampling model such that the one or more conditions include, one or more values of the one or more metrics are less than a threshold value, an expiry of a timeout, a number of visited objects exceed a threshold value, or a proportion of visited objects relative to a number of objects in the portion of the file system exceed a threshold value.

FIG. 1 illustrates an environment 100 in which the facility may operate. For example, a file system may communicate over a network 106, such as the Internet, with computing systems, e.g., clients 102, through a secondary network. In particular, the user executes a browser program on a client in order to display the contents of a user interface which may be used to generate and execute requests to access the facility, e.g., filesystem 110. In some embodiments, a secondary network may include an enterprise network, wireless network, or home network on which the client is operating. A variety of proxy servers or gateway devices may be additionally included in the communication path between the facility 110 and the client 102, though not specifically shown in the illustrated environment. In various embodiments, a variety of computing systems or other devices may be used as client computer systems, such as mobile phones, personal digital assistants, tablet computers, etc.

In various embodiments, the facility includes computer systems and devices including zero or more of each of the following: a central processing unit ("CPU") for executing computer programs; a computer memory for storing programs and data while they are being used, including the facility and associated data, an operating system including a kernel, and device drivers; a persistent storage device, such as a hard drive or flash drive for persistently storing programs and data; a computer-readable media drive, such as a floppy, CD-ROM, or DVD drive, for reading programs and data stored on a computer-readable medium; and a network connection for connecting the computer system to other computer systems to send and/or receive data, such as via the Internet or another network and its networking hardware, such as switches, routers, repeaters, electrical cables and optical fibers, light emitters and receivers, radio transmitters and receivers, and the like.

While computer systems configured as described above are typically used to support the operation of the facility, those skilled in the art will appreciate that the facility may be implemented using devices of various types and configurations, and having various components. Furthermore, while various embodiments are described in terms of the environment described above, those skilled in the art will appreciate that the facility may be implemented in a variety of other environments including a single, monolithic computer system, as well as various other combinations of computer systems or similar devices connected in various ways.

Figure 2:
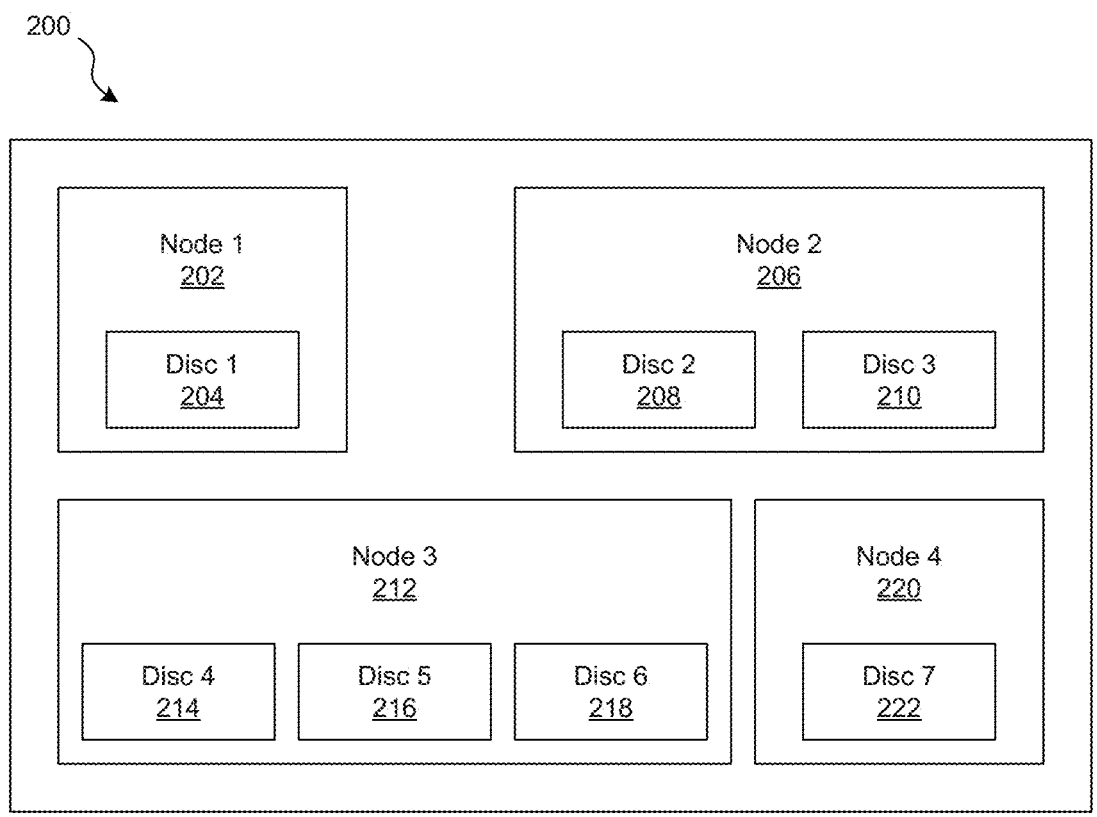
FIG. 2 is a block diagram of a cluster in a distributed filesystem in which numerous storage devices may be networked together for use in connection with the facility in accordance with one or more of the various embodiments.

FIG. 2 is a block diagram of cluster 200 in a distributed filesystem in which numerous storage devices may be networked together for use in connection with the facility. One or more storage devices additionally may be coupled together in groups, forming nodes (e.g., Node 1 202, Node 2 206, Node 3 212, Node 4 220) within the facility. Each node within the cluster 300 has a particular address, or path name accessible via the network filesystem protocol, an instance of which is included on each node. Accordingly, each node in the cluster 200 typically includes one or more computer processors or controllers and data storage devices such as hard disks, solid state disk drives, or similar computer readable storage or memory devices. For example, a node may include one or more server computers themselves, contained by such components. Each of the data storage devices (e.g., disc1 204, disc2 208, etc.) within a node may store data in blocks, the stored data corresponding to files contained by filesystem object data of the hierarchical tree structures implemented by the facility.

Figure 3:
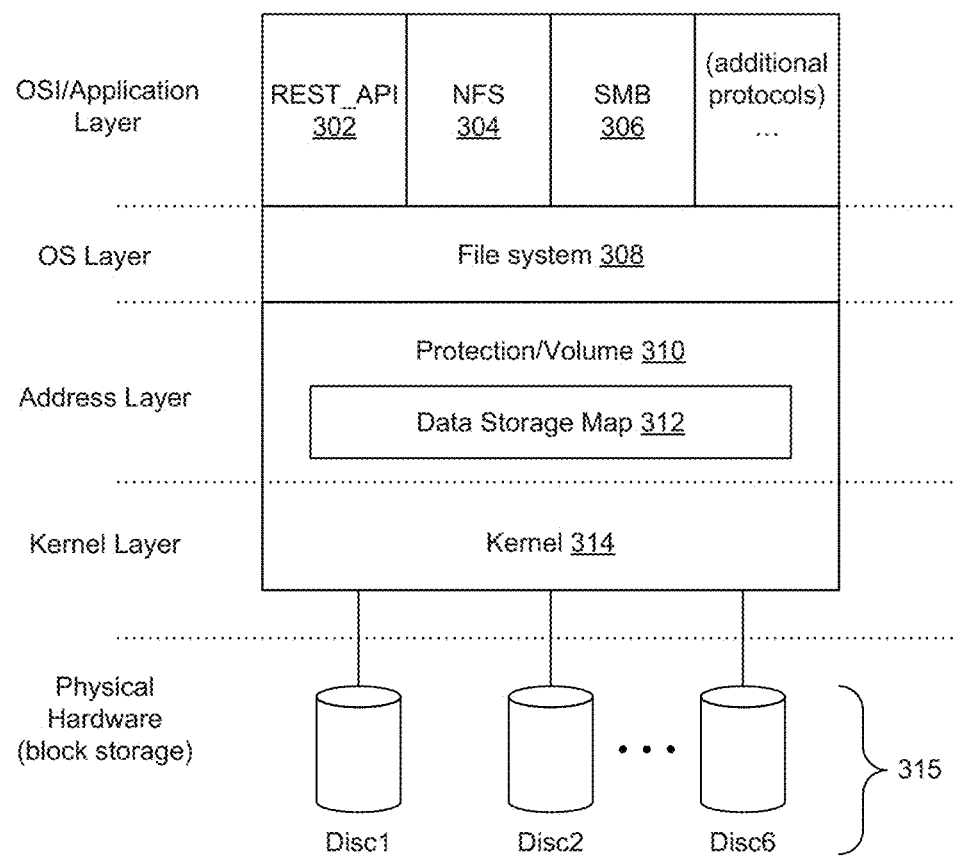
FIG. 3 illustrates abstraction layers provided by the facility in accordance with one or more of the various embodiments.

FIG. 3 illustrates a logical schematic provided by the facility in some embodiments. For example, the layers can include an application layer, an operating system layer (OS) that includes a host (local) filesystem, an address abstraction layer that includes a protection/volume 310 (e.g., a protected storage unit) referenced by the local filesystem 308 and a kernel layer that translates requests from the OS layer and an address provided by the address layer.

The application layer of the facility may expose an instance of a web application programming interface (API) 302 (e.g., REST), a network filesystem protocol 304 (NFS), and an application layer network protocol 306 (e.g., SMB, or the like). The NFS protocol 304 may be an application level protocol used to access the facility over a network, such as the Internet. The application layer network protocol 306 may be used to communicate with other nodes in the facility, accessible by the NFS 304. In some embodiments, the application layer may include protocols such as http, ftp, scp, rsync, afp, afs, or a variety of other application layer protocols capable of providing network-level access to the facility. Any of the aforementioned protocols may be considered reasonable variations to the illustrated protocols and may be used in addition to or in place of those protocols.

An OS layer may implement a core filesystem 308. To access stored data, the core filesystem 308 may reference a location (e.g., in a protected storage unit) which is used by the address abstraction layer to retrieve the requested data. Accordingly, the address abstraction layer can include a data storage map 312 that links the referenced location to a particular node and associated disc (e.g., see FIG. 2) on which the requested data is stored.

The facility also includes the kernel layer that translates the filesystem call (for the requested data) into instructions for hardware components. The hardware components may be located in a hardware layer and may include a plurality of storage devices 315 (e.g., disc1, disc2, disc3) that can be distributed across multiple storage nodes.

In some embodiments, the facility manages metric requests for filesystem objects through the web API 302. These requests are stateless in order to account for various platforms on which filesystem may be implemented. Accordingly, calls made from a client device, such as devices 102 in FIG. 1, can request a metric value to be retrieved for one or more filesystem objects stored by the facility. Exemplary metric value requests in some embodiments are provided in the following table:

| | |
|---|---|
| capacity_usage | total blocks used for file data (not metadata) |
| moving_capacity_usage | moving sum of capacity_usage (exponentially decayed, 60 minute lifetime) |
| num_directories | total directory count under the filesystem object |
| num_files | total file count under the filesystem object |
| num_input_operations | total number of write operations on files |
| moving_input_operations | moving sum of num_input_operations (exponentially decayed, 60 minute lifetime) |

Each of the metric requests within the table typically returns a value indicating an aggregate value of attributes for a collection of files contained by a directory within the facility. In some embodiments, the metric requests return integer values for aggregated attributes of a file in the facility. The capacity usage and the moving capacity usage may be in units of bytes and, in some embodiments, include 4096-byte data blocks. Some of the metrics maintained by the facility are aggregations on filesystem object attributes of types other than integer. For example, in some embodiments, the facility maintains a recent access ("raccess") time metric based on applying a latest( ) aggregation function to an access time ("atime") attribute maintained for each descendant filesystem object. In some embodiments, the metrics are checksums. In various embodiments, the facility maintains other aggregates based on, combinations of when filesystem objects were last accessed, changed, modified, created, archived, transferred, deleted, revived, or based on filesize (e.g., minimum and/or maximum filesizes).

In some embodiments, the facility maintains a checksum aggregate for folders within a subtree. The checksum aggregate generated by calculating, for each folder, a checksum (e.g., XOR, cyclic redundancy check, longitudinal parity check) and/or hash (e.g., SHA-256, MD5) of all of the files and subfolders within that folder. One of ordinary skill in the art will recognize that a variety of checksum functions/algorithms and/or hash functions are used to generate a checksum and corresponding checksum aggregates. For example, in some embodiments the facility uses SHA-256 to generate hash values for individual files within a folder and XOR the generated hash values for individual files and the checksum aggregates for each subfolder to generate a checksum aggregate for the folder. The checksum aggregates enable a computing system to quickly compare contents of a directory tree by comparing the checksum aggregates rather than comparing each individual file or folder. In this manner, the facility improves the rate at which a computing system performs various actions, such as bi-directional replication, de-duplication, and the freeing of file cache space. For example, a process for de-duplicating files and folders uses the checksum aggregates to determine whether two or more folders contain (or are likely to contain) identical files rather than separately scanning each folder. As another example, a replication system (such as a cloud backup storage system), the checksum aggregates allow for quicker identification of changes between a folder and a previously-stored version (i.e., snapshot) of that folder or between two or more snapshots. If the checksum aggregate for a current version of a folder and the aggregate checksum for a previously-stored version of the folder are the same, then the two versions are likely to be the same. If, however, the checksum aggregate for the current version of a folder and the checksum aggregate for the previously-stored version of the folder are not the same, then the two versions are not the same. In this case, the facility compares checksum aggregates for each subfolder and file within each version of the folder to identify where the changes have occurred. In some embodiments, the computing system checks subfolders before files if, for example, the ratio of files to folders greater than a predetermined threshold (e.g., 500 to 1 or 100 to 1). In other embodiments, the computing system checks the files before subfolders. In some embodiments, if a difference is found, the new version is backed up and the computing system recalculates the aggregate checksum(s) (i.e., the aggregate checksum for the folder storing the changed file and the aggregate checksum for each of its parent folders) to determine whether there are additional differences. Thus, the checksum aggregates improve the rate at which a computing system compares folders and different versions of those folders to, for example, quickly identify changes between a folder and a snapshot of that folder.

In some embodiments, the facility enables the use of a "sameness bit" aggregate for one or more attributes or metadata. A sameness bit specifies whether every object within a folder (and all of its subfolders) has the same value for a particular attribute or metadata element. For example, if all of the files within a folder and its subfolders have the same access permissions (e.g., read, write, and execute for an owner class and read-only for all other classes), then a "permissions sameness bit" aggregate is set to 1 for that folder (and all of its subfolders). If, however, one or more of the files becomes writeable by a class other than the user class, then the facility updates the "permissions sameness bit" aggregate to 0 for the folder that contains it, and any ancestor folders up to the nearest ancestor for which the bit is 0. As another example, if all of the files within a folder and its subfolders have the same owner, then the facility sets an "owner sameness bit" aggregate to 1. A sameness bit aggregate improves the rate at which a computing system identifies files and folders, such as those relevant to a particular query. For example, if a user is searching for all writeable files, then the computing system skips or eliminates searching any folder (and its subfolders) having a "read-only sameness bit" set to 1 (i.e., all of the files in the folder (and its subfolders) are either read-only or not read-only) and containing a file that is not writeable. Similarly, if a user is searching for all files owned by "USER1" and a folder with an "owner sameness bit" set to 1 is found to contain a file owned by "USER2," then the rest of the contents of that folder (and all of its subfolders) are skipped. In some embodiments, the facility maintains a sameness aggregate that is larger than a bit, such as a byte, word, string, and so on. For example, if an owner sameness string is set to "Alice" for a particular folder and a user is searching for all files owned by another user, then the computing system skips that folder. In this manner, the sameness attributes enable improved search times by enabling a search process to quickly identify folders (and corresponding files and subfolders) that to be skipped during a search or other process.

In some embodiments, the facility maintains a bloom filter aggregate for one or more attributes. A bloom filter is a probabilistic data structure used to determine whether a particular element is likely to belong to a particular set. While a bloom filter can produce false positives, it does not produce false negatives. For example, a bloom filter can be used to determine whether a particular folder may contain any files having a particular attribute, such as a particular owner, creator, mtime, and so on. If a user is searching for all files owned by USER1, a computing system can apply a bloom filter configured to determine whether a particular folder may contain or does not contain any files owned by any particular user. In some embodiments, a bloom filter is represented as a bit string and generated by applying multiple hash functions to an attribute value for a particular file or folder, each hash function generating a placement in the bit string, and setting corresponding bits in the bit string to 1. For example, after adding 3 files to a folder an "owner bloom filter aggregate" for that folder (i.e., a bloom filter that represents the owners of the files in that folder) is represented by the following bit string:

0010 1000 0110 0100

If another file is added to the folder, the owner attribute for that file may be submitted to the multiple hash functions and a new bit string (e.g., a bit string initialized to zero) is generated for that file with the corresponding bits set to one, resulting in the following new bit string:

0000 1010 0101 0000

The facility uses this bit string to update the bloom filter aggregate by OR-ing the bit string generated for the new file with the current owner bloom filter aggregate, resulting in the following bit string:

0010 1010 0111 0100

This bit string is OR-ed with each of the "owner bloom filter aggregates" in the ancestor folders to update their corresponding "owner bloom filter aggregates." In response to a query for a particular owner or owners, the facility applies the same hash functions to the owner or owners to produce a query bit string. If all of the corresponding bits in the bloom filter aggregate are equal to 1 (i.e., if the result of AND-ing the query bit string with the "owner bloom filter aggregate" is the query bit string), then there is a chance that the folder (or one of its subfolders) includes a file owned by the particular owner or owners. Otherwise, neither the folder nor its subfolders includes a file owned by the particular owner or owners and, therefore, these folders are skipped as part of the search. Additional information regarding Bloom filters can be found in Bloom, Burton H. "Space/Time Trade-Offs in Hash Coding with Allowable Errors," *Communications of the ACM* 13, pp. 422-426 (1970), which is incorporated herein by reference in its entirety.

In some embodiments, the facility employs queryable user tags to allow users to define their own attributes or metadata for files and folders and, therefore, define a custom set of files and/or folders. A user may define a user tag that leverages information maintained by the computing system or operating system. For example, a user may define a "larger than 5 MB" tag that, if set to 1, specifies that the file is larger than 5 MB, and a "created after Mar. 1, 2013" tag that, if set to 1, specifies that the file was created after Mar. 1, 2013. A user may define a tag that using information that is not otherwise available to the computing system or operating system, such as all files that a particular user has expressed an interest (e.g., "files liked by Bob"). For each file, the facility applies these user-generated tags by, for example, appending the tags to the file or a metadata field of the file, and then aggregates these values into an aggregate tag for each folder by, for example, OR-ing all of the tags for each file and subfolder within that folder. Thus, if the user is searching for files greater than 5 MB, the "larger than 5 MB" tag aggregate can be used to determine whether a particular folder contains one or more such files. In this manner, the facility improves the speed and efficiency with which a computing system identifies files relevant to a query, such as a user-generated search. Moreover, in some embodiments, the queryable user tags are indexed to further reduce the amount of time and memory required to identify files that satisfy a query. In some embodiments these user-defined tags are added to individual files or folders as metadata. In some embodiments, the facility maintains query tags that are larger than a bit.

In some embodiments, the facility maintains a moving average aggregate for a folder that signifies changes in diskspace usage over time. For example, in some embodiments the moving average aggregate is used to approximate how much data has been written to or removed from a particular folder during the previous hour, day, week, and so on. The moving average aggregate allows a user to determine how quickly diskspace usage is changing and where those changes are occurring or have occurred. The facility maintains a moving average aggregate for a folder by storing, for each file, the time at which the file was stored in that folder and then applying a decay function (e.g., an exponential decay function) to the size of the file based on when the moving average aggregate is being calculated.

In some embodiments, the facility maintains aggregate values within b-trees. A b-tree is a tree data structure commonly used in databases and filesystems to organize and store information. A b-tree provides techniques for searching, inserting, deleting, and otherwise accessing information stored within a filesystem. Additional information regarding b-trees can be found in Comer, Douglas, "The Ubiquitous B-Tree," *Computing Surveys* 11 (2), pp. 123-137 (June 1979), which is incorporated herein by reference in its entirety. As with filesystem subtrees and directories, the facility maintains aggregate values for b-trees by storing, in each non-leaf node aggregate values generated from that non-leaf node's children. In some embodiments, the facility uses a btree to structure the data for one or more nodes within a filesystem tree, wherein a leaf can represent a file, symlink, block device, character device, unix domain socket, named pipe, etc.

In some embodiments, certain aggregates are invertible while other aggregates are non-invertible. An invertible aggregate is one that can be updated without re-scanning the folder (and its subfolders) to update the aggregate for the folder and/or the aggregates of its ancestor folders. For example, an aggregate checksum generated using the XOR operator can be updated when a file is removed (or added) by XOR-ing the aggregate checksum with the checksum for the file. In contrast, non-invertible aggregates, such as min/max aggregates, bloom filter aggregates, sameness bits, user tags, and so on are updated by scanning the contents of a corresponding node or directory (and its subdirectories). For example, when the largest file in a directory is deleted, then the facility must search for another file (or aggregate value of a subfolder) to update a MAX filesize aggregate.

When a metric request from a client is received for data stored by the facility, the request is eventually received at a node within the cluster. For example, the request may be received through a REST_API 302 on a REST server (not shown), which is interfaced with the local filesystem 308. The facility retrieves the requested data, such as a metric value, from a particular disc 315 on a node, provided at the address (312) reference by the filesystem 308, and then returns the requested data to the client. In some embodiments, individual metric values for a single filesystem object may be returned. When a request is received for a directory having child directories, all metric values for the entire subtree defined by the directory are returned in response to a single request from a client in some embodiments. The client can parse the values in the response message in order to identify and display a specific metric value for a particular filesystem object to the user. In various embodiments, the response message is formatted in JavaScript Object Notation (JSON), extensible markup language (XML), or other data exchange language.

In some embodiments, the initial request call (e.g., GET, PUT, POST, DELETE) from a client may include a plurality of parameters for the value of the metrics in the response. For example, in one parameter the client is able to indicate a maximum number of "directory entries" to return for a filesystem object. The directory entries may include metric values for the directory and any descendant directories or files, such as those within a subtree defined by the directory. The returned values may include aggregate values for the directory as well as any descendant directories. In another parameter, the client is able to provide an order to sort the returned directory entries for the directory. The order may be based on a retrieved metric value determined by aggregating an attribute of one or more files contained by the directory and any descendant directories. For example, the client may select to sort the returned directory entries based on the storage capacity used (e.g., the number of blocks in the facility) by that filesystem object and descendent objects. This parameter mainly pertains to sorting the directory entries corresponding to descendant directories of the requested directory since the requested directory includes the aggregate value of blocks used by each returned directory entry.

Further, in one or more of the various embodiments, processes described below may be implemented by or executed by one or more processors on a single network computer, such as network computer 2500 of FIG. 25. In other embodiments, these processes, or portions thereof, may be implemented by or executed on a plurality of network computers, such as network computer 2500 of FIG. 25. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described below may perform actions for aggregating alternate data stream metrics for file systems or fair sampling of alternate data streams for file systems in accordance with at least one of the various embodiments or architectures such as those described in conjunction with FIGS. 1-25. Further, in one or more of the various embodiments, some or all of the actions performed by processes described herein may be executed in part by file system engine 2522, reconcile engine 2524, or the like.

Figure 4:
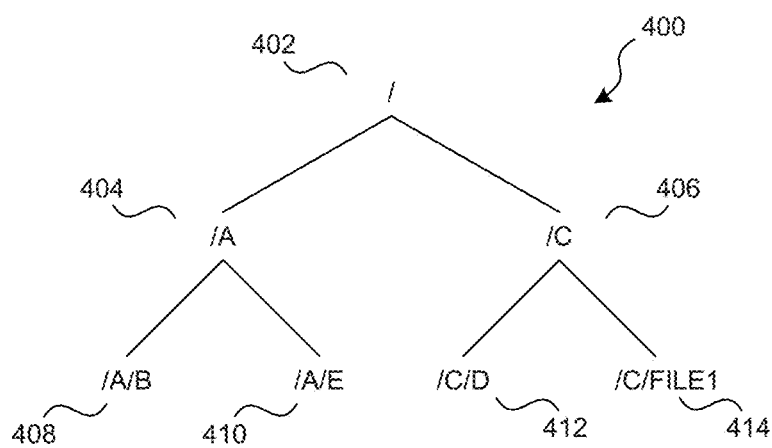
FIG. 4 is a hierarchical tree-structure representative of hierarchical data storage in the facility in accordance with one or more of the various embodiments.

FIG. 4 is a hierarchical tree-structure 400 representative of hierarchical data storage in the facility. The tree 400 includes filesystem objects 402, 404, 406, 408, 410, 412, and 414, including a root directory 402. As previously mentioned, a filesystem object can be a directory or a file. Each filesystem object 402, 404, 406, 408, 410, 412, and 414, in a tree typically stores and maintains a relatively current version of attributes and metadata for that filesystem object.

In particular, each filesystem object that is a directory 402, 404, 406, 408, 410, and 412 contains metadata and other data unique to the directory which characterizes files in that directory. The other unique data includes metric values of aggregated attributes for each file in, or "contained" by, the directory, along with information viable to access the contents of each of those files.

Each filesystem object that is a file 414 in the filesystem tree also contains metadata and one or more attributes characterizing that file, which may be aggregated and stored as a metric value in the directory under which that file is located in the filesystem tree. The metadata, aggregated values and other attributes may be stored in an inode portion of the filesystem object, which is later discussed with reference to FIG. 5. In some embodiments, the aggregated values for an individual file are stored in the directory entry pointing to that file. In some cases this is useful, for example, to accelerate operations that parse aggregate values for each entry in a directory.

Figure 5:
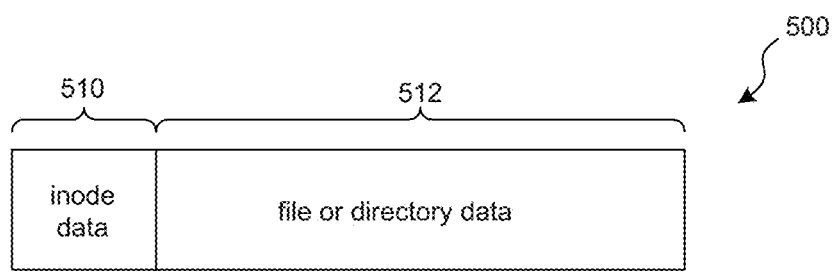
FIG. 5 illustrates inode data and a second portion of the filesystem object data in accordance with one or more of the various embodiments.

FIG. 5 illustrates an example linear view of the contents stored in a filesystem object 500. The filesystem object 500 can be stored in a data structure and can be of variable size. Each filesystem object 500 in the facility includes inode data 510 stored in one or more blocks at a particular filesystem location and file or directory data 512 stored at a corresponding filesystem location. Though the inode data is described as being stored both adjacent to and separate from the corresponding file or directory data 512, this inode data can be stored in association with any directory or file in any on-disc format and in any type of filesystem. In some embodiments, for filesystem objects that are directories, the directory data 512 contains a directory map data structure identifying each filesystem object contained by the directory by its name and inode number. For filesystem objects that are files, the file data 512 contains an extent list data structure identifying the disc blocks containing the file contents by the filesystem addresses usable to locate those blocks. In some embodiments, the facility also maintains a global data structure for mapping inode numbers from each inode in the filesystem tree to the filesystem location at which the corresponding inode data is stored. In some embodiments, the facility may store a copy of this global data structure on each node (e.g., in FIG. 2).

For filesystem objects which are directories, the inode data 510 includes both the attributes of the associated directory and current metric values of aggregated attributes for each filesystem object contained by that directory. For example, the inode portion of a directory corresponding to the directory's attributes includes data such as an owner, permissions, number of links to the directory, the size of the directory in bytes or blocks (my_cap_usage), file count in the associated directory (my_num_files), most recent access time (atime), minimum access time, number of times accessed, creation time, modification time, and change (edit) time. The inode portion of the directory corresponding to the aggregate metric values includes data such as, for example, total number of files in and contained by the directory (num_files), total block usage by the directory and files contained by that directory (capacity_usage), total number of directories contained by the directory (num_directories), and various other metrics within the scope of the art. In some embodiments, the inode data also includes metric values corresponding to the Input/Output (I/O) operations performed on the associated directory (or any filesystem object contained therein) and the resource consumption to perform those operations. In some embodiments, the operations include a number of accesses, number of disk actions for accesses, number of memory accesses for accesses, and number of blocks consumed.

For filesystem objects which are files, the inode data 510 may indicate file attributes such as a last access date (file_access), a name (file_name), a type (file_type), and a size (file_size). The file access time may include a date and/or timestamp indicating the last time the file was accessed by a client. The file type may indicate the format in which the file is stored. The file size may indicate the number of bytes, kilobytes or data blocks used to store the file.

The aggregate metrics stored in the inode data for each filesystem object reflect a current state of the files or file contained by that filesystem object, including the corresponding attributes of those files. The aggregate metrics stored in the inode data for each directory also include aggregated values for file attributes of each file contained by that directory. Accordingly, each time that a file contained by a directory or descendant directory of that directory changes, the aggregate metrics in the inode data of the directory are also timely updated to reflect those changes. For example, to reflect the current state of attributes for files contained in a directory of a filesystem tree, the metric values stored in the inode data may be updated (i.e., reconciled) each time that an change is made to a file in that filesystem tree. Accordingly, there are times when updates to one directory or file may not be immediately reflected in all of that directory or file's ancestors. If the updates have not been applied to a particular ancestor directory, the unreconciled data for that directory is reflected in a descendant filesystem object from where the change originated. If the updates have been applied to that directory, an unreconciled value and reconciled value in the descendant filesystem object from where the change originated can reflect it. For example, in some embodiments, if the unreconciled value and reconciled value are equal, this indicates that the metric values in the parent directory's inode data fully reflect the filesystem object's metrics. Maintaining knowledge of whether the attributes for a filesystem object are current or not can provide additional visibility into that filesystem tree. Accordingly, a reconciled value and an unreconciled value corresponding to each attribute in a directory may be stored in the inode data. In some embodiments, the metric values for any given directory are not returned to a client if a descendant directory indicates that there is unreconciled data requiring an update in that directory.

Each change or update to an individual file in a filesystem tree is reflected in the changes to the attributes stored in the inode data of that filesystem object and in any ancestor directories with which that filesystem object may be associated. This updating may be performed up the filesystem tree until the metric values corresponding to the changed attribute stored in the root directory's inode data are updated. In some embodiments, the facility asynchronously updates each filesystem object with respect to a received change or alteration to a file stored in the filesystem tree. In some embodiments, the facility systematically traverses the filesystem tree to update each filesystem object. In some such embodiments, the facility continuously updates filesystem objects in a filesystem tree to reflect changes to any file or directory contained in that filesystem tree. As previously mentioned, in some embodiments, the filesystem objects in the filesystem tree are synchronously updated with respect to received changes or alterations to files stored in those filesystem trees. So, updates to filesystem objects in the facility may only be performed each time a change to a filesystem object is received for that respective tree. Various other methods for determining when to update filesystem objects and corresponding inode data stored in those filesystem objects are further discussed with reference to FIGS. 6-7D.

In some embodiments, the inode data 510 includes a value of a metric unreconciled to a parent directory, such as an unreconciled to parent block count and reconciled to parent block count which, when equal, indicate that all updates to the parent directory containing that filesystem object are current.

For example, if an attribute of a file (e.g., file_size) is updated in response to changes made to that file, then the updated file_size attribute will also need to be reflected in the metric corresponding to that file_size attribute in the parent directory and in any ancestor directory of that file. To indicate when the updated attribute is not yet reflected in the corresponding metric of the parent directory, a value of the metric unreconciled in the parent directory indicates a different value than the metric reconciled to parent directory. Each attribute of the file for which a metric value is stored in a parent directory can maintain these unreconciled to parent and reconciled to parent values. When these values differ, it indicates to the facility that the parent directory of that file needs to be updated by the difference between the values during a subsequent I/O operation.

In some embodiments, the facility maintains a separate "list" of filesystem objects having unreconciled data in a filesystem tree instead of, or in addition to, indicating the value of the unreconciled to parent data in the inode data of each filesystem object. In some embodiments, the facility maintains this separate list in volatile memory. Maintaining this list and performing a reconciliation process due to block count, or other attribute changes in a filesystem object, are further discussed with reference to FIGS. 7A-7E.

Referring back to FIG. 5, in some embodiments, the inode data and the second portion of the filesystem object data can be stored at specific location in a block storage unit used to store the filesystem object. For example, in some embodiments, the facility can store a pointer to that specified storage location to obtain the requested data. The filesystem object data includes data such as the payload or actual file data for that filesystem object. For example, in a directory, the data may include information pertaining to the files contained by that directory, such as the file paths and paths to any child directories. Accordingly, the directory data includes information for each file accessible via that directory and the location of the file. Each file contained by a directory may be included in various other directories in the facility as well. For example, as shown in FIG. 4, directory /A 404 defines a subtree made up of directories /A 404, /B 408, /E 410, each of which may contain various data files. The filesystem object for directory /A 404 therefore may store inode data having aggregated values for each of the files contained by /A, /B, and /E, and directory data including paths for each of those files. Any additional file-related or directory-related data within the scope of the present disclosure may also be stored in the second portion of the filesystem object.

Figure 6:
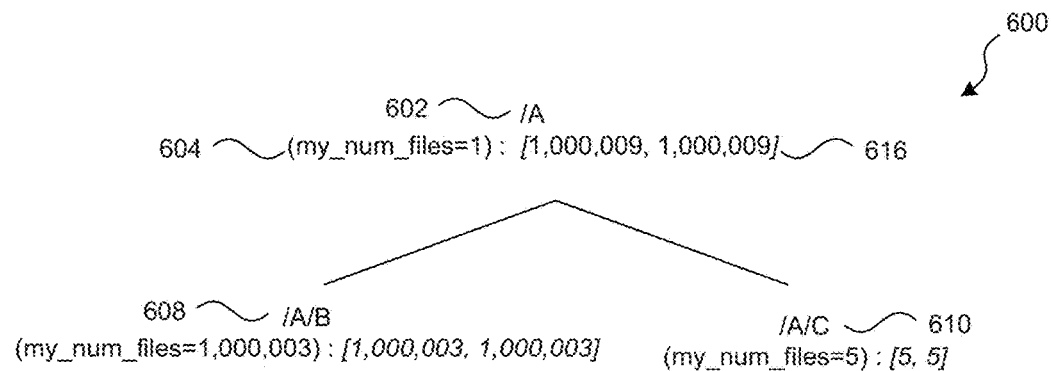
FIG. 6 illustrates an example of a subtree of file system objects in accordance with one or more of the various embodiments.

FIG. 6 illustrates an example subtree 600 of filesystem objects including at least one attribute and associated metric value for each filesystem object in that subtree. The subtree is defined by a directory /A 602. The subtree 600 may be located in a larger filesystem tree structure, such as the filesystem tree 400 shown in FIG. 4, which is defined by the root directory "l" 402. In the illustrated embodiments of FIG. 6, each filesystem object includes three values. The my_num_files 604 value of "1" in directory /A 602, is an attribute indicating a number of files contained by that particular directory (local file count). The second two values, represented in an ordered pair 616, indicate a reconciled and an unreconciled metric value [reconciled, unreconciled] for that attribute (num_files) in a parent directory (e.g., "l" in FIG. 4) of directory /A 602. In the ordered pair 616, the right value is a value of that metric that is unreconciled in the parent directory [1,000,009, 1,000,009] and the left value is a value of the metric that is reconciled in the parent directory [1,000,009, 1,000,009]. This ordered pair indicates whether the metric value in the parent of the filesystem object (e.g., directory /A 602) fully reflects any updates to that attribute (num_files) in any descendant filesystem object. In FIG. 6, since both metric values 616 in the ordered pair are equal, the corresponding metric in the parent directory (e.g., "/" in FIG. 4) fully reflects the updated metric value.

In FIG. 6, the num_file metric value is a hierarchical aggregate of the number of files (num_files) contained by each descendant directory (e.g., /B 608, /C 610) of that directory (/A 602) and any files directly contained by the directory itself (aggregate file count). For example, in the illustrated embodiment, a metric value (not shown) for the num_files attribute in directory /A 602 is "1,000,009". This metric value includes the aggregate values of my_num_files in each descendant directory (e.g., "1,000,003" for /B 608, "5" for /C 610), which include the aggregate values of any descendant files (e.g., FILE1, FILE2, etc.) in those descendant directories. The metric value in directory /A 602 also includes any local files, e.g., "1" 604, contained by the directory /A 602 itself for which that metric value is calculated. Accordingly, when a client requests a metric value for an attribute of a directory in a filesystem tree, which defines a subtree, that value reflects an aggregation of the attributes in any descendant directory plus the attributes of the directory on which the aggregation is performed.

For a large filesystem tree structure including many directories, performing an aggregation operation on all filesystem objects in that filesystem tree can consume considerable processing resources and elapsed time to determine a metric value for a given directory. However, as previously discussed, these additional metrics that include aggregate values of file attributes and aggregated values of ADS, may be stored in the inode data for each directory. The inode data may be updated each time a filesystem object is updated. This inode data maintains a relatively accurate indication of the attributes for a given directory, even if recent changes to one or more files in that directory are not yet reflected. Accordingly, this allows for rapid and easy access to current filesystem attributes, which may facilitate performance and allocation of resources in both large or scalable filesystems FIGS. 7A-7E illustrate at least one method for updating attributes and associated metric values in filesystem objects of a filesystem tree. The method tracks each filesystem object to which a change is applied in a file path from the updated file to the root directory. To implement such tracking, references or pointers to modified filesystem objects may be added to a set of unreconciled filesystem objects, one or more of which is iteratively updated in the tree during a subsequent operation. For example, the set 722 may be a list of unreconciled filesystem objects maintained in a filesystem tree. Accordingly, the set 722 of filesystem objects may include both files and directories whose attributes have been changed, but not yet updated to reflect the change, and which may require an update to an ancestor filesystem object.

Figure 7A:
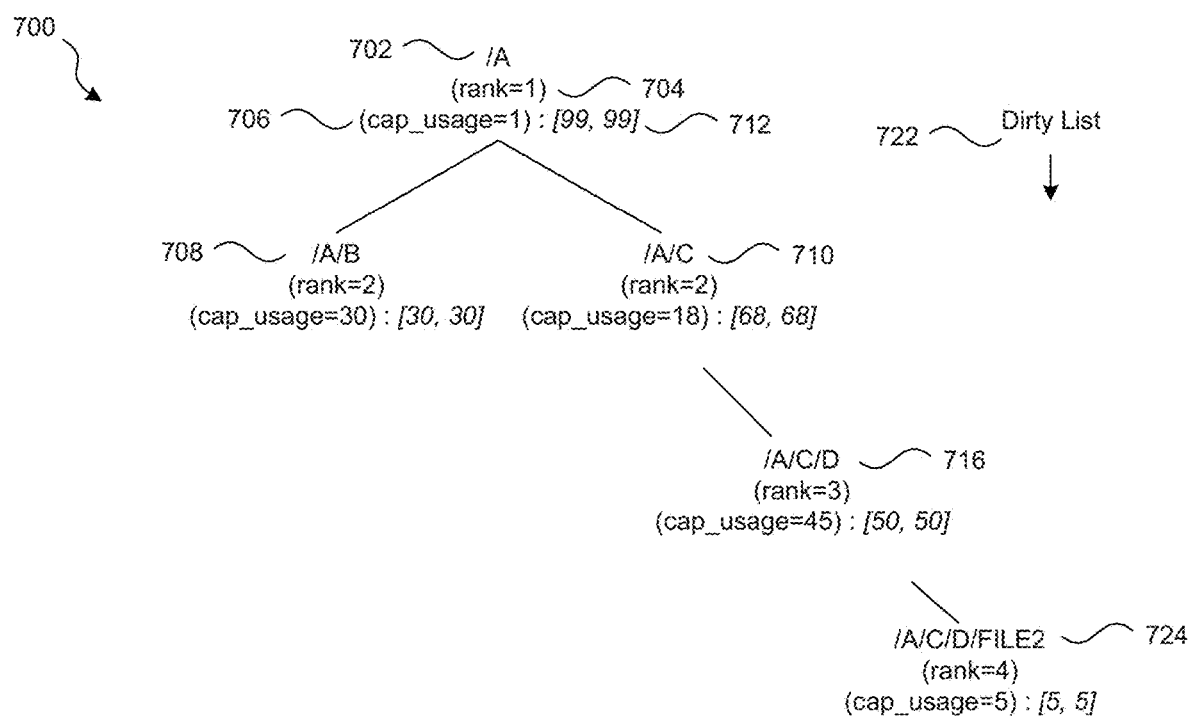
FIG. 7A is example of a tree structure for data stored in a filesystem in accordance with one or more of the various embodiments.

FIG. 7A is example of a tree structure for data stored in a filesystem, such as for directory /A shown in FIG. 6. The filesystem tree 700 includes a directory /A 702 and various descendant directories /B 708, /C 710, and /D 716, and a file FILE2 724 of the directory /A 702. The directories and file also indicate two attributes that the facility maintains in the inode data stored in each filesystem object, which is either a directory or a file. For example, in directory /A 702, the two attributes include a rank 704 and a capacity usage (cap_usage) 706. The rank indicates a level of the filesystem tree in which the filesystem object is located. For example, the directory /A 704 indicates "rank=1" since it is at the top of the tree hierarchy (and, a first descendant of the root directory "/" in FIG. 6). The filesystem object's capacity usage 706 identifies a number of blocks used by a particular filesystem object as discussed with reference to FIG. 3. In FIG. 7A, directory /A 702 has a cap_usage of "1", though the aggregate cap_usage of the sub-tree defined by directory /A 702 has a cap_usage of "99" (i.e., 5 (FILE2)+45 (/D)+18 (/C)+30 (/B)+1(/A)=99). Though the rank and cap_usage are attributes used in the updating process of the following description, it is understood that various additional attributes are considered and either or both the rank and cap_usage are not required attributes within the facility.

The filesystem tree in each of FIGS. 7A-7E also indicate an ordered pair [reconciled, unreconciled] 712 providing the value of the cap_usage metric for the reconciled to parent block count and the unreconciled to parent block count in each filesystem object in that tree 700. These values 712 indicate whether changes to the block count value in each filesystem object have been updated (e.g., are current) in the parent directory of that respective filesystem object. Accordingly, in some embodiments, if all updates have been reconciled to a parent directory of a given filesystem object, the reconciled cap_usage and unreconciled cap_usage ordered pair 712 are equal. FIG. 7A illustrates such an embodiment since the aggregate block count in the ordered pair 712 is equal [99, 99].

Figure 7B:
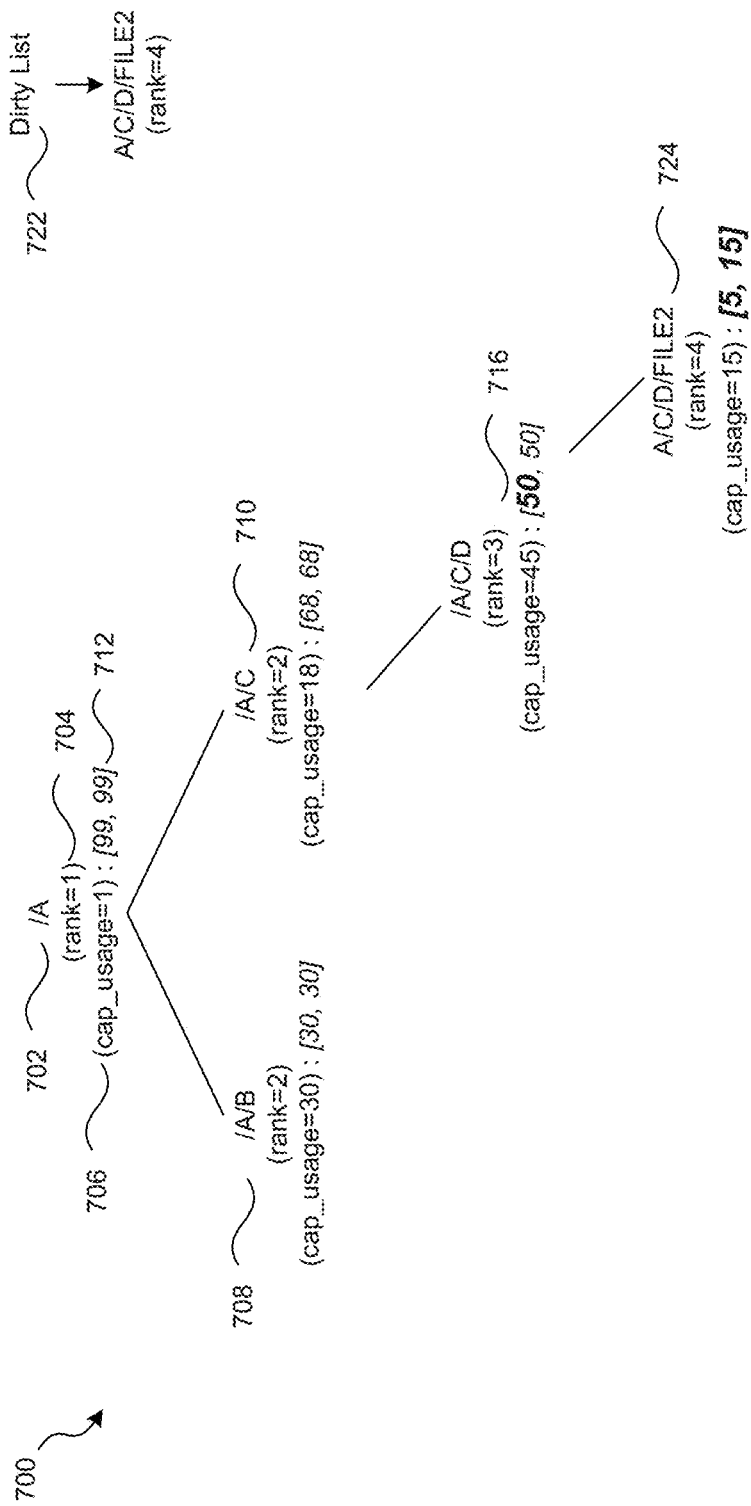
FIG. 7B illustrates a filesystem tree after changes are made to a file in accordance with one or more of the various embodiments.

FIG. 7B illustrates the filesystem tree 700 after changes are made to FILE2 724 in directory /D 716. When the changes are made to a file, in some embodiments, the changes are immediately reflected in the attribute values stored among the inode data for that filesystem object. Accordingly, FILE2 724 reflects an updated cap_usage of "15". However, FILE2 724 is still considered "unreconciled" since the changes to that file still need to be reflected in the directory data and the attributes stored in the inode data of the directory /D 716 which contains FILE2 724. As a result, FILE2 724 is then added to a separate file for a set 722 of "dirty" filesystem objects. The set 722 tracks the filesystem objects requiring an update to reflect changed attributes of a changed file (e.g., FILE2) in that directory (e.g., /D). A "dirty" filesystem object is also indicated in reconciled and unreconciled values (e.g., FILE2 724) that provide differing numbers (e.g., [5, 15]) for reconciled and unreconciled block counts in its parent directory /D 716.

Figure 7C:
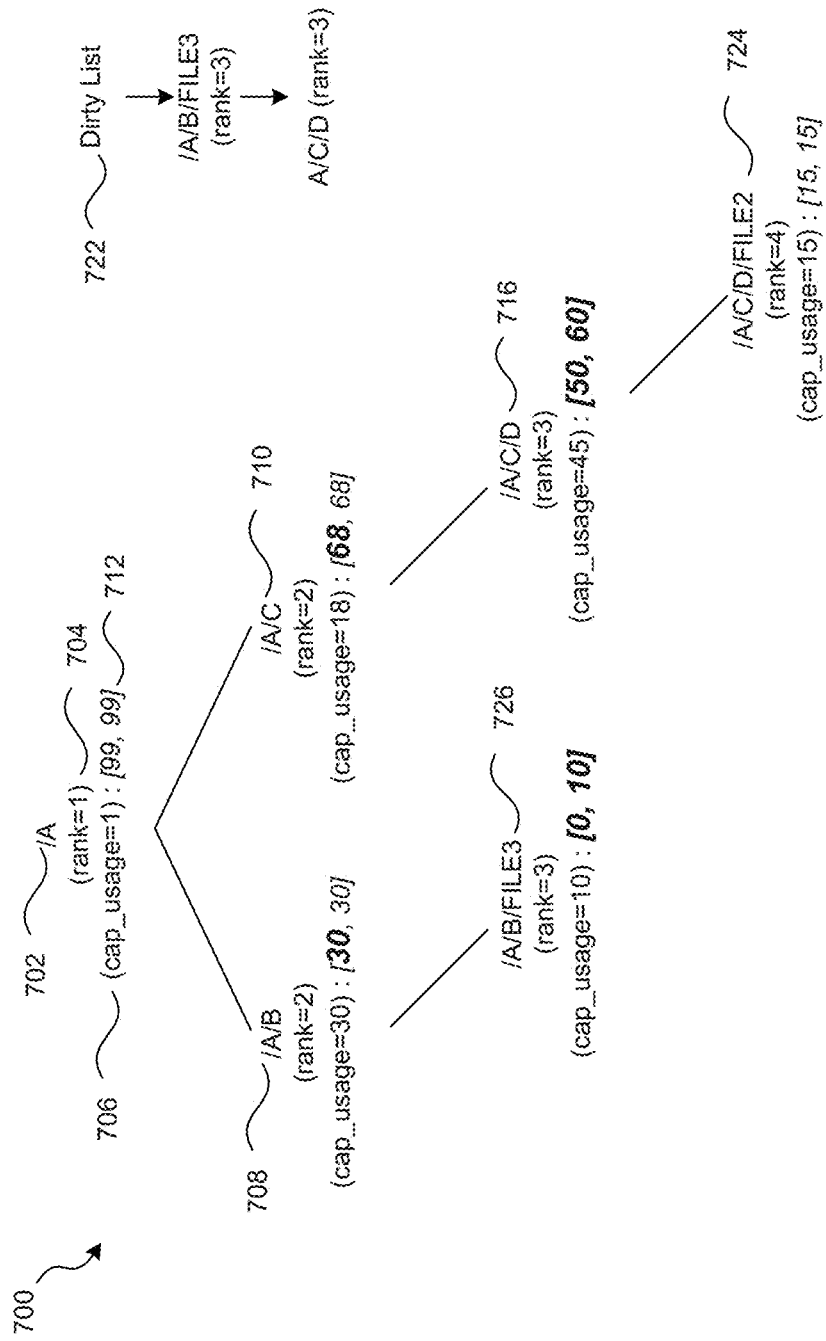
FIG. 7C illustrates a filesystem tree structure in which the change to a file is subsequently updated in the inode data associated with directory in accordance with one or more of the various embodiments.

Once the corresponding metrics in the inode data for FILE2 724 have been updated in directory /D 716, the next associated ancestor filesystem object in the file path from FILE2 724 to the root directory (not shown), is added to the set 722 of dirty filesystem objects being tracked for updating. So, after reconciliation is performed in FIG. 7B, the next filesystem object added to the set 722 is directory /D 712 (shown in FIG. 7C). This is because the new value of the cap_usage attribute may alter at least one metric value of the aggregated attributes stored in the inode data of the parent directory /C 710, which contains directory /D 716 (and FILE2 722). Additionally, the reconciled and unreconciled block counts in FILE2 724 are then updated [15, 15] to reflect the reconciled updates to the aggregate metrics in directory /D 716. The reconciled and unreconciled counts in directory /D 716 are also updated to reflect the unreconciled blocks [50, 60] in its parent directory (/C 710) as illustrated in FIG. 7C.

In various embodiments, the facility stores the set 722 of dirty filesystem objects either as persistent data (on-disk) or volatile data (in-memory), each of which has its advantages and disadvantages. For example, where the set 722 stored in persistent storage, no initial inode scan is necessary at startup, but updates to each filesystem object are slower than when the set 722 is maintained in volatile storage. Where the set 722 is stored in volatile storage, normal operations are performed faster, but an initial inode scan is required at startup.

In some embodiments, if more than one filesystem object is located in the set 722, the filesystem object having the lowest rank (e.g., farthest file path length from the root directory) in the filesystem tree may be updated first such that its attributes indicate the updated cap_usage value. This ensures that all updates to filesystem objects in the filesystem tree are not repeated, which improves the efficiency of the facility. The filesystem objects within the set 722 of filesystem objects to be updated may be reconciled in an iterative process. Additionally, the filesystem objects in the set 722 may be sorted in order to remove duplicates and to update entries having the lowest rank first. This may be done to avoid unnecessary and repeated updates to a filesystem object whose descendent also is included in the set 722.

As discussed previously, any updates to a filesystem object may be reflected in hierarchical aggregates indicated by the metric values stored in the inode data for each filesystem object. Once a filesystem object is updated, the filesystem object's entry in the set 722 is removed and the filesystem object's parent directory is added to the set 722. Additionally, the reconciled and unreconciled values for that attribute are updated to reflect the unreconciled data in that filesystem object's parent directory. The metric values indicated in each filesystem object may be updated in a direct path of the directories from the updated file to the root directory. Thus, only the filesystem objects in the path of the file to the root directory need be updated. Unaffected filesystem objects and subtrees are therefore not traversed or updated. So, system resource consumption may be reduced, relative to the time required for iterative scans of the full filesystem tree, and metric values of filesystem object attributes may be updated more quickly since system resources are not allocated to perform unnecessary tasks.

In some embodiments, where the facility receives a request for metric values in a "dirty" filesystem object (i.e., in set 722, or a descendant thereof in set 722), the facility may update the filesystem object (and any descendants) in the set 722 prior to servicing the request. In some embodiments, the facility may update all filesystem objects in the set 722 prior to servicing a request by a user. In such embodiments, the facility may ensur up-to-date metrics for the request. To alternatively determine whether a filesystem object (or descendant thereof) is not completely current, the facility can also check the reconciled and unreconciled count for each descendant of that filesystem object. If any counts differ, the facility can then either update each of the descendants to the requested filesystem object prior to servicing the request, or update the entire tree to the root directory, as previously mentioned, FIG. 7C illustrates the filesystem tree structure 700 in which the change to FILE2 716 is subsequently updated in the inode data associated with directory /C 710. This is indicated by the differing reconciled and unreconciled values [50, 60] of the ordered pair in directory /D 716, which signify that only fifty blocks are currently reconciled in directory /C and sixty blocks need to be reconciled to make the metric values stored in directory /C current. The reconciled value "68" in the ordered pair of its parent directory /C illustrates where the update is to be applied. Accordingly, the set 722 of filesystem objects reflects an entry of directory /D 710. The set 722 of filesystem objects also includes a newly added filesystem object, FILE3 726, for which the cap_usage of "10" needs to be updated in the cap_usage metric of its parent directory /B 708. Accordingly, FILE3 indicates reconciled and unreconciled ordered pair values of [0, 10] since 10 blocks need to be added to the reconciled block count (i.e., "30") in directory /B 708 to make that directory's aggregate attributes current.

As shown in FIG. 7C, directory /D 716 and FILE3 726 may concurrently be processed during the next iteration since both have a rank of "3". In some embodiments, each iteration, or processing of filesystem objects in the set 722 of filesystem objects, removes filesystem objects on corresponding levels (e.g., "rank" in FIG. 7C) of the filesystem tree structure. In other embodiments, each filesystem object in the set 722 may be processed and updated sequentially, based on the order in which that filesystem object is placed in the set 722. In the aforementioned embodiment, one or more entries in the set are processed during each iteration.

Figure 7D:
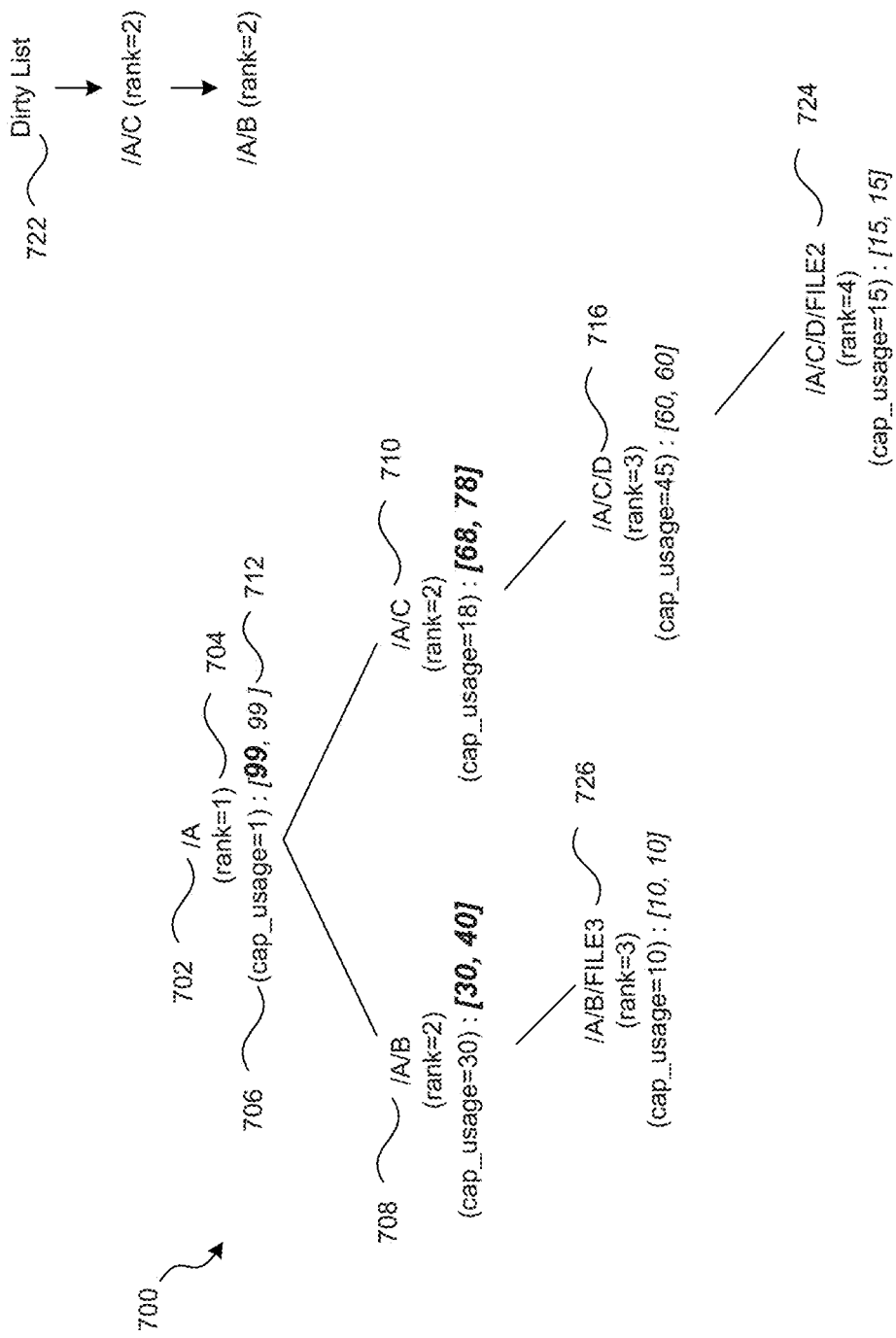
FIG. 7D illustrates a tree structure in which a directory and a file reflect processed updates processed in accordance with one or more of the various embodiments.

FIG. 7D illustrates a tree structure 700 in which directory /D 716 and FILE3 726 reflect the updates processed during the iteration performed in FIG. 7C. Accordingly, the cap_usage aggregate attribute in the inode data for directory /B 708 reflects an updated unreconciled to parent metric value of "40" in the ordered pair values [30, 40] in that directory.

Similarly, directory /C 710 reflects an unreconciled value of "78" in the ordered pair [68, 78]. These unreconciled values both reflect unreconciled cap_usage metrics in the common parent directory /A 702 as well as indicate those directories as being "dirty". So, these parent directories (/C and /B) in the direct path of the processed filesystem objects (/D and FILE3) are added to the set 722 of filesystem objects to be updated. The set 722 then includes directories /B 708 and /C 710, which are concurrently processed during the next iteration because both are rank "2" in the filesystem tree 700. The reconciled and unreconciled values in FILE3 726 and directory /D 716 are also updated to indicate updates applied to their respective parent directories and those filesystem objects are then removed from the set 722 of filesystem objects.

Figure 7E:
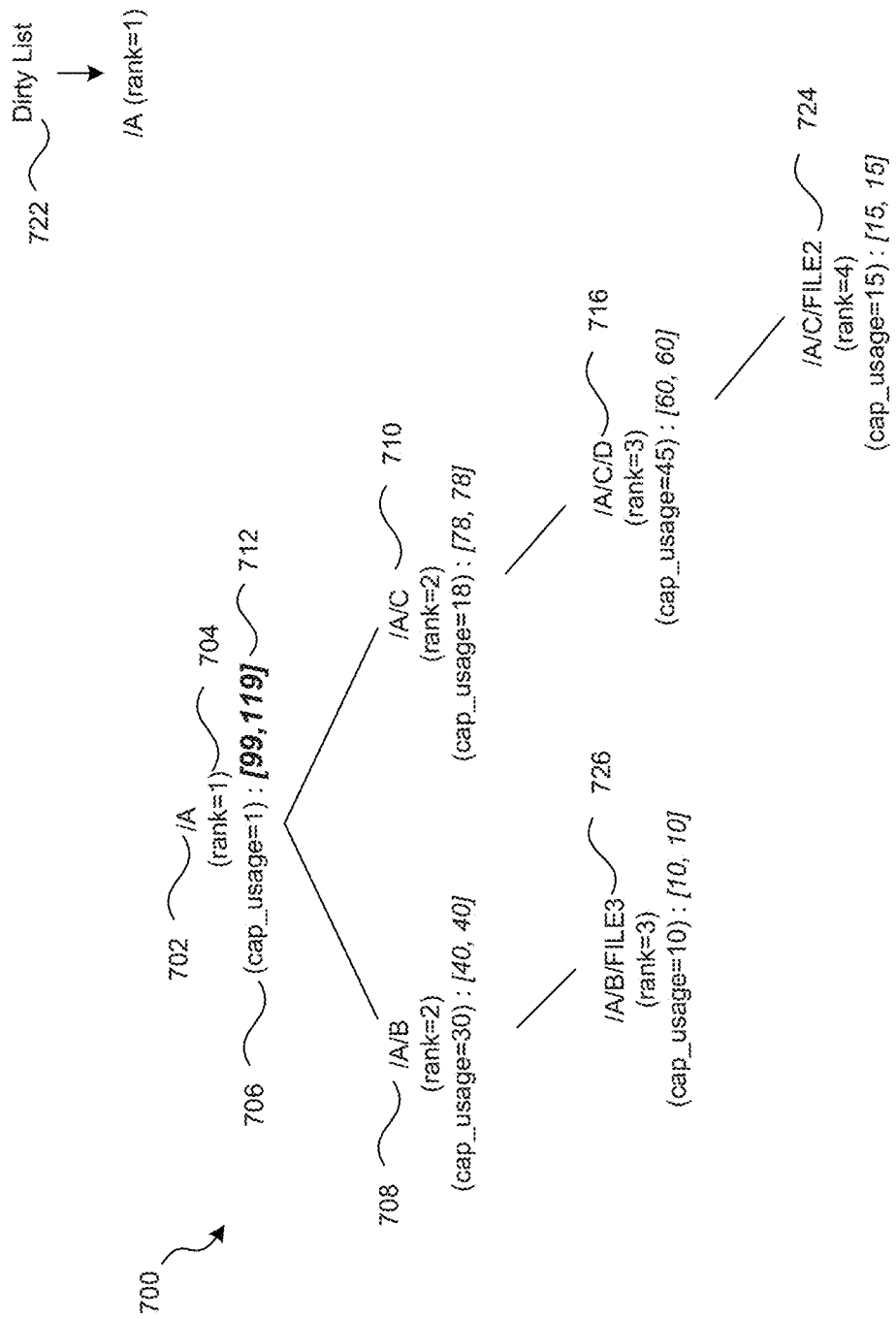
FIG. 7E illustrates directories that have been processed in accordance with one or more of the various embodiments.

Once directories /B 708 and /C 710 are processed, as illustrated in FIG. 7E, directory /A is then added to the set 722 of dirty filesystem objects. Since that directory is the parent directory for both /B 708 and /C 710, the duplicate entry is removed in order to prevent unnecessary processing of directory /A on the next iteration. The reconciled to parent and unreconciled parent values 712 for directory /A 702 are also updated to reflect an unreconciled cap-usage value (99, 119) in its parent directory (not shown). The reconciled and unreconciled values in directories /B 708 [40, 40] and /C 710 [78, 78] can also be updated to indicate an updated aggregate metric value in the parent directory (/A). Once directory /A 702 has been processed in a similar manner during the next iteration, directory /A 702 will be removed from the set 722 and the value for that filesystem object attribute will also be updated to "119". Accordingly, the ordered pair will be [119, 119].

An alternative approach to update the aggregate metric value in, for example, directory /A 702 (in FIG. 7D), is to take the difference between the reconciled and unreconciled values for cap_usage in both directories/B 708 and/C710, sum (e.g., sum ( )) those differences, and add that sum to the cap usage metric value stored in directory /A 702. For example, in directory /B 708 the difference [30, 40] is "10" and in directory /C 710 the difference [68, 78] is "10". So, "20" is the sum of those differences, which is then added to a prior stored, or reconciled value ("99") for cap_usage in directory /A 702. If during this update a change occurred to a lower ranking filesystem object in the filesystem tree (e.g., /D 716), prior to processing the update on directory /A 702, then directory /A 702 would remain in the set of filesystem objects 722 until directory /D 716 is processed. Each lower ranking filesystem object (e.g., from /D up) will then be processed in a similar manner described above, prior to directory /A 702. This prevents additional processing on directory /A 702, such that all updates on that directory may be processed in the same iteration and reflect the most current update to cap_usage (or other attribute) in the inode data of that directory.

Accordingly, in some embodiments, the facility updates a directory's aggregated metric value for a specific attribute by summing a difference between the reconciled and unreconciled values in a child directory with the metric value previously stored in that directory. In another example, referring back to FIG. 7B, each directory and file maintains a count of [reconciled, unreconciled] data to facilitate aggregation of filesystem object attributes. The difference between the unreconciled data in directory /D is equal to "10" (reconciled=50, unreconciled=60). So, to determine the metric value for that attribute of cap_usage in directory /A/C, the filesystem simply sums "68" plus the difference "10" to perform the aggregation. This value can be verified, or alternatively determined, by recalculating values of all entries in directory /C to generate a new aggregate value.

Though the aforementioned embodiments maintain a separate list (e.g., the set of filesystem objects 722) to update metrics in the facility, the metrics can be updated by other methods which do not include such a list or associated filesystem object ranks. For example, in some embodiments, the facility ensures the currency of all of the metrics in the entire filesystem tree each time a filesystem object is updated. In effect, each time a filesystem object is updated, the system traverses the filesystem tree in which that filesystem object is stored to the root directory and updates the metrics in each directory of the direct path from the filesystem object location in the filesystem tree until the root directory is updated to also reflect the update. In some embodiments, an asynchronous, or background process continually traverses trees accumulating and updating metric values for file attributes in the filesystem objects.

To handle filesystem object updates such as deletion of a file or directory from a filesystem tree, the reconciled and unreconciled data for each ancestor directory can be updated in a similar manner as previously described with reference to FIGS. 7A-7E. However, instead of adding the difference between the reconciled and unreconciled values in the filesystem object, the value of the deleted filesystem object is considered a negative unreconciled value in the parent directory associated with that filesystem object. Accordingly, the difference between the reconciled value in the deleted filesystem object and the unreconciled value in the parent is subtracted from the parent's reconciled value during a subsequent operation. Based on this adjustment, each directory in a path from the parent of the deleted filesystem object to the root is ultimately updated normally, such as through the process described in FIGS. 7A-7E (i.e., placing each filesystem object on a separate list 722). Furthermore, any unreconciled value in the deleted filesystem object is ignored since that filesystem object is being removed from the filesystem tree. To handle updates such as renaming a filesystem object, e.g., moving the filesystem object to another directory, the facility performs the aforementioned deletion process under the current name, and creates a new filesystem object under the new name, such as described in FIG. 7C with reference to FILE3. If the filesystem object had any unreconciled data, e.g., differing values in the ordered pair, the unreconciled value remains consistent throughout the deletion and creation process. The updating process for the unreconciled data then occurs normally (e.g., via the process in FIGS. 7A-7E) during a subsequent iteration on the renamed filesystem object.

For filesystem object attributes not having integer values, metric values can be updated by aggregation functions (e.g., latest( )) which compare a prior value of that respective value in each filesystem object being updated. For example, the attribute can include an raccess attribute identifying a most recent access date/time ("atime") of the filesystem object. The facility can compare the previous raccess date in a directory with an updated raccess date received from a descendant filesystem object, as opposed to looking at the raccess dates of all of the descendants in a subtree defined by that directory. For certain metrics and/or aggregation functions, a new aggregation can be performed across all filesystem objects in a tree or subtree in order to update metric values.

In some embodiments, the facility retrieves information about characteristics of a node, a cluster, or the entire filesystem from statistical sampling of a filesystem tree. The facility chooses the fraction of samples taken from files in each directory of the filesystem tree in such a way as to achieve a sample population that is appropriately distributed across the filesystem tree. In some embodiments, the facility determines the overall number of samples taken to satisfy a desired confidence level in the results.

Figure 8:
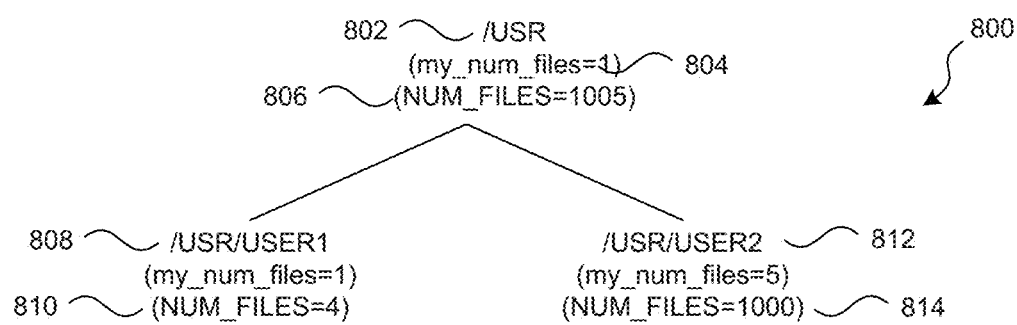
FIG. 8 illustrates an unbalanced filesystem subtree in accordance with one or more of the various embodiments.

FIG. 8 illustrates an unbalanced filesystem subtree 800 defined by a directory /USR 802, which has two child directories, directory /USER1 808 and directory /USER2 812. The shown subtree includes two file types, music 818 and other (non-music) data 822, specific to each of the child directories. In an example, the facility performs sampling using block count attribute (i.e., cap usage) to answer the question, "what percentage of files stored in the subtree are music files?" Where the directory /USER1 808 includes only four data files 810, while the directory /USER2 812 includes one thousand music files 814. A simplistic even sampling performed on the root directory /USR 802 would result in a sample from each of the descendant directories 50% of the time. Accordingly, the sampling would result in a 50/50 split of music and data files in the root directory /USR 802. Since the file count attribute for each directory, /USER 1 808 and/USER 2 812, indicates that the root directory /USR 802 is not made up of 50% music files and 50% data files, these sampling results are clearly skewed and inaccurate. Thus, this approach to sampling may result in the erroneous conclusion regarding the makeup of a particular directory.

To avoid the aforementioned errors, the facility uses a fair sampling approach in which it uses the metric values stored in the inode data of the directories to weight these directories in a manner that determines the likelihood that each file sample gets taken from each directory. By weighting the directories in this way, the facility achieves an improved representative sampling of the composition of the data in the filesystem tree structure. Additionally, since any attribute of a filesystem object can be utilized to weight the directories, the representative sampling is improved for each individual filesystem attribute.

To perform fair sampling on the filesystem subtree 800, the facility uses, for example, a NUM_FILES attribute associated with each directory to establish sampling frequency weights for each directory of the filesystem tree. The NUM_FILES value is the total number of files associated with a directory summed with the files in all descendant directories. Using this NUM_FILES attribute therefore answers the question, "what percentage of files are music files?" So, the total number of files to be sampled between the two directories/USER1 808 and/USER2 812 for the root directory /USR 802 is 1004 since the NUM_FILES attribute 806 for the root directory indicates "1005" and the my_num_files attribute for the root directory indicates "1". By storing the aggregate file count in the inode data (e.g., 816, 820) of each directory, the system can quickly query those directories and determine that the files under directory /USER1 808 should be sampled "4" times out of every "1004" samples, or approximately 0.4% of the time, and the files under directory /USER2 812 should be sampled "1000" times out of every "1004" samples, or 99.6% of the time. If one hundred samples are taken in this manner, the sample results would indicate ~99% of the files are music files in the root directory /USR 802. This result is more accurate than the 50% music files calculated without using the metric values corresponding to the aggregated attributes of the files contained by the root directory /USR 802. This type of weighted sampling may be applied to any attribute of files within a filesystem tree in the facility and may facilitate improved visibility into the files contained by that tree. For example, weighted sampling may be used to determine a file size for two directories including unbalanced average file sizes, e.g., one includes .mp4 files and the other includes .doc files.

Figures 9A, 9B:
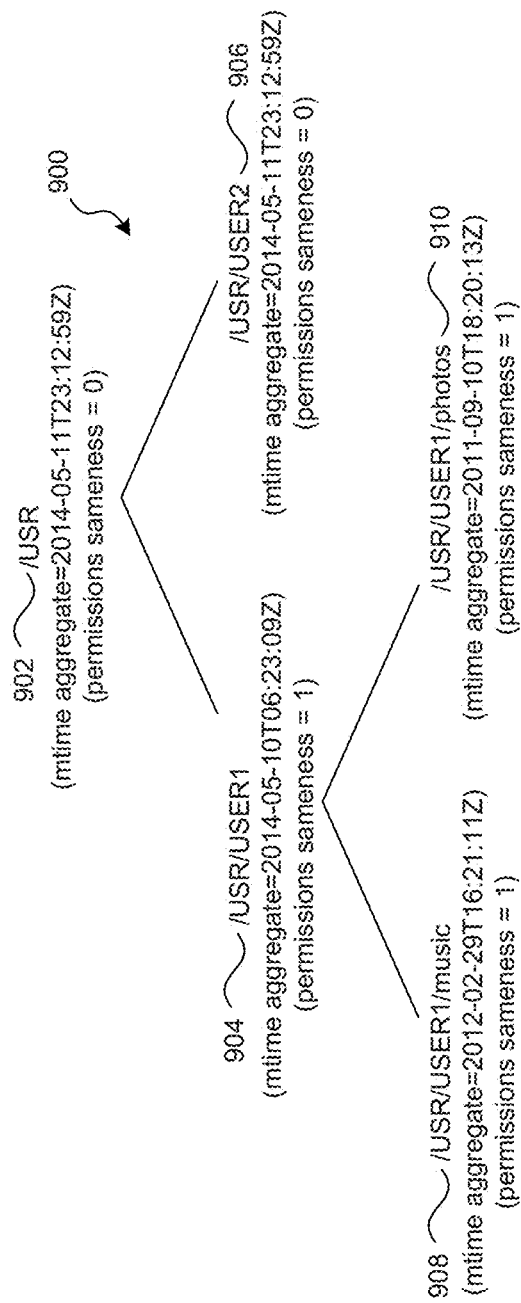
FIG. 9A illustrates a filesystem subtree illustrating time-based aggregates and sameness bits in accordance with one or more of the various embodiments.
FIG. 9B illustrates a data structure that includes a sample of files within a subtree in accordance with one or more of the various embodiments.

FIG. 9A illustrates a filesystem subtree 900 illustrating time-based aggregates and "sameness bits" in accordance with embodiments of the facility. In this example, aggregations of last modified times ("mtime") associated with files in the filesystem subtree 900 are shown. Subtree 900 includes five folders 902, 904, 906, 908, and 910. In an example, the facility generates an mtime aggregate for each folder by identifying, for each folder, the mtime for all of the files in that folder (and subfolders) and sets an mtime aggregate for that folder as the mtime of the most recently modified file in the folder or its subfolders. In this manner, the most-recently modified file determines the mtime aggregate for the folder storing that file and each folder above that folder in a directory tree. In this example, the file with the most recently modified file in subfolder 908 has an mtime of 2012-02-29T16:21:11Z and the most recently modified file in subfolder 910 has an mtime of 2011-09-10T18:20:13Z. The time-based aggregations enable efficient searching of files or folders that have time-based attributes within a specified range, including open-ended ranges. For example, if a user is searching for all files with an mtime after May 10, 2014, the facility can skip searching files and folders within folder 904 because its mtime aggregate is 2014-05-09T23:12:59Z, which is before May 10, 2014. In some embodiments, the facility stores aggregate MAX and MIN values for attributes, such as a MAX mtime aggregate and a MIN mtime aggregate. Thus, if the user is searching for all files with an mtime between Jan. 1, 2011 and Dec. 31, 2013, then the facility can use the MAX and MIN mtime aggregates to quickly determine whether a folder can be skipped (i.e., if the MIN mtime aggregate is greater than the upper bound of the range specified by the query or the MAX mtime aggregate is less than the lower bound of the range specified by the query). As another example, if the user is searching for the most recently-modified file(s), the computing system can skip folder 904 since its aggregate mtime is earlier than the aggregate mtime of folders 902 and 906. Thus, the computing system will find the most recently-modified file(s) in folder 902 and/or folder 906. In this manner, the facility improves the speed and efficiency with which a computing system can identify files relevant to a query, such as a user-generated search.

FIG. 9B is a table that includes a sample of files within the folders represented in subtree 900 and their corresponding mtimes and access permissions. For example, file/USR/file1 has an mtime of 2010-01-19T06:53:59Z while file/USR/USER1/photos/file2 has an mtime of 2011-09-10T18:20:13Z. The user permissions listed represent the access permissions for each of three classes: owner, group, and other. In this example, the access permission represents Unix permissions in an octal (base-8) notation. The access permissions for/USR/file2 and /USR/USER2/file1 are read, write, execute for the owner class and read-only for each of the other classes. The access permissions for each of the other files are read, write, execute for the owner class and read, execute for each of the other classes.

Figure 10:
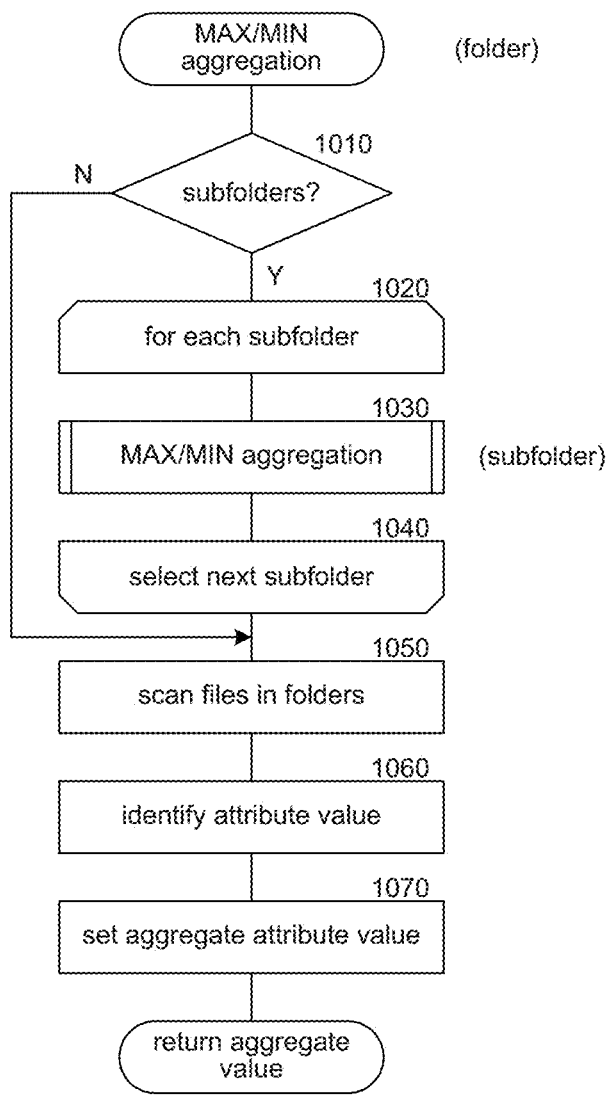
FIG. 10 illustrates a flow diagram for a max/min aggregation component in accordance with one or more of the various embodiments.

FIG. 10 is a flow diagram illustrating the processing of a max/min aggregation component in accordance with embodiments of the facility. The facility invokes the component to determine an aggregate value for a folder and the folders in its subtree. In this example, the component has been invoked to determine an mtime aggregate for folder 902. In decision block 1010, if the folder contains any subfolders then the component continues at block 1020, else the component continues at block 1050. In blocks 1020-1040, the component loops through each of the subfolders to determine aggregates for each subfolder. In block 1030, the component recursively invokes the max/min aggregation component for the currently-selected subfolder. For example, when processing folder 902, the component recursively invokes the max/min aggregation component for each of folders 904 and 906 (and 908 and 910 through its processing of folder 904). In block 1040, the component selects the next subfolder and then loops back to block 1020. If all of the subfolders have already been selected then the component continues at block 1050. In block 1050, the component scans all of the files in the folder to identify the file with the extreme attribute value for the aggregation. For example, if a MAX "last accessed" or "atime" attribute is being aggregated then the component identifies the file with the latest (most recent) atime attribute. As another example, if a MIN "date created" or "birthtime" is being aggregated then the component identifies the file with the earliest (oldest) birthtime. In block 1060, the component identifies the extreme attribute from among the identified file and the subfolders of the currently-selected folder. For example, the file with the most recently mtime within folder 904 has an mtime of 2014-05-10T06:23:09Z while its subfolders 908 and 910 have aggregate mtimes of 2012-02-29T16:21:11Z and 2011-09-10T18:20:13Z, respectively. Accordingly, the aggregate mtime value for folder 904 is 2014-05-10T06:23:09Z (i.e., most recent access for all files and subfolders within folder 904). The aggregate mtime for folder 902 is 2014-05-11T23:12:59Z, the most recent access for all files and subfolders within folder 902. In block 1070, the component sets the aggregate value for the currently-selected folder and then returns the aggregate value. While the above process is described in the context of a filesystem subtree (e.g., directory structure), one of ordinary skill in the art will recognize that this process can be applied to a variety of hierarchical structures, such as a b-tree, b+tree, b*-tree, binary tree, and so on. In some embodiments, a means for generating a MAX aggregate for an attribute comprises one or more computers or processors configured to carry out an algorithm disclosed in FIG. 10 and this paragraph. In some embodiments, a means for generating a MIN aggregate for an attribute comprises one or more computers or processors configured to carry out an algorithm disclosed in FIG. 10 and this paragraph.

Figures 11A, 11B:
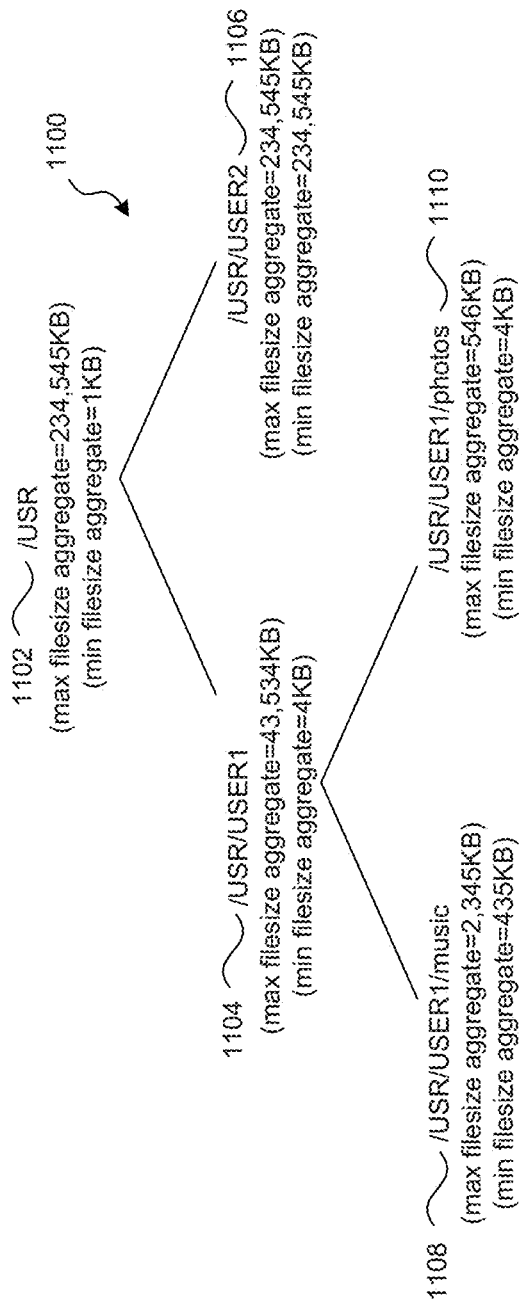
FIG. 11A illustrates a filesystem subtree illustrating max/min aggregates in accordance with one or more of the various embodiments.
FIG. 11B illustrates a data structure that includes a sample of files within folders in a subtree in accordance with one or more of the various embodiments.

FIG. 11A illustrates a filesystem subtree 1100 illustrating max/min aggregates in accordance with embodiments of the facility. In this example, MAX and MIN filesize aggregates associated with files in the filesystem subtree 1100 are reflected. The shown subtree includes five folders 1102, 1104, 1106, 1108, and 1110. In an example, the facility aggregates the min and max filesizes for each folder by identifying, for each folder, the largest and smallest files in that folder (and its subfolders). In this example, the largest file in subfolder 1108 has a size of 2,345 KB and the smallest file in subfolder 1108 is 435 KB. The MAX/MIN aggregations enable efficient searching of files or folders. For example, if a user is searching for all files larger than 50,000 KB, the facility can skip searching files and folders within folder 904 because its aggregate max filesize is 43,534 KB. As another example, if the user is searching for all files between 2,000 KB and 20,000 KB, the facility can skip searching files and folders within folders 1108 and 1106 because its MIN filesize aggregate is greater than 20,000 KB. As other example, if the user is searching for the largest file in the subtree, the system need only search in folders 1102 and 1106, since they each have the same MAX filesize aggregate. In this manner, the facility improves the speed and efficiency with which a computing system can identify files relevant to a query, such as a user-generated search. In some embodiments, the facility stores, in association with each folder, a pointer to the file or files relevant to the aggregate values. For example, a pointer to /USR/USER2/file1 and a pointer to /USR/file1 may be stored in /USR because they are the largest and smallest files under /USR, respectively. Similarly, a pointer to /USR/USER1/file2 and a pointer to /USR/USER1/photos/file2 may be stored in /USR/USER1 because they are the largest and files under /USR/USER1, respectively. In some embodiments, a pointer to a file is stored in a data structure external to the folder storing the file.

FIG. 11B is a table that includes a sample of files within the folders representing in subtree 1100 and their corresponding filesizes and time-weighted sizes. For example, file /USR/file2 is 32 KB while file /USR/USER1/photos/file1 is 546 KB. In this example, the mtimes associated with each file (see FIG. 9B) correspond to the time at which each file was added to its respective folder. In other words, the files have not been modified since they were created. Furthermore, the facility has employed a decay function producing a half-life of approximately 24 hours and uses the creation time of /USR/USER2/file1 as the base time. Thus, the time-weighted size of /USR/USER2/file1 is the same as its actual size; the time-weighted size of /USR/USER1/file1 is 7.5 KB, which is a quarter of its actual size because it was created 48 hours before /USR/USER2/file1; and the time-weighted sizes of each of the other files is 0 because they were created more than two years before /USR/USER2/file1 and the decay function results in a number smaller than a predetermined threshold (e.g., 1 byte).

Figure 11C:
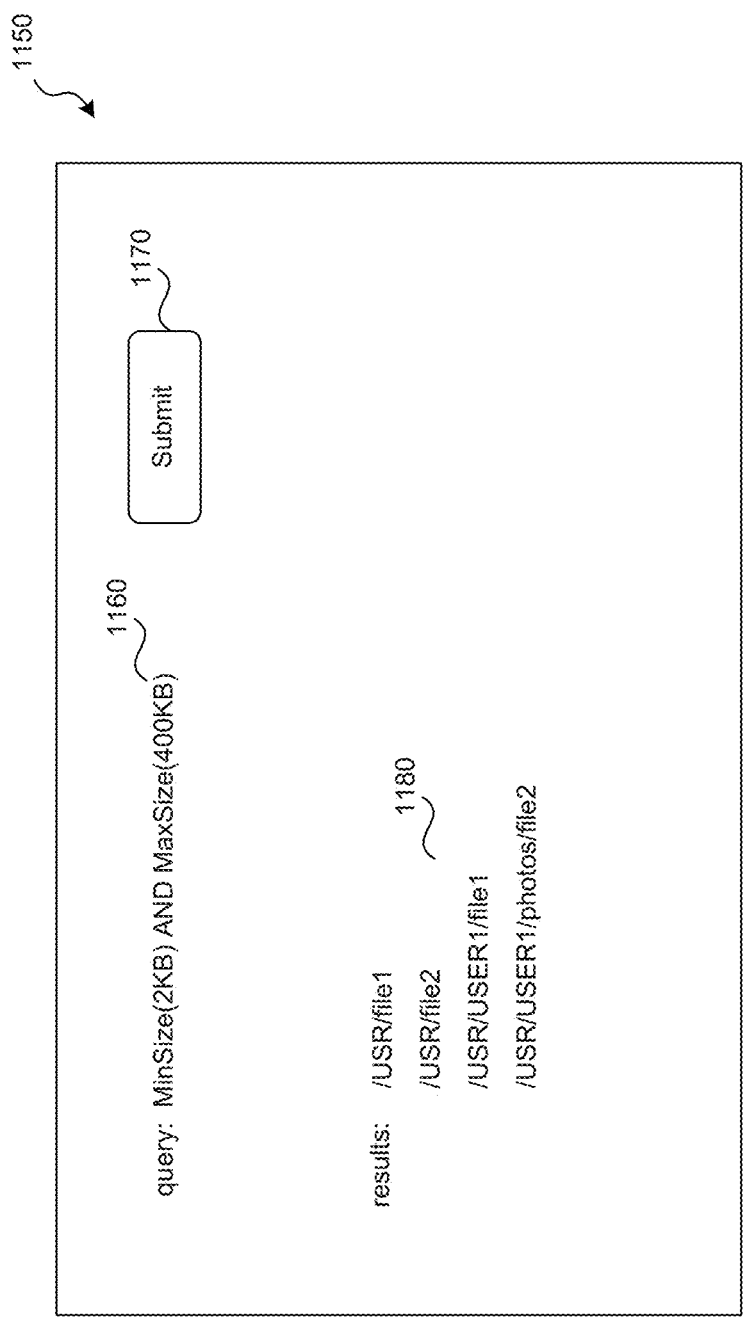
FIG. 11C illustrates query results generated in response to a query against subtree in accordance with one or more of the various embodiments.

FIG. 11C is a display page 1150 illustrating query results generated in response to a query against subtree 1100 for files satisfying a specified filesize range. In this example, a user has entered a query string 1160 specifying a filesize range of 2 KB and 400 KB using submit button 1170. In response to the query, the computing system traverses the subtree to identify files that satisfy the query based on the min and max filesize aggregates. For example, because the filesize aggregate range for folder 1102 (1 KB to 234,545 KB) includes values in the filesize range specified by the query, the computing system searches folder 1102 for files that satisfy the query. Similarly, because the filesize aggregate ranges for each of folder 1104 (4 KB to 43,534 KB) and folder 1110 (4 KB to 546 KB) include values in the filesize range specified by the query, the computing system searches folders 1104 and 1106 for files that satisfy the query. In contrast, because the filesize aggregate ranges for each of folder 1106 (234,545 KB to 234,545 KB) and folder 1108 (435 KB and 2,345 KB) do not include values in the filesize range specified by the query, the computing system can skip folders 1106 and 1108. Thus, the facility improves the rate at which a computing system searches for and identifies files relevant to a query.

Figure 12:
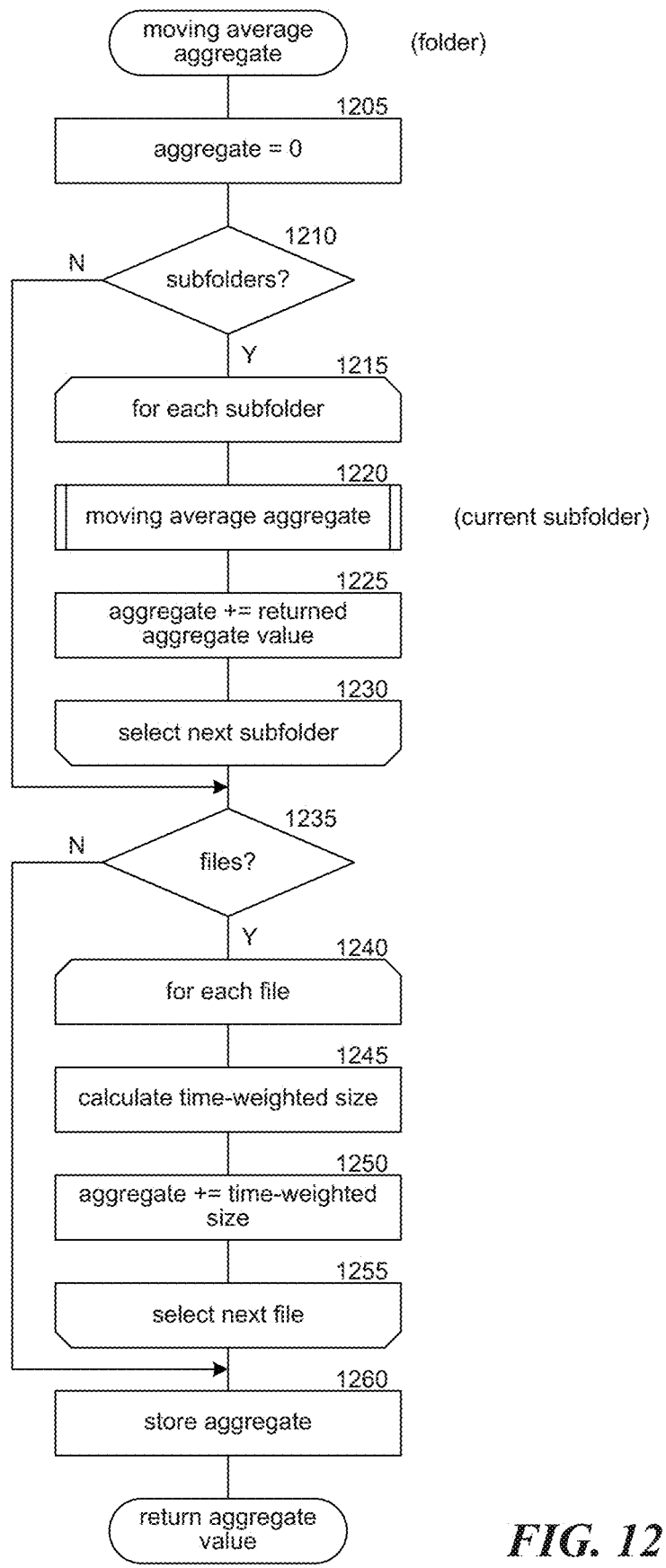
FIG. 12 is a flow diagram illustrating the processing of a moving average aggregate component in accordance with one or more of the various embodiments in accordance with one or more of the various embodiments.

FIG. 12 is a flow diagram illustrating the processing of a moving average aggregate component in accordance with some embodiments of the facility. The component is invoked to determine a moving average aggregate for a folder by recursively looping through each of its files and subfolders to determine moving averages for each and combining them into a moving average for the folder. A moving average is a "moving sum" having a particular unit (e.g., I/O operations, file reads, MB) divided by a time period to provide an average with respect to the unit (e.g., I/O operations per second, file reads per minute, 500 MB per hour). In block 1205, the component initializes an aggregate value to 0. In decision block 1210, if the folder contains any subfolders then the component continues at block 1215, else the component continues at decision block 1235. In blocks 1215 through 1230, the component selects each subfolder and calculates a corresponding moving average aggregate. In block 1220, the component recursively invokes the moving average aggregate component for the currently-selected subfolder. In block 1225, the component increases the aggregate value by the value returned by the moving average aggregate component for the currently-selected folder. In block 1230, the component selects the next subfolder and then loops back to block 1215. If all of the subfolders have already been selected then the component continues at decision block 1235. In decision block 1235, if the folder contains any files then the component continues at block 1240, else the component returns the aggregate value. In blocks 1240 through 1255, the component selects each file to calculate a corresponding moving average. In block 1245, the component calculates a time-weighted size for the currently-selected file based on the size of the file and the time at which the file was stored in the folder. For example, if the component is using the exponential decay function:

$$size_{tw} = size * e^{-t},$$

where $size_{tw}$ is the time-weighted size, size is the size of the file, and t is the difference between a base time (e.g., the current time or another time determined by the user, the system, etc.) and the time at which the file was stored in the folder. Although an exponential decay function is provided as an example herein, one of ordinary skill in the art will recognize that a variety of functions can be used, such as a linear decay function, a step or piecewise decay function, and so on. If the decay coefficient is based on a time window (e.g., $e^{-t/(time\ window)}$), then the decay approximates a moving sum for the entire window. For example, a sum of 120 units over a 60 minute moving window approximates one-minute moving average of 2 units per minute. In some embodiments, the component sets the time-weighted size to 0 if the calculated value is below a predetermined threshold (e.g., 0.05 bytes, 1 KB, 1 MB). In block 1250, the component increases the aggregate value by the calculated time-weighted size for the currently-selected file. In block 1255, the component selects the next file and then loops back to block 1240. If all of the files have already been selected then the component continues at block 1260. In block 1260, the component stores the aggregate value generated for the folder and then returns the aggregate value. While the above process is described in the context of a filesystem subtree (e.g., directory structure), one of ordinary skill in the art will recognize that this process can be applied to a variety of hierarchical structures, such as a b-tree, b+tree, b*-tree, binary tree, and so on. In some embodiments, a means for generating a moving average aggregate for an attribute comprises one or more computers or processors configured to carry out the algorithm disclosed in FIG. 12 and this paragraph.

Figure 13:
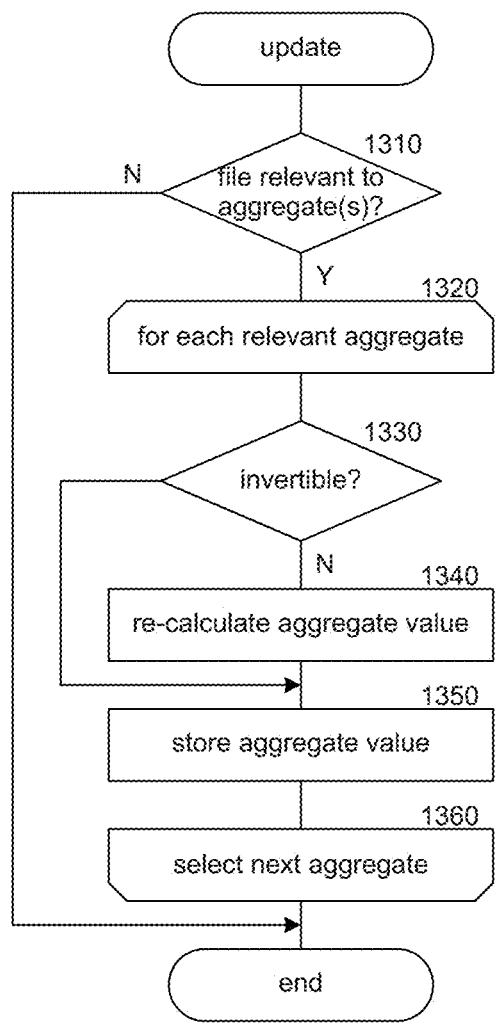
FIG. 13 is a flow diagram illustrating the processing of an update component in accordance with one or more of the various embodiments.

FIG. 13 is a flow diagram illustrating the processing of an update component in accordance with embodiments of the facility. The facility invokes the update component when there is a change to a hierarchical object, such as a file, folder, or tree node. For example, if a file is modified, added, deleted, or moved from a folder then the facility invokes the update component to update aggregate values. In block 1310, if the file has the potential to affect one or more of the aggregates currently maintained for the folder where the change the occurred (e.g., the folder storing an added or modified file, the folder from which a file was deleted), such as a checksum aggregate or an mtime aggregate for the folder that is the same as the mtime of the file, then the component continues at block 1320, else the component completes processing. As another example, if the mtime of the file is greater than the MAX mtime aggregate for the folder or less than the MIN mtime aggregate for the folder, the component facility invokes the update component. In blocks 1320 through 1360, the component loops through and updates each of the potentially affected aggregates. In decision block 1330, if the currently-selected aggregate is invertible then the component continues at block 1350, else the component continues at block 1340. In block 1340, the component re-calculates the aggregate value based on the change. For example, if a file having an mtime that is the same as the MAX mtime aggregate for the folder is deleted from the folder, then the component will search for a new file to use to update the MAX mtime aggregate based on the change. As another example, if a file is removed then a checksum aggregate can be re-calculated based on the change. In block 1350, the component stores the re-calculated aggregate value for the currently-selected aggregate for the folder and its ancestor folders. In some embodiments, a node in a filesystem tree has multiple parents, such as multiple directories or nodes containing hard links to the same file. In this case, the facility selects a "canonical" parent for the node and treats the other parents as "non-canonical" parents. Selection of the canonical parent is based on an immutable and comparable attribute of nodes, e.g. a numeric inode identifier, the order in which nodes were designated as a parent, and so on. Aggregates related to the node with multiple parents are computed as though the node is a child of the canonical parent while aggregates for the non-canonical parents are computed as if the node is not one of its children. In this manner, the node is not overrepresented in the aggregates of its parents. If the canonical parent of a node changes (e.g., due to unlinking from the current canonical parent, or linking into a new parent which becomes the canonical parent based on the selection method), the facility reconciles aggregates for the node as if it were a delete from the old canonical parent and an add to the new canonical parent. In block 1360, the component selects the next aggregate and then loops back to block 1320. If all of the aggregates have already been selected then processing of the component completes. While the above process is described in the context of a filesystem subtree (e.g., directory structure), one of ordinary skill in the art will recognize that this process can be applied to a variety of hierarchical structures, such as a b-tree, b+tree, b*-tree, binary tree, and so on. In some embodiments, a means for updating aggregates comprises one or more computers or processors configured to carry out the algorithm disclosed in FIG. 13 and this paragraph.

Graphical User Interfaces

FIG. 14 is an example screenshot of graphical user interface displayed on a client device, such a computing device. The user may elect to view various analytics 1402 regarding the filesystem, such as a particular filesystem tree structure. For example, the user may select a particular directory, e.g., root directory "/", for which to view those analytics. In response, the facility returns the one or more metric values along with a graphical representation of those metric values corresponding to a pathname 1404 indicating the selected directory. The metric values include storage data for the indicated root directory "/", such as an overall size (277.5 gigabytes) 1406 of the directory 1404, including a percentage (99.7%) of available storage capacity used by that directory, and a percentage (5.69%) of overall storage capacity used by that directory in the facility. The metric values include a recent access (raccess) date 1410 on which any file in the directory was last modified and a creation date 1408 on which the directory was created. Additionally, the metric values indicate an aggregate number (8288) of directories 1412 in the directory 1404 and an aggregate number (56877) of files 1414 in that directory.

In some embodiments, the graphical user interface indicates metric values for operations performed in a directory or its subtree. For example, a listing of the top I/Os per second ("IOPS") activity 1416 (e.g., read operations and write operations) among subdirectories of the selected directory 1404 is displayed. In some embodiments, the facility maintains and provides values for other metrics, such as metrics related to capacity or diskspace usage, processor usage or availability, throughput (e.g., bytes per second, megabytes per minute), file usage (or non-usage), and so on. Each of these directory entries includes the path of the file at which the I/O is performed along with the number of I/O operations performed per second with respect to that file. A user can select parameters for returning the IOPS activity as well. For example, in some embodiments, the user can elect to view any TOPS namespace activity 1420 related to reads and/or writes to namespaces or directories (e.g., changes to directory information or directory metadata) in the selected directory. In other embodiments, the user may elect to view IOPS file activity 1422 related to files contained in the directories of the root directory (e.g., changes to file contents or file metadata).

In some embodiments, the facility generates the graphical user interface based on data collected by periodically or probabilistically sampling activity within the system according to a sampling rate or sampling frequency (e.g., read operations, write operations, diskspace usage or availability, processor usage or availability, throughput, and so on) or retrieves metadata for directories or files. For example, in various embodiments the facility samples and records I/O operations according to a sampling rate of once per second or once per millisecond. In some embodiments, the facility employs a dynamic sampling rate that changes over time based on, for example, the rate at which activities are performed or the rate at which an activity data structure for recording the samples fills up. In some embodiments the facility samples and records every other I/O operation or every fifth I/O operation. In various embodiments, the facility maintains information about the sampled I/O operations in a data structure used by the facility to generate the graphical user interface. In various embodiments, the data structure includes, for example, the time of the I/O operation, the type of the I/O operation, a path associated with the I/O operation, the user and/or process that caused the I/O operation, the size of the I/O operation, and so on. The facility is configured to discard or delete operations from the data structure based on the total number of operations stored in the data structure or the age of the operations. For example, the facility may set a maximum threshold number of operations (e.g., 200, 5000, 90,000, 100,000) and discard the oldest entries once the maximum threshold number is met. As another example, the facility may discard any operations that occurred outside of (earlier than) a specified time window, such as a day, a week, a month, and so on. In some cases, the facility uses a combination of time and total number of operations. In some embodiments, the facility uses folder metadata (e.g., aggregate metrics) as an alternative to, or in addition to, the sampled data. Although the above examples have been described in the context of I/O operations, one of ordinary skill in the art will recognized that other metric values can be maintained and recorded through sampling and other means described herein.

The graphical representation of the metric values can include the directories of first-level (e.g., rank 1) that are children of the root directory "/", represented by the columns 1418 of the graphic. The height (y-axis) 1424, 1426, 1428, and 1430, of each directory rectangle reflects the aggregate number of files or storage capacity used by that directory in relation to its parent directory. Accordingly, some of the smaller-size directories may not be visible in the graphical representation of the root directory shown in FIG. 14.

Figure 15A:
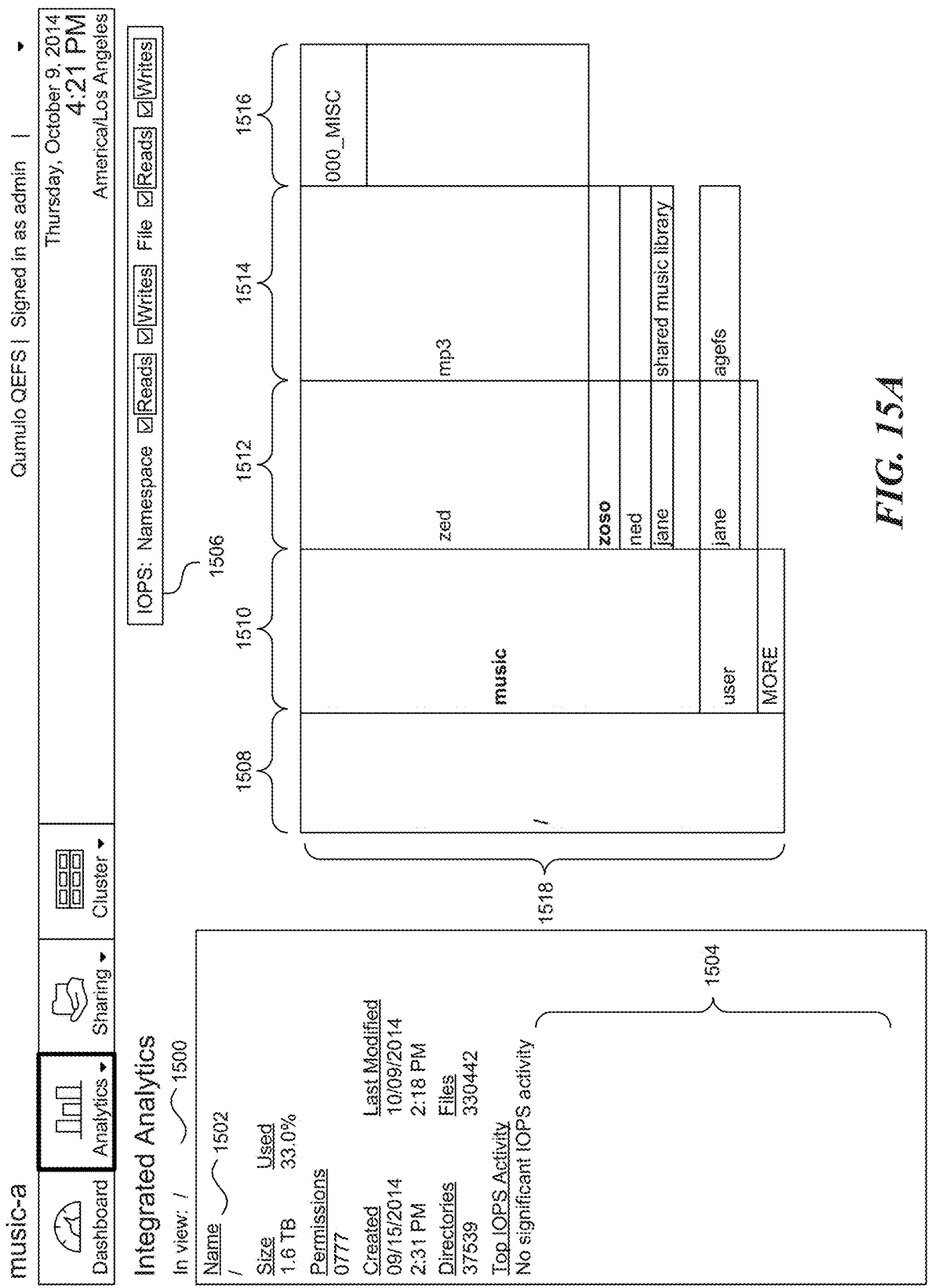
FIG. 15A illustrates a selection of a root directory in the filesystem.
Figure 15B:
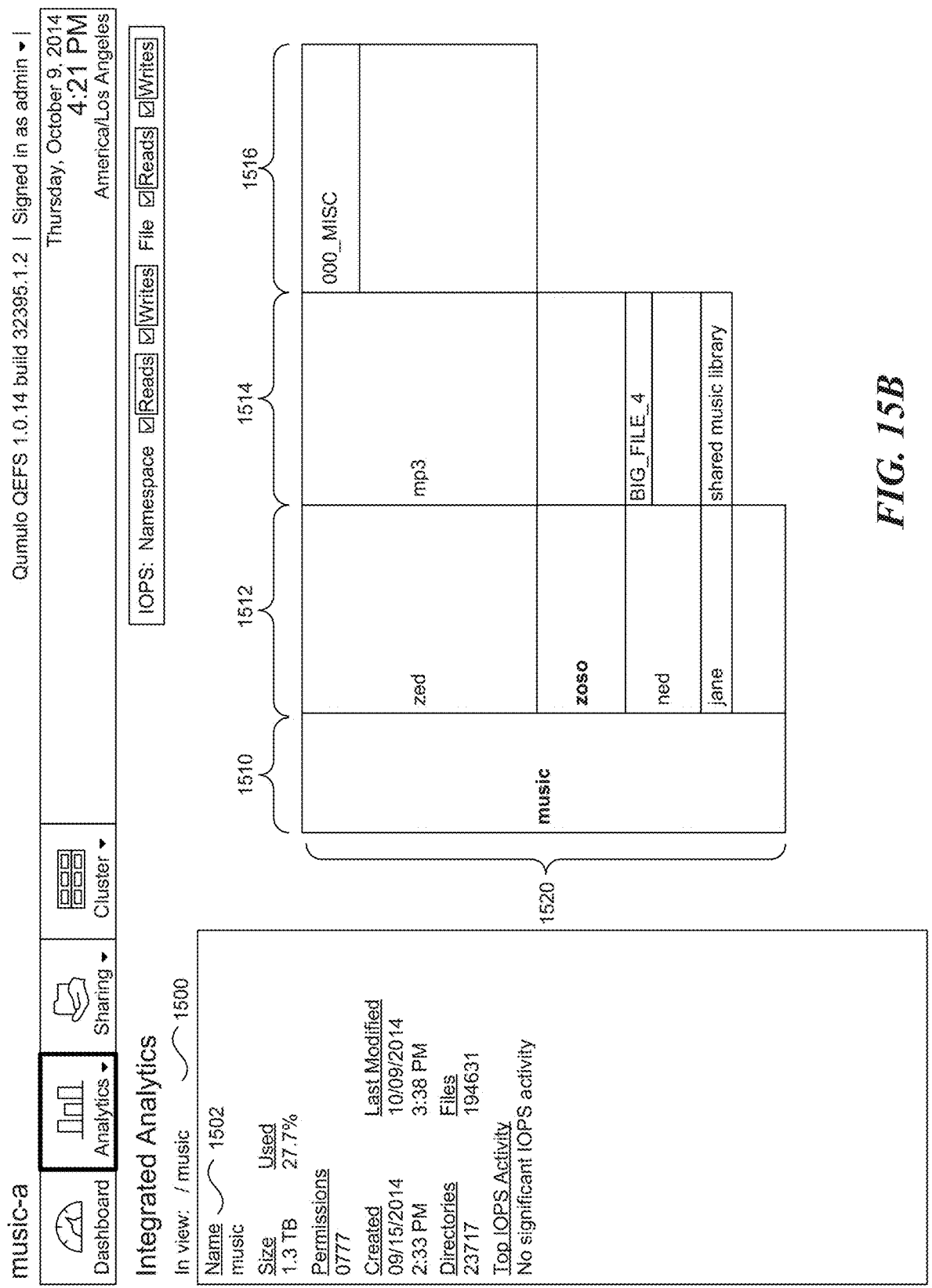
FIG. 15B shows an example screenshot of a graphical user interface displaying analytics in accordance with one or more of the various embodiments.

FIGS. 15A-15C are example screenshots of a graphical user interface displaying on a client device metrics for various directories in a filesystem tree. In FIG. 15A, a root directory is shown to be selected at the corresponding path 1500 in the filesystem, which is further indicated by the pathname "I" 1502 proximate to a plurality of analytics relating to that directory. Within the selected directory, there has been no recent activity. Accordingly, though each operation performed on the directory 1506 is selected for display, the IOPS activity 1504 in the cumulative analytics is empty. The size of the selected directory is graphically represented by the height of the column indicating that directory. In particular, column 1508 indicates directory "I" and its height 1518 corresponds to the size of the root directory (1.6 TB). The size of each of the three directories within the root directory (/music, /user, /MORE) is further indicated by the height of each of those child directories in relation to the root directory. So, based on the visual representation, the /music directory in column 1510 is clearly the largest, with the /user directory consuming more than the /MORE directory. To determine the exact size of a directory visible within the graphical representation, such as the "music" directory, the user simply selects that directory in the graphical representation.

FIG. 15B shows an example screenshot of the graphical user interface displaying analytics for the "music" directory after selection of that directory in FIG. 15A. As shown, the directory path 1500 now indicates the path "/music" for the /music directory. Additionally, the pathname 1502 and corresponding analytics are also updated to reflect analytics specific to that selected directory. In the graphical representation, the /music directory column 1510 is the leftmost column and each of the directories in the music directory are further expanded and detailed in the graphical representation. The height 1520 of the /music directory column 1510 now corresponds to 1.3 TB as indicated in the analytics for that directory. To determine the metrics of any child (or descendent) directory contained by the /music directory, the user can then select a displayed directory in the graphical representation. For example, the user can select the /music/zoso directory in column 1512, which shows the child directories for the /music directory.

FIG. 15C shows an example screenshot of the graphical user interface displaying analytics for the /music/zoso directory after selection of that directory in FIG. 15B. After selection of the /music/zoso directory, the path 1500 is updated to show the path for that directory "/music/zoso" and the path name 1502 is updated as well. The graphical representation is also updated to reflect the /music/zoso directory at the leftmost column 1512 and the corresponding directories (or files) contained by the /music/zoso directory. As with the preceding FIGS. 15A-15B, the height 1522 of the /music/zoso directory corresponds to the size (167.0 GB) of the directory. Furthermore, the height of each directory in each child or descendant directory in relation to the parent directory corresponds to the size of that directory, By providing enhanced visibility into the attributes of a data storage filesystem aggregated and stored at different levels in the filesystem hierarchy may facilitate management of the filesystem. It may be desirable to acquire analytics on portions or the entirety of a data storage filesystem tree. Analytics may relate to system capacity such as space usage by subdirectories, file counts, what is the newest/oldest file in a directory/tree, what file is most/least accessed, a histogram of file sizes, a breakdown of characteristics by file type such as space usage, file count, and the like. Other analytics may relate to performance such as transfer rates, I/O operations such as total operations, timing of I/O operations, latency and the like. This information may be used by system administrators for purposes such as: allocation of most frequently accessed data to data storage devices having a fast response time; customized backups based on date of most recent modification or change; resource planning based on total block usage by filesystem; and the like.

Live metrics of aggregate file attributes are therefore stored by the facility in the inode of a directory in the filesystem tree structure. The metric values are live in the sense that they are updated with respect to received updates for any filesystem object within the tree structure. Though each metric value may not reflect the most recent update to a particular directory, those metric values are current, or relatively current. Accordingly, the requested metric values are returned with a very low degree of latency unlike external systems. In some embodiments, the metrics are gathered from a recent system snapshot, where snapshot frequency and resulting latency may be set by a system administrator.

In some embodiments, in addition to storing metrics in the inodes of directories that are aggregated from the filesystem objects of the subtree defined by each directory, the facility also stores metrics in the inodes of files that relate solely to each file. The file metrics are copies of the file's attributes. In some embodiments, files can be added to the set of filesystem objects to be updated, as discussed in FIGS. 7A-7D.

In various embodiments, this information may facilitate the understanding of additional filesystem characteristics that may not be embedded in metadata such as: what percent of space within the filesystem is consumed by particular types of file (e.g., music files), how many files are owned or controlled by, or were created by, a particular user, information relative to additional user specified attributes (e.g., client or patient names) which may be embedded into file name structure, tags in file header data and the like.

Figure 16:
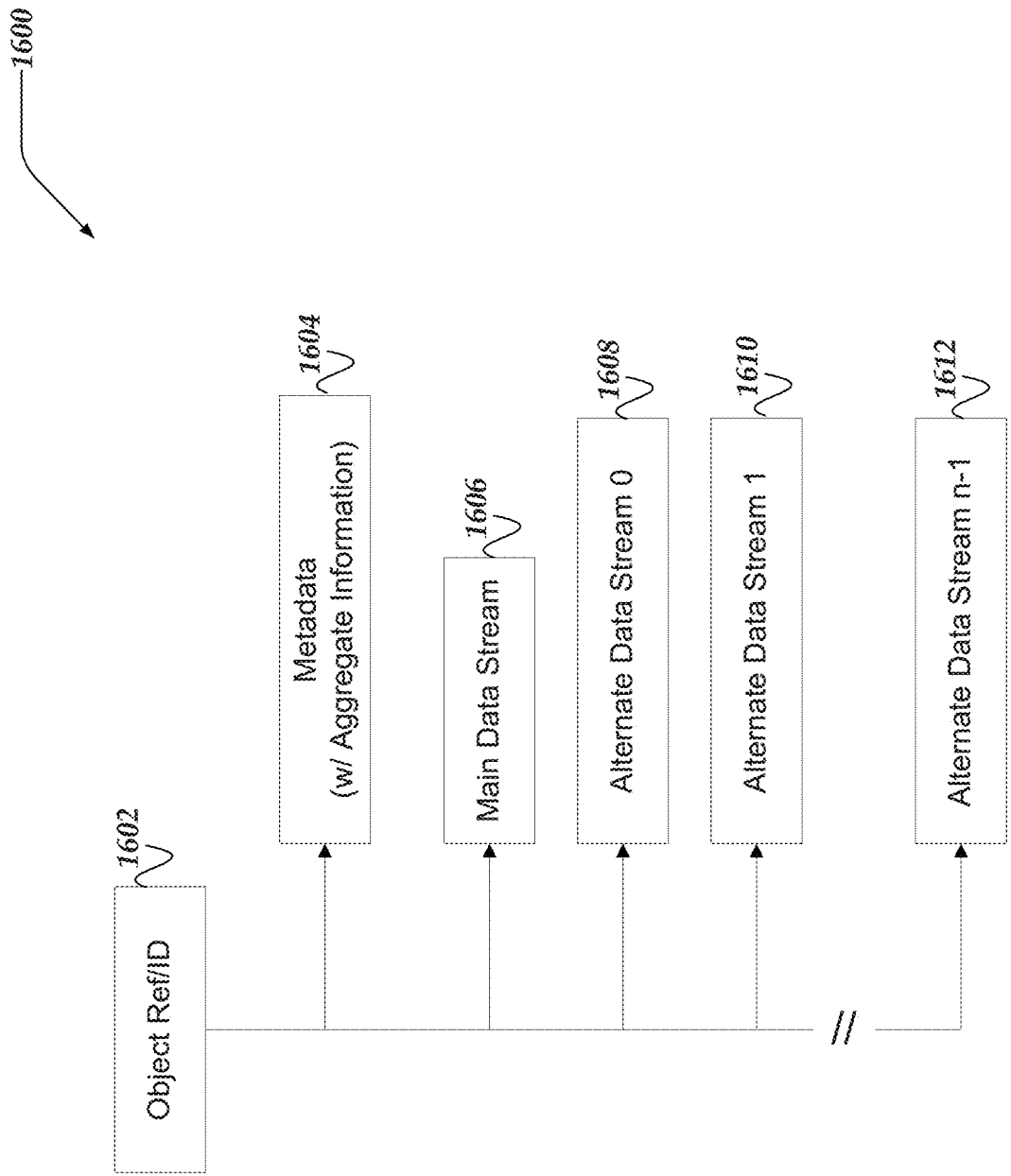
FIG. 16 illustrates a logical schematic of a file system object for aggregating alternate data stream metrics for file systems in accordance with one or more of the various embodiments.

FIG. 16 illustrates a logical schematic for file system object 1600 for aggregating alternate data stream metrics for file systems in accordance with one or more of the various embodiments.

In one or more of the various embodiments, blocks that comprise the data portion or payload portion of a file may be grouped or associated into data streams. In one or more of the various embodiments, conventional files may be considered to have a main data stream that includes the data blocks that comprise the file. In some embodiments, in conventional files, all the data blocks that make up a file may be considered to be included in its main data stream. In some embodiments, other blocks or data structures employed for storing file system meta-data, or the like, for a file may be considered to be separate from the main data streams.

In one or more of the various embodiments, some file systems enable or support files that may include alternate data streams. In some embodiments, alternate data streams may be similar to main data streams because they may store data blocks rather than file system meta-data. Accordingly, in some embodiments, inode data structures for files, or the like, may be arranged to associate blocks with alternate data streams as well as blocks associated with main data streams.

In this example, file system object 1600 represents a file object that includes alternate data streams. Accordingly, in some embodiments, data structures for files may include object reference 1602, meta-data 1604, main data stream 1606, zero or more alternate data streams, such as, alternate data stream 1608, alternate data stream 1610, alternate data stream 1612, or the like. In some embodiments, the data representation or management of the blocks associated with the various data streams of a file may vary depending on the make up of the file system or the protocols employed by clients to access the file system. For example, some file systems or file system protocols may support alternate data streams while others do not.

In one or more of the various embodiments, aggregate information associated with file system objects or file systems may be arranged to include one or more aggregate metric fields that may be associated with alternate data streams included in files in a file system. Accordingly, in some embodiments, file system engines, reconcile engines or the like, may be arranged to perform various actions to keep the alternate data stream aggregates current as file system objects may be modified, added to a file system, or removed from a file system. For brevity and clarity, the term update may be considered to refer to the various actions that may modify one or more file system objects in a file system.

Figure 17:
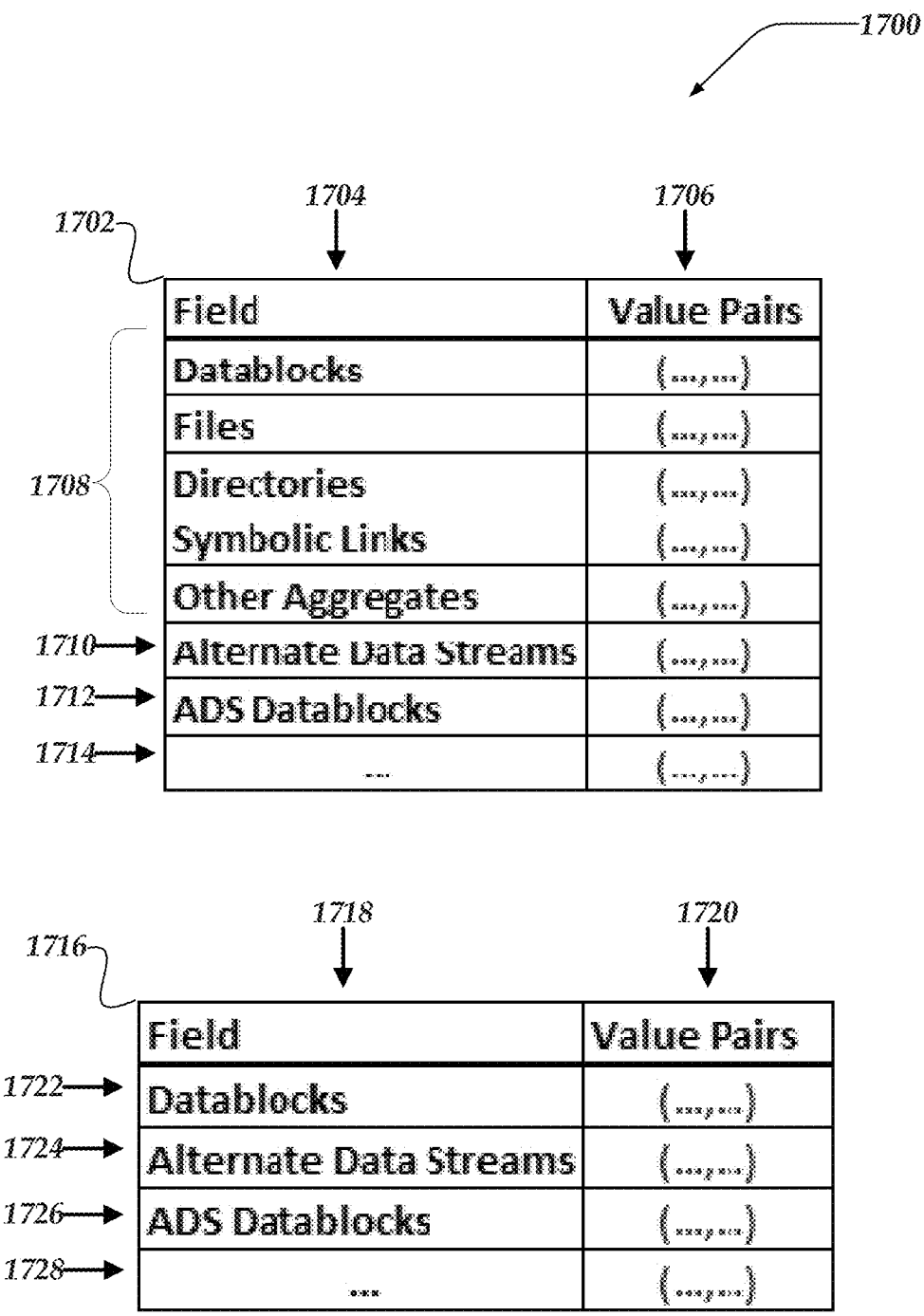
FIG. 17 illustrates a logical schematic of data structures for aggregating alternate data stream metrics for file systems in accordance with one or more of the various embodiments.

FIG. 17 illustrates a logical schematic of data structures 1700 for aggregating alternate data stream metrics for file systems in accordance with one or more of the various embodiments. As described above, fields for aggregate metrics may be stored in data structures associated with their respective objects. For example, in some embodiments, file system objects that have children (e.g., directory objects) may be associated with data structures, such as, data structure 1702. Similarly, in some embodiments, file system objects, such as, files or other leaf objects, may be associated with data structures such as data structure 1716. One of ordinary skill in the art, will appreciate that data structures for aggregating alternate data stream metrics for file systems may include more or less fields as described herein. Or, in some embodiments, such fields may be arranged differently or labeled differently without departing from the scope of the innovations included herein. For example, data structure 1702 or data structure 1716 may be implemented using, C/C++ structures, hash maps, dictionaries, tables, arrays, JSON, XML, or the like, depending on local circumstances or local requirements.

In this example, data structure 1702 includes: field column 1704 representing a label or identifier of a aggregate metric field; value pair column 1706 representing the value pairs employed for reconciling, as described above.

In this example, data structure 1702 may be arranged to include various fields, including: standard fields 1708 representing aggregate metric values generally unassociated with alternate data streams; field 1710 representing the number of alternate data streams associated with the file system object; field 1712 may represent a count of data blocks included or associated with alternate data streams of the descendants of a file system object; field 1714 representing additional aggregate metric fields, including alternate data stream related aggregate metrics; or the like. In some embodiments, field 1710 may represent a count of the total number (sum) of alternate data streams included in descendant file system objects.

Also, in this example, for some embodiments, data structure 1716 may be arranged to include various fields, including: field 1722 representing the number of data blocks associated with the file system object; field 1724 may represent the number of alternate data streams associated with the file system object; field 1726 representing the number data blocks included or associated with alternate data streams of the file system object; field 1714 representing zero or more additional fields, including fields that may be associated with alternate data streams of the file system object; or the like. For example, in some embodiments, data structure 1716 may be arranged to include one or more aggregate metric fields for each alternate data stream in a file, such as, separate Alternate Data Stream data block counts, or the like.

In one or more of the various embodiments, value pairs associated with aggregate metric fields may be ordered pairs that may be employed to track if aggregate metric values of a file system object need to be reconcile as described in the various examples above. Further, in some embodiments, value pairs may include flags, bitmaps (e.g., bit fields, bit arrays, bit vectors, or the like), timestamps, or the like, rather than being limited to values representing counts or quantities.

Figure 18:
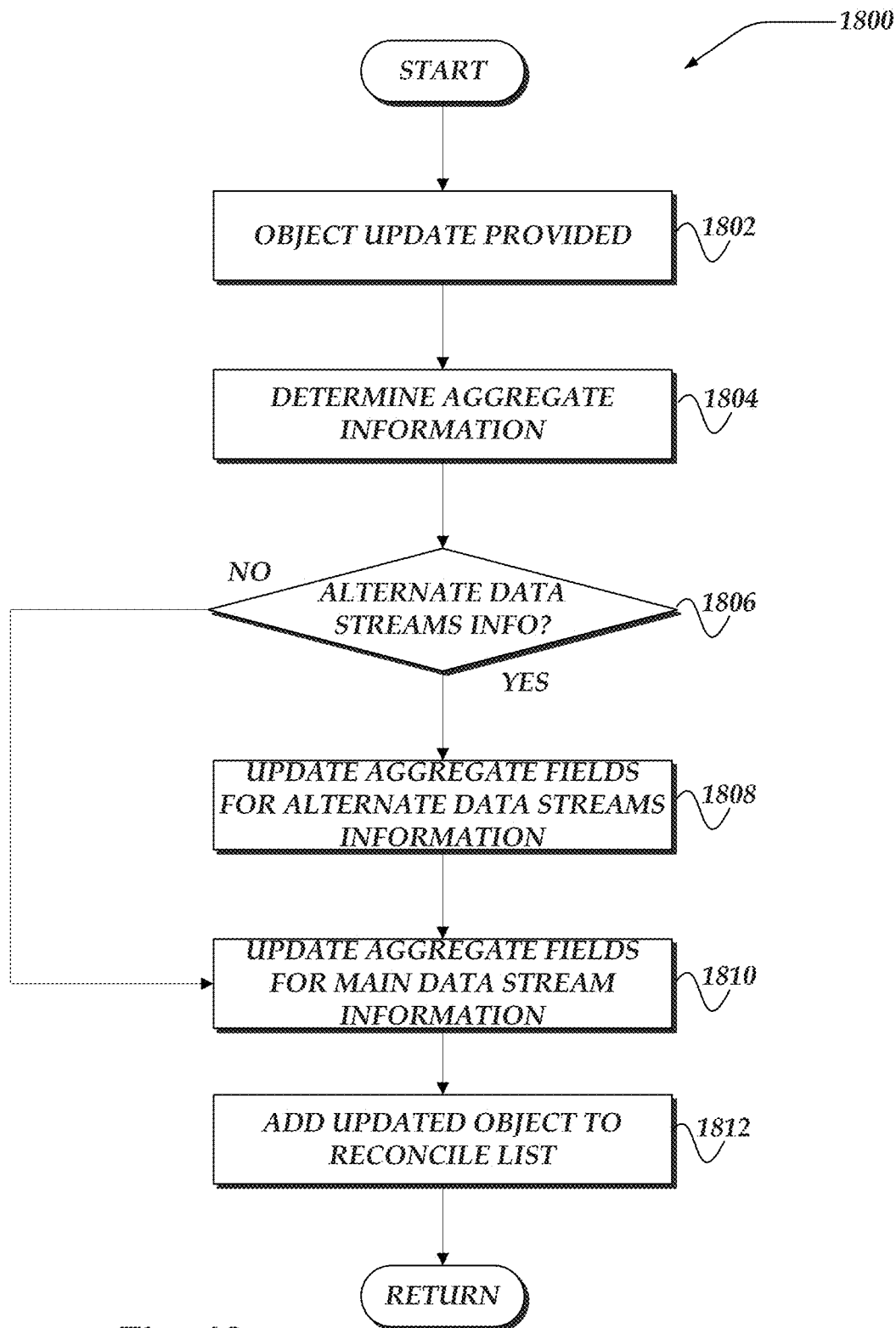
FIG. 18 illustrates an overview flowchart for a process for aggregating alternate data stream metrics for file systems in accordance with one or more of the various embodiments.

FIG. 18 illustrates an overview flowchart for process 1800 for aggregating alternate data stream metrics for file systems in accordance with one or more of the various embodiments. After a start block, at block 1802, in one or more of the various embodiments, one or more file system object updates may be provided. As described above, various updates to various file system objects may implicate one or more aggregate metrics associated with the file system objects being updated, including aggregate metrics that may be associated with one or more alternate data streams separate from aggregate metrics associated with main data streams or the object as a whole.

At block 1804, in one or more of the various embodiments, file system engines may be arranged to determine the aggregate information associated with the one or more file system objects. As described above, file system objects may be associated with aggregate information. In some embodiments, aggregate information may be comprised of one or more aggregate metric fields. In some embodiments, different types of file system objects may have different aggregate information. For example, in some embodiments, file object may have different aggregate metric fields than directory objects.

At decision block 1806, in one or more of the various embodiments, if the one or more file system objects may be associated with alternate data stream information, control may flow to block 1808; otherwise, control may flow to block 1810. In one or more of the various embodiments, if the file system objects associated with the update may be associated with alternate data streams, they may be associated with one or more aggregate metric fields that may be associated with one or more alternate data stream rather than the main data stream or the file system objects as a whole.

At block 1808, in one or more of the various embodiments, file system engines may be arranged to update one or more aggregate metric fields for alternate data streams that may be associated with the one or more file system objects. In some embodiments, file system engines may be arranged to selectively perform one or more actions to update one or more alternate data stream aggregate metrics. In one or more of the various embodiments, the particular actions performed by the file system engines to update alternate data stream aggregate metrics may vary depending on the type of updates, the type of file system objects, the type of aggregate metrics, or the like. Accordingly, in some embodiments, file system engines may be arranged to employ configuration information to determine the specific actions to perform for a given update or file system object.

At block 1810, in one or more of the various embodiments, file system engines may be arranged to update one or more other aggregate fields associated with the main data stream of the one or more file system objects. As described above, aggregate metrics associated a file main data stream or aggregate metrics associated with the file system objects as a whole may be updated. For example, see FIGS. 4-13 as described in detail above.

At block 1812, in one or more of the various embodiments, file system engines may be arranged to associate the one or more file system objects with a reconcile list. As described above, file system objects associated with updates that result in modification to their associated aggregate metrics may be added to a reconcile list to enables subsequent reconciling by a reconcile engine.

Next, in one or more of the various embodiments, control may be returned to a calling process.

Figure 19:
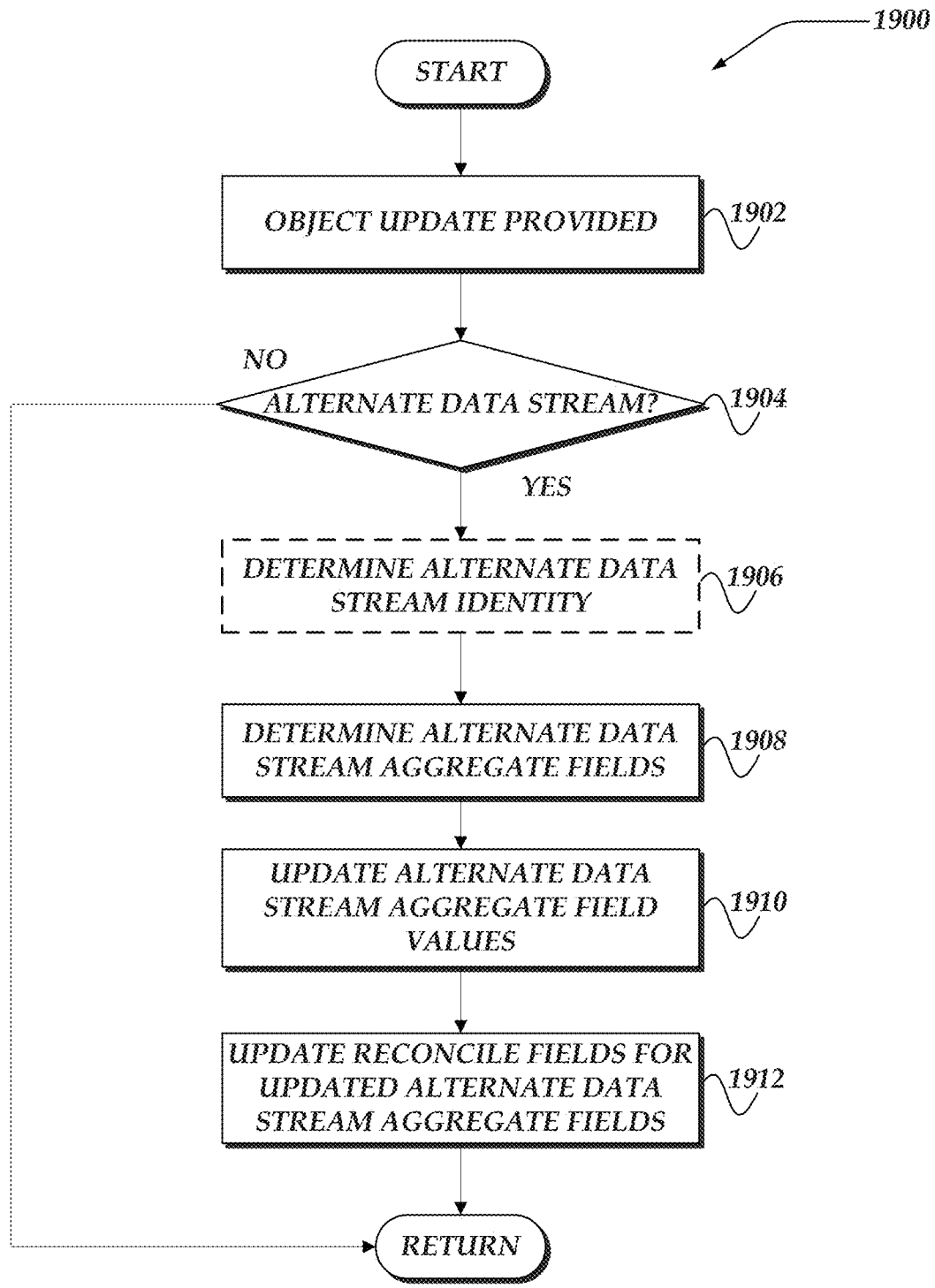
FIG. 19 illustrates a flowchart for a process for aggregating alternate data stream metrics for file systems in accordance with one or more of the various embodiments.

FIG. 19 illustrates a flowchart for process 1900 for aggregating alternate data stream metrics for file systems in accordance with one or more of the various embodiments. After a start block, at block 1902, in one or more of the various embodiments, an update for a file system object may be provided. As described, various user actions or service actions may result in a modification to a file system objects that may implicate one or more aggregate metrics. This may include aggregate metrics associated with the file system object that is modified as well as its immediate parent object or other file system objects.

Accordingly, in some embodiments, as file system objects may be updated, each update may be evaluated to determine if it impacts alternate data streams that may be associated with the file system objects being updated.

At decision block 1904, in one or more of the various embodiments, if the file system object may be associated with alternate data streams, control may flow to block 1906; otherwise, control may be returned to a calling process. In some embodiments, file system engines may be arranged to determine if the update may be associated with an alternate data stream associated with the file system object. This may include modifying one or more existing alternate data streams or creating new alternate data streams.

For example, in one or more of the various embodiments, a file system may provide an API that enables updates to be associated with alternate data streams. Generally, in some embodiments, a naming convention or addressing scheme may include indicators, such as, flags, separators, or the like, that explicitly indicate if the update may be associated with an alternate data stream. For example, in some embodiments, a reference such as "c:/Data/employees:payroll In one or more of the various embodiments, some updates, such as, a file delete operation, directory delete operation, or the like, may implicitly impact alternate data streams associated with a file. For example, deleting a file system object from a file system may require one or more alternate data streams to be deleted as well.

At block 1906, in one or more of the various embodiments, optionally, file system engines may be arranged to determine which alternate data stream may be associated with the update being processed. In one or more of the various embodiments, updates may be impacting existing alternate data streams. Likewise, in some embodiments, the updates may create one or more new alternate data streams. Thus, in some embodiments, file system engines may be arranged to determine if the update changed the number of alternate data streams.

Also, in one or more of the various embodiments, file system engines may be arranged to support one or more aggregate metrics that may be associated with individual alternate data streams or alternate data streams that may be employed for specific types of data. For example, in some embodiments, custom aggregate metrics may be provided to track separate audio or video streams in separate alternate data streams. If, in this example, separate aggregate metric fields may be employed to track the count of audio data blocks and other separate aggregate metric fields may be employed to track the count of video data blocks. Accordingly, in such circumstance, file system engines may be arranged to determine the specific alternate data streams that may be implicated by the update.

Note, this block is indicated as being optional because, in some embodiments, aggregate metric fields for individual alternate data streams may be absent. Accordingly, in some embodiments, the execution of actions associated with this block may be omitted.

At block 1908, in one or more of the various embodiments, file system engines may be arranged to determine one or more aggregate metric fields that may be associated with the file system object or the update. In some embodiments, the particular aggregate metric fields implicated by the update may depend on the details of the update as well as policies or configuration of the file system. Further, in one or more of the various embodiments, the aggregate metric fields may depend on the type of file system object involved in the update. For example, file object may include different aggregate metrics than directory objects depending on the file system.

Accordingly, in some embodiments, file system engines may employ rules, instructions, or the like, provided via configuration information to determine the one or more aggregate metric fields that may be associated with the update.

At block 1910, in one or more of the various embodiments, file system engines may be arranged to update the one or more aggregate metric values associated with the one or more alternate data streams. In one or more of the various embodiments, the actions associated with updating a given aggregate metric may vary depending on the type or purpose of the aggregate metric. Accordingly, in some embodiments, file system engines may be arranged to employ rules, instructions, or the like, to determine the specific actions for updating each aggregate metric associated with the update and the file system object.

At block 1912, in one or more of the various embodiments, file system engines may be arranged to update that value pairs associated with the aggregate metric fields being updated. In some embodiments, ordered pairs of values may be employed to distinguish un-reconciled aggregate metrics from reconciled aggregate metrics that may be associated with file system object. One of ordinary skill in the art, will appreciate the data structures employed to represent the metric value pairs may vary widely while not departing from the scope these innovations. Further, in some embodiments, other facilities, including, flags, bitmaps (e.g., bit fields, bit arrays, bit vectors, or the like), value tuples, or the like, may be employed for some types of aggregate metrics. Accordingly, in some embodiments, file system engines may be arranged to employ rules, instructions, or the like, provided via configuration information to account for local circumstances, local requirements, custom aggregate metrics, additional aggregate metrics, new alternate data streams, or the like.

Next, in one or more of the various embodiments, control may be returned to a calling process.

Figure 20:
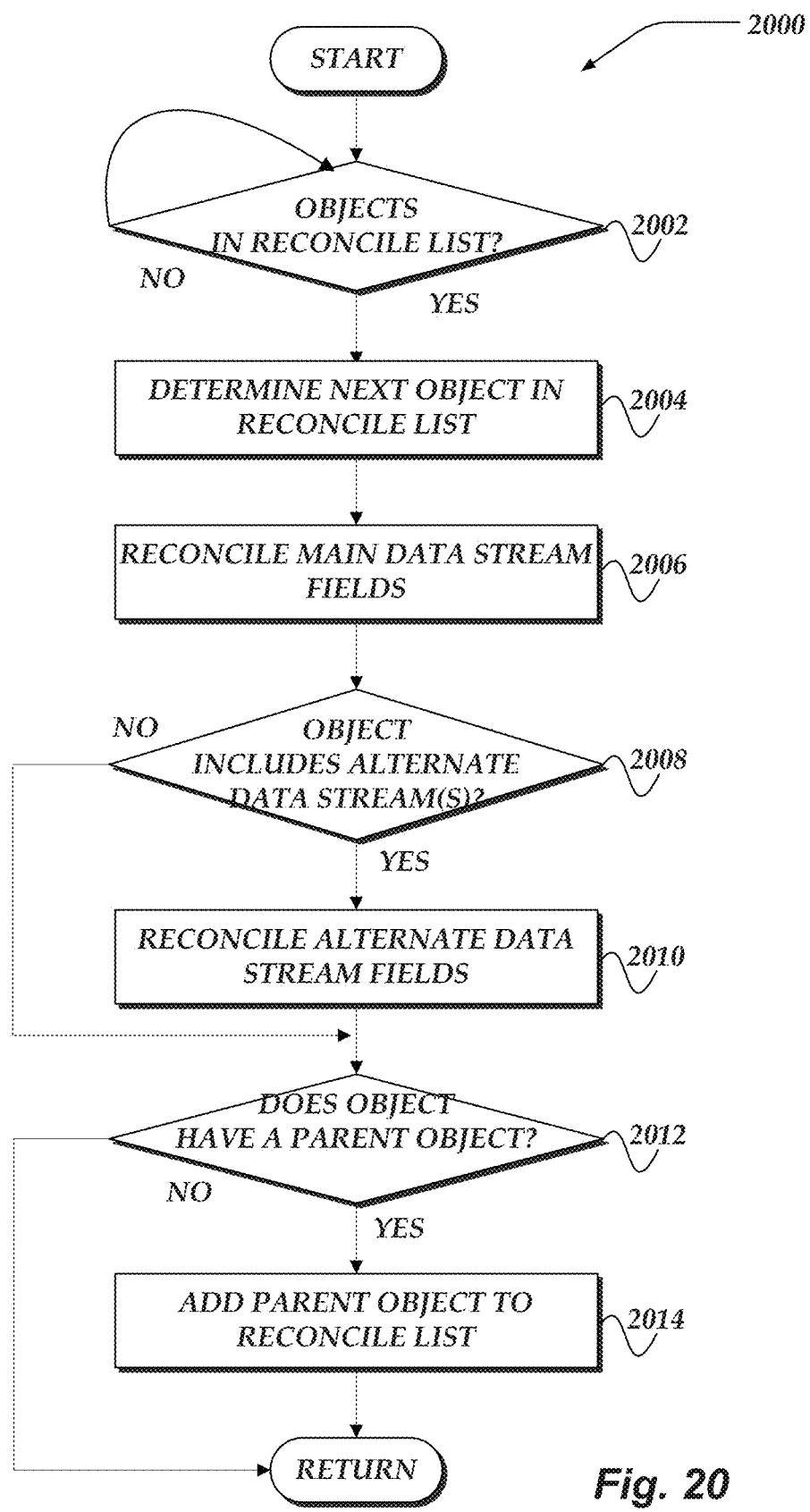
FIG. 20 illustrates a flowchart for a process for aggregating alternate data stream metrics for file systems in accordance with one or more of the various embodiments.

FIG. 20 illustrates a flowchart for process 2000 for aggregating alternate data stream metrics for file systems in accordance with one or more of the various embodiments. After a start block, at decision block 2002, in one or more of the various embodiments, if there may be file system objects in the reconcile list, control may flow to block 2004; otherwise, control may loop back to decision block 2002. As described above, updates to file system objects in a file system may cause changes one or more aggregate metrics for those file system objects. Accordingly, in some embodiments, such file system objects may be added to reconcile list. In some embodiments, the reconcile list may be a data store or data structure that includes references to the file system objects that may have aggregate metrics that need to be reconciled. Reconciling, in this context, may include ensure that aggregate metrics in ancestor file system objects are updated to reflect the updates made to their descendants. For example, in some embodiments, if a new alternate data stream is added to a file, the alternate data stream count aggregate metrics of its ancestors may require updating as well.

Accordingly, in some embodiments, a reconciling engine may be arranged to monitor one or more reconcile lists to determine if there may be file system objects that require reconciling.

At block 2004, in one or more of the various embodiments, reconcile engines may be arranged to determine a next file system objects from the reconcile list. As described above, file system objects referenced in the reconcile list may be sorted such that file system objects deeper in the file system may be processed before file system objects that may be higher in the file. For example, leaf objects, such as, files may be reconciled before the directory objects that may include it.

Accordingly, in some embodiments, the next file system object for reconciling may be definitively determined based on the sorting rules applied to the reconcile list.

At block 2006, in one or more of the various embodiments, reconcile engines may be arranged to reconcile aggregate metric fields associated with the main data of the determined file system object. As described above, in some embodiments, the particular actions for reconciling a given aggregate metric may vary depending on the aggregate metric. Accordingly, in some embodiments, reconcile engines may be arranged to employ rules, instructions, or the like, provided via configuration information to determine the actions for reconciling a particular aggregate metric. Thus, in some embodiments, configuration information may be employed to enable aggregate metrics, aggregate metric types, reconciling, or the like, to be adapted to local circumstances or local requirements.

At decision block 2008, in one or more of the various embodiments, if the determined file system object include one or more alternate data streams, control may flow to block 2010; otherwise, control may flow decision block 2012.

In one or more of the various embodiments, reconcile engines may be arranged to examine if the file system object includes one or more aggregate metrics associated with alternate data streams. For example, in some embodiments, if aggregate information associated with the file system object includes an alternate data stream count that may be greater than zero, the file system object may be considered to have alternate data stream related aggregate metrics.

At block 2010, in one or more of the various embodiments, reconcile engines may be arranged to reconcile the aggregate metric fields associated with the one or more alternate data streams. Similar to reconciling main data stream aggregates defined above, in some embodiments, reconcile engines may be arranged to evaluate each aggregate metric associated with the one or more alternate data streams of a file system object. Accordingly, in some embodiments, if the file system object is a file object, it may include aggregate metric values that represent the state of the actual alternate data streams of the file (if any). In contrast, for some embodiments, if the file system object is a parent object (e.g., a directory object, or the like), the alternate data stream aggregate metrics may be based on its descendant file system objects.

In some embodiments, actions for reconciling aggregate metrics associated with alternate data streams may be similar to main data stream aggregate metrics described above. However, in some embodiments, alternate data stream aggregate metrics may include aggregate metric fields that store at least a count of the of alternate data streams or the number of data blocks included in alternate data streams.

At decision block 2012, in one or more of the various embodiments, if the determined file system object may be associated with a parent object, control may flow to block 2014; otherwise, control may be returned to a calling process. In one or more of the various embodiments, parent objects may be considered the immediate ancestor of the determined file system object.

At block 2014, in one or more of the various embodiments, reconcile engines may be arranged to associate the determined parent file system object with the reconcile list. In one or more of the various embodiments, as described above, for main data streams, updating or reconciling aggregate metrics of a child object infers that aggregate metrics of its parent object may be out-of-date. Accordingly, in some embodiments, these parent objects require reconciling so their aggregate metrics reflect changes made to their child objects. Thus, in one or more of the various embodiments, the parent object of the file system object may be added to the reconcile list for subsequent reconciling. Note, in some cases, a parent object may already be in the reconcile list. In some embodiments, reconcile engines may be arranged to perform various actions, such as, sorting, de-duplicating, or the like, as described above for reconcile list 722, or the like.

Next, in one or more of the various embodiments, control may be returned to a calling process.

Figure 21:
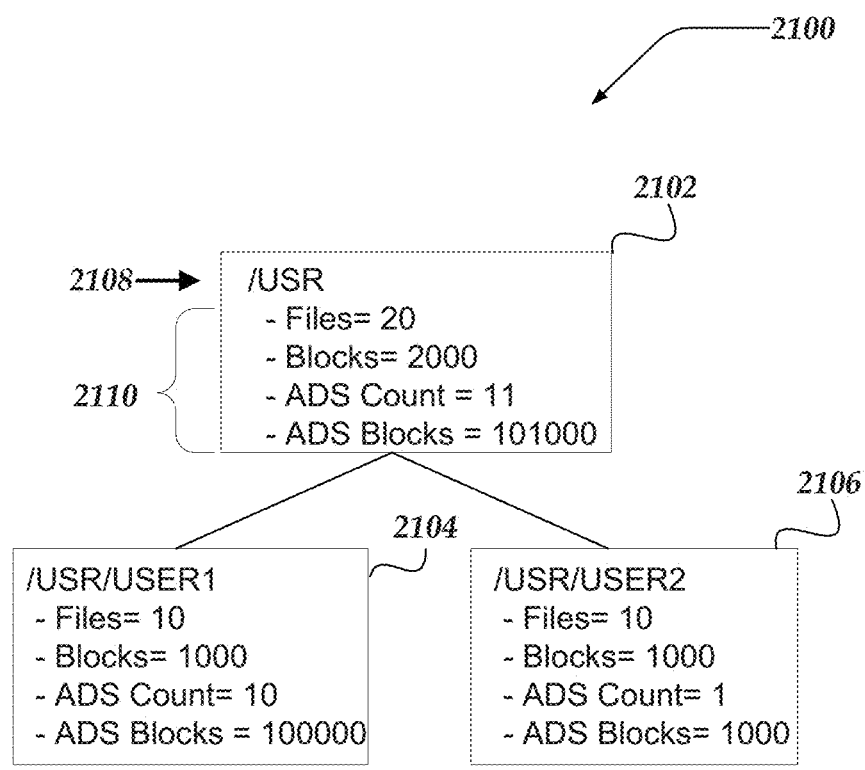
FIG. 21 illustrates a logical schematic of a file system sub-tree for fair sampling aggregating alternate data streams for file systems in accordance with one or more of the various embodiments.

FIG. 21 illustrates a logical schematic file system sub-tree 2100 for fair sampling of alternate data streams for file systems in accordance with one or more of the various embodiments. In some embodiments, file system engines may be arranged to determine information about characteristics of one or more portions of a file system based on statistical sampling of one or more portions of the file system.

In one or more of the various embodiments, file system engines may be arranged to determine a number of samples taken from file objects in the file system based on one or more sampling models. In some embodiments, sampling models may be arranged to provide the rules or instructions for performing actions to determine how to sample one or more portions of the file system. In some embodiments, sample models may be directed to providing fair distributions of metric sampling. Accordingly, in some embodiments, sampling models may be arranged to provide fair sampling to produce statistical results or distributions that reflect the distribution of data in the file system. For example, in some embodiments, as described above, one or more aggregate metrics may be evaluated by sampling models to determine how to balance a number of samples based the number of files in various directories.

In one or more of the various embodiments, other metrics may be evaluated to determine fair sampling results depending on the type of sampling (or query) that may be requested.

Accordingly, in some embodiments, file system engines may be arranged to employ one or more aggregate metrics associated with alternate data streams to determine fair sampling. For example, in some embodiments, a sampling model that depends on the number of data blocks in a file system object may be arranged to include aggregate metrics associated with alternate data streams to determine how to sample a file system tree or sub-tree.

In this example, for some embodiments, tree 2100 includes file system object 2102, file system object 2104, file system object 2106, or the like. In this example, a portion of aggregate metrics for each file system object in tree 2100 is listed in the box representing the file system objects. For example, path 2108 represents a path or identity of the root object (file system object 2102) of tree 2100. Similarly, in this example, metrics 2110 represent other aggregate metrics for this example. Accordingly, in this example: Files is the number of files included in the current directory plus the number of files in its descendants; Blocks represents the number of main data stream blocks in all of the files that make up Files; ADS Count represents the number of alternate data streams in the files that make up Files; ADS Blocks represents the sum of data blocks included in the alternate data streams that make up the ADS Count.

In this example, for some embodiments, attempting to fairly sample the objects in tree 2100 based Files or Blocks may produce disadvantageous results. For example, a capacity or size based sampling may be skewed if alternate data streams are omitted from consideration. For example, file system object 2104 and file system object 2106 have the same number of files (e.g., Files=10) and the same number of main data stream block (e.g., Blocks=1000). However, in this example, the file system capacity or storage consumed by file system object 2104 may be considered far greater than file system object 2106 because of the alternate data streams associated with file system object 2104. In this example, file system object 2104 has ten files (e.g., Files=10). However, in this example, file system object 2104 also has ten alternate data streams (e.g., ADS Count=10) and 100000 data blocks associated with those ten alternate data streams (e.g., ADS Blocks=100000). In contrast, in this example, file system object 2106 has one alternate data stream that includes 1000 data blocks. Thus, in one or more of the various embodiments, in this example, fair sampling based on capacity/size requires metrics associated with alternate data streams to be accounted for.

Figure 22:
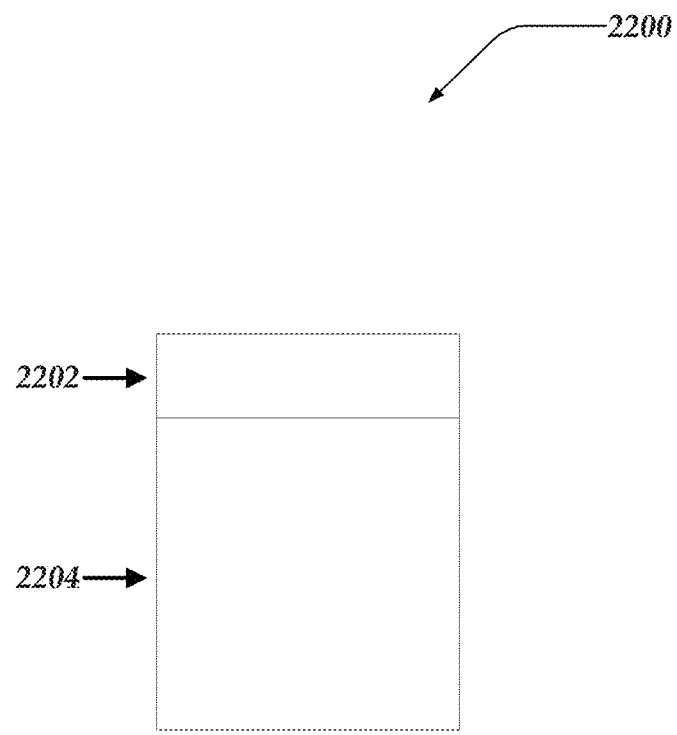
FIG. 22 illustrates a logical schematic of a sampling model for fair sampling alternate data streams for file systems in accordance with one or more of the various embodiments.

FIG. 22 illustrates a logical schematic of sampling model 2200 for fair sampling of alternate data streams for file systems in accordance with one or more of the various embodiments. As described above, file system engines may be arranged to perform various actions to fairly sample one or more portions of file systems. However, the number or type of actions to fairly sample a portion of a file system may depend on the contents, layout, cluster make-up, or the like, of the file system tree of interest. Likewise, in some embodiments, the fair sampling actions may vary depending on the type of statistical results or distribution desired or requested.

Also, in some embodiments, determining results based on fair sampling may depend on various factors, such as, the type of query, the available metrics, the values of one or more aggregate metrics, or the like.

Accordingly, in one or more of the various embodiments, file system engines may be arranged to employ one or more sampling models to direct or define the action performed to fairly sample a file system tree. In one or more of the various embodiments, sampling models, such as, sampling model 2200 may be comprised of one or more interfaces, such as, interface 2202. In some embodiments, interfaces, such as, interface 2202 may be comprised of rules, conditions, pattern tests, instructions, or the like, to determine if a sampling model may be suitable for the given task. In some embodiments, one or more sampling models may be generally suitable or otherwise employed for several or all fair sampling in a file system.

Also, in one or more of the various embodiments, sampling models, such as, sampling model 2200 may include a model body, such as, body 2204, that includes one or more of rules, instructions, threshold values, or the like, that a file system engine may employ to sample characteristics of file system objects. In some embodiments, model body 2204 may define allocation of samples based on the number of files, alternate data streams, ownership of the files, location of the files, age of the files, contents of other files, or the like.

One of ordinary skill in the art will appreciate that sampling models may be defined using a variety of well-known techniques, including compiled programming languages, scripts, shared libraries, plug-ins, extensions, built-in compile units, ASICs, FPGAs, or the like. Accordingly, in one or more of the various embodiments, file system engines may be arranged to determine the available sampling models or the composition of sampling models based on configuration information to account for local circumstances or local requirements.

Figure 23:
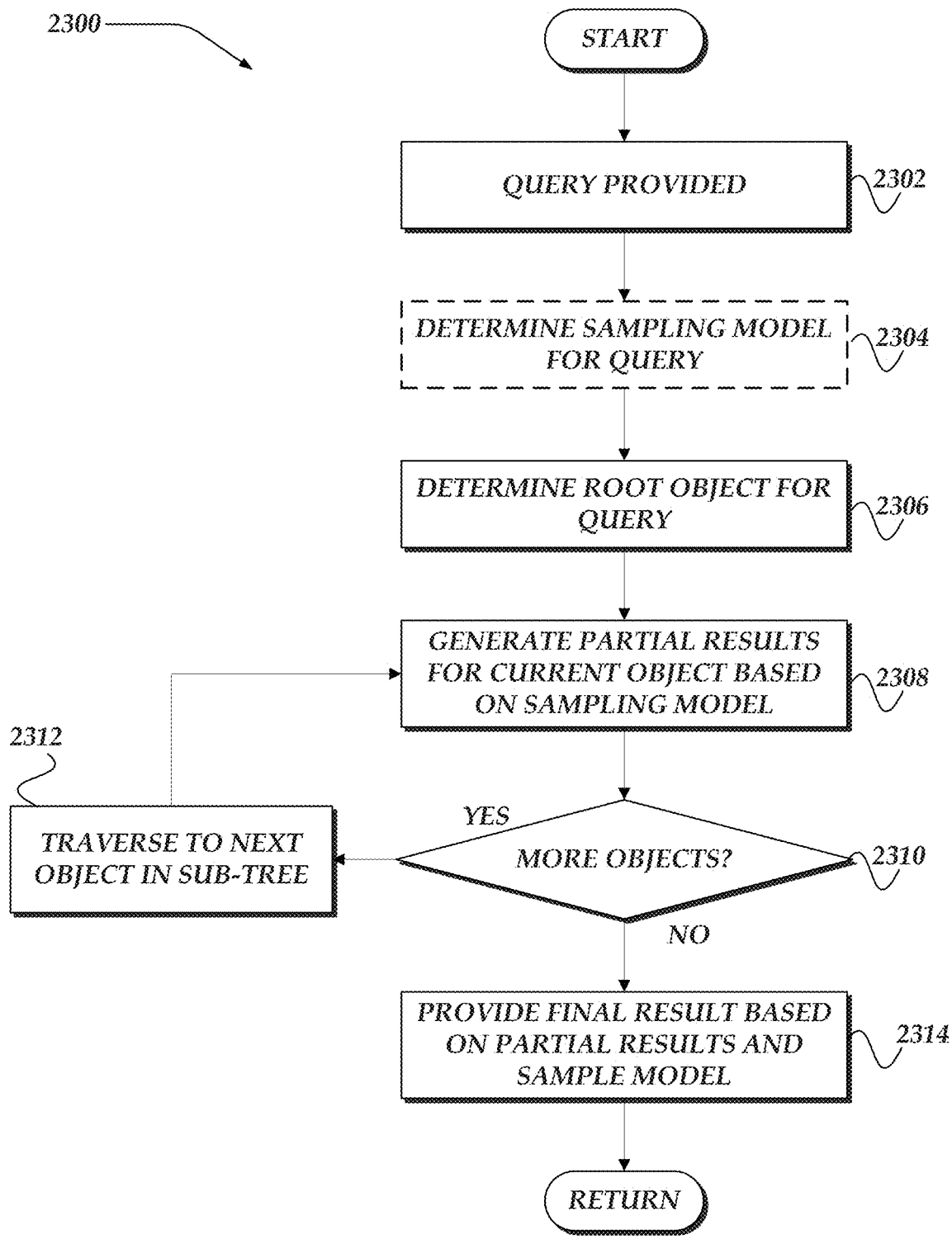
FIG. 23 illustrates a flowchart for a process for fair sampling of alternate data streams for file systems in accordance with one or more of the various embodiments.

FIG. 23 illustrates a flowchart for process 2300 for fair sampling of alternate data streams for file systems in accordance with one or more of the various embodiments. After a start block, at block 2302, in one or more of the various embodiments, one or more queries may be provided to a file system engine. In one or more of the various embodiments, queries in this context may include ad-hoc queries provided by a user employing a query language. Also, in one or more of the various embodiments, queries may be considered automatic or manual requests for information about a file system or portion of a file system, for use in various situations, such as, display one or more metrics in a user-interfaces, visualizations, status checks, health checks, performance analysis, or the like.

At block 2304, in one or more of the various embodiments, optionally, file system engines may be arranged to determine one or more sampling models for the query. As discussed above, In some embodiments, file system engines may be arranged to perform various actions to collect metrics based on one or more sampling models. Accordingly, in one or more of the various embodiments, one or more sampling models may be configured to map to one or more queries or query types. In some embodiments, file system engines may be arranged to dynamically select a sampling model based on one or more of the query, the file system, the user, or other considerations.

Note, this block is indicated as being optional because in some cases, for some embodiments, the sampling model may have been determined previously. For example, one or more sampling models may be define as default sampling models.

At block 2306, in one or more of the various embodiments, file system engines may be arranged to determine the root object of a portion of the file system based on the provided query or the sampling model. In one or more of the various embodiments, queries directed to an entire file system may employ the root node of the file system. In other cases, for some embodiments, file system engines may be arranged to select another file system object to be the root object based on information included with the query. For example, the query may explicitly select or identify the root object for a query.

Also, in one or more of the various embodiments, the sampling model may influence the selection of a root objects. For example, in some embodiments, the sampling model may direct that a parent object of file system objects referenced in the query information may be selected as the root object.

At block 2308, in one or more of the various embodiments, file system engines may be arranged to generate one or more partial results for one or more file system objects based on the sampling model. In one or more of the various embodiments, in conformance with the sampling model, file system engines may evaluate the metrics or aggregate metrics associated with the visited file system objects to generate partial results for the query.

At decision block 2310, in one or more of the various embodiments, if there may be more file system objects to evaluate, control may flow to block 2312; otherwise, control may flow to block 2314. In one or more of the various embodiments, file system engines may be arranged to visit or evaluate each file system object in the file system tree associated with the query.

Alternatively, in one or more of the various embodiments, file system engines may be arranged to rely on the sampling model to determine if more file system objects in the file system should be visited or evaluated. In one or more of the various embodiments, a sampling model may be configured to terminate traversal of the file system tree if one or more conditions may be met. For example, in some embodiments, a sampling model may be configured to terminate file system traversal if the number of files, blocks, alternate data stream associated blocks, or the like, fall below a threshold value.

At block 2312, in one or more of the various embodiments, file system engines may be arranged to traverse the file system tree to determine the next file system object to evaluate. In one or more of the various embodiments, file system engines may be arranged to automatically perform a traversal of the file system to visit one or more file system objects. In some embodiments, a sampling model may direct the direction or type of traversal (e.g., depth-first traversal, breadth first traversal, or the like). Also, in some embodiments, the sampling model may direct if the traversal should change directions, skip nodes, back-track, skip forwards, skip laterally, or the like, to determine the next file system objects to evaluate. Next, in one or more of the various embodiments, control may flow to block 2308.

At block 2314, in one or more of the various embodiments, file system engines may be arranged to provide one or more final results based on the one or more partial results or the one or more sampling models.

Next, in one or more of the various embodiments, control may be returned to a calling process.

Figure 24:
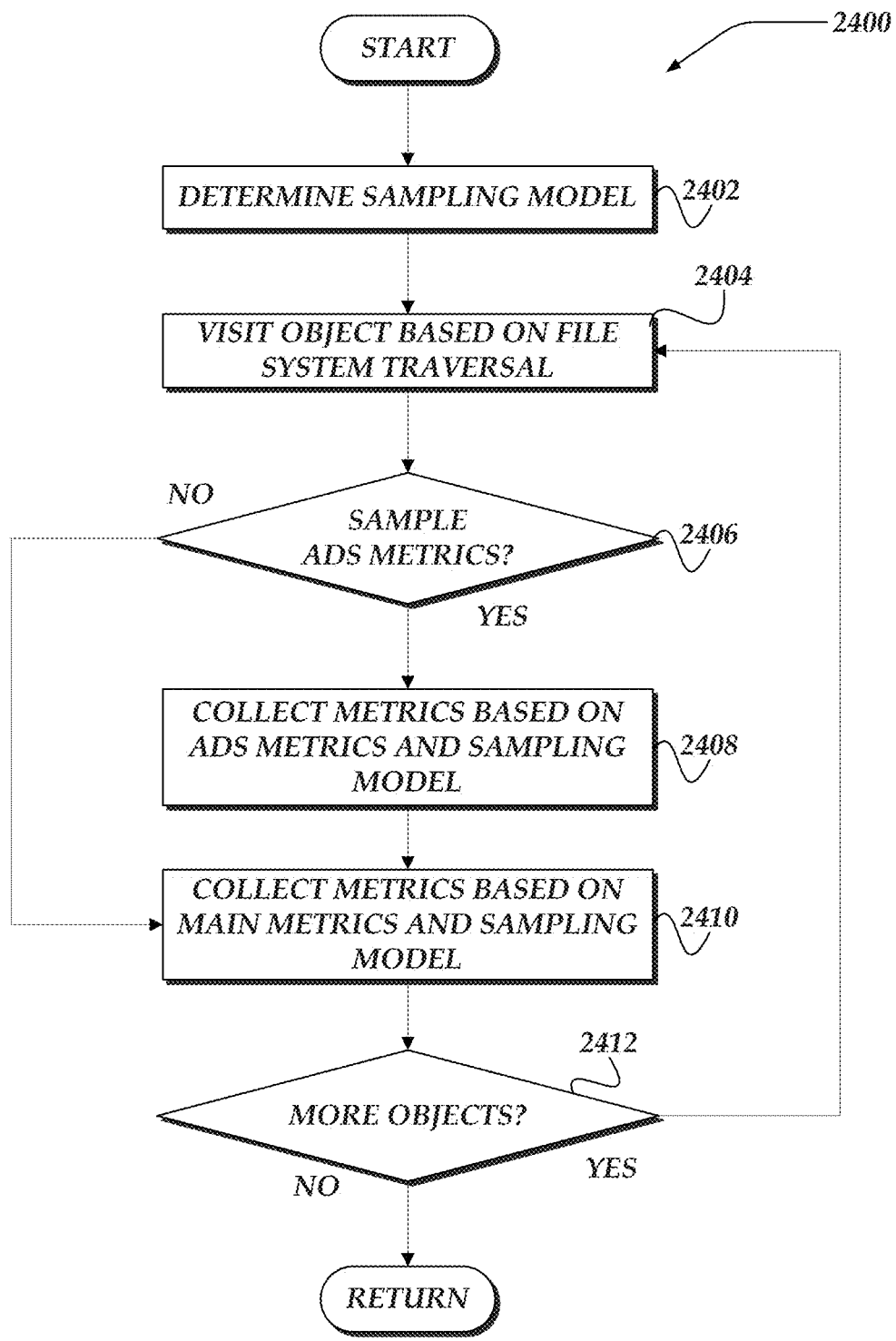
FIG. 24 illustrates a flowchart for a process for fair sampling of alternate data streams for file systems in accordance with one or more of the various embodiments.

FIG. 24 illustrates a flowchart for process 2400 for fair sampling of alternate data streams for file systems in accordance with one or more of the various embodiments. After a start block, at block 2402, in one or more of the various embodiments, file system engines may be arranged to determine a sampling model.

At block 2404, in one or more of the various embodiments, file system engines may be arranged to visit one or more file system objects based on a traversal of the file system. As described above, the sampling model may determine the specific traversal path taken to visit one or more file system objects in the file system.

At decision block 2406, in one or more of the various embodiments, if one or more metrics associated with alternate data streams may be sampled, control may flow to block 2408; otherwise, control may flow to block 2410. In one or more of the various embodiments, one or more sampling models may be configured to evaluate or analyze one or more metrics associated with one or more alternate data streams that may be associated with the current file system object.

At block 2408, in one or more of the various embodiments, file system engines may be arranged to collect one or more metrics based on the alternate data streams associated with the current object or the sampling model. In one or more of the various embodiments, in accordance with the sampling model, file system engines may be arranged to evaluate or collect one or more alternate data stream aggregate metrics to produce results for the query being executed. Also, in some embodiments, one or more sampling model may be configured to evaluate other characteristics of alternate data streams rather than being limited to aggregate metrics. For example, for some embodiments, a sampling model may be configured to look for alternate data streams that may be associated with particular labels or tags to provide results for the query.

At block 2410, in one or more of the various embodiments, file system engines may be arranged to collect one or more metrics based on the main data stream of the current object or the sampling model. In one or more of the various embodiments, sampling model may be configured to evaluate various metrics, aggregate metrics, characteristics, or the like, that may be unassociated with alternate data streams.

At decision block 2412, in one or more of the various embodiments, if there may be more file system objects to evaluate, control may loop back to block 2404; otherwise, control may be returned to a calling process. As described above, the sampling model may be configured to define the criteria for continuing a traversal of a file system as well as direct the type of traversal or direction of traversal. In some embodiments, the traversal may continue until each file system objects in the file system sub-tree of interest have been visited.

Next, in one or more of the various embodiments, control may be returned to a calling process.

Figure 25:
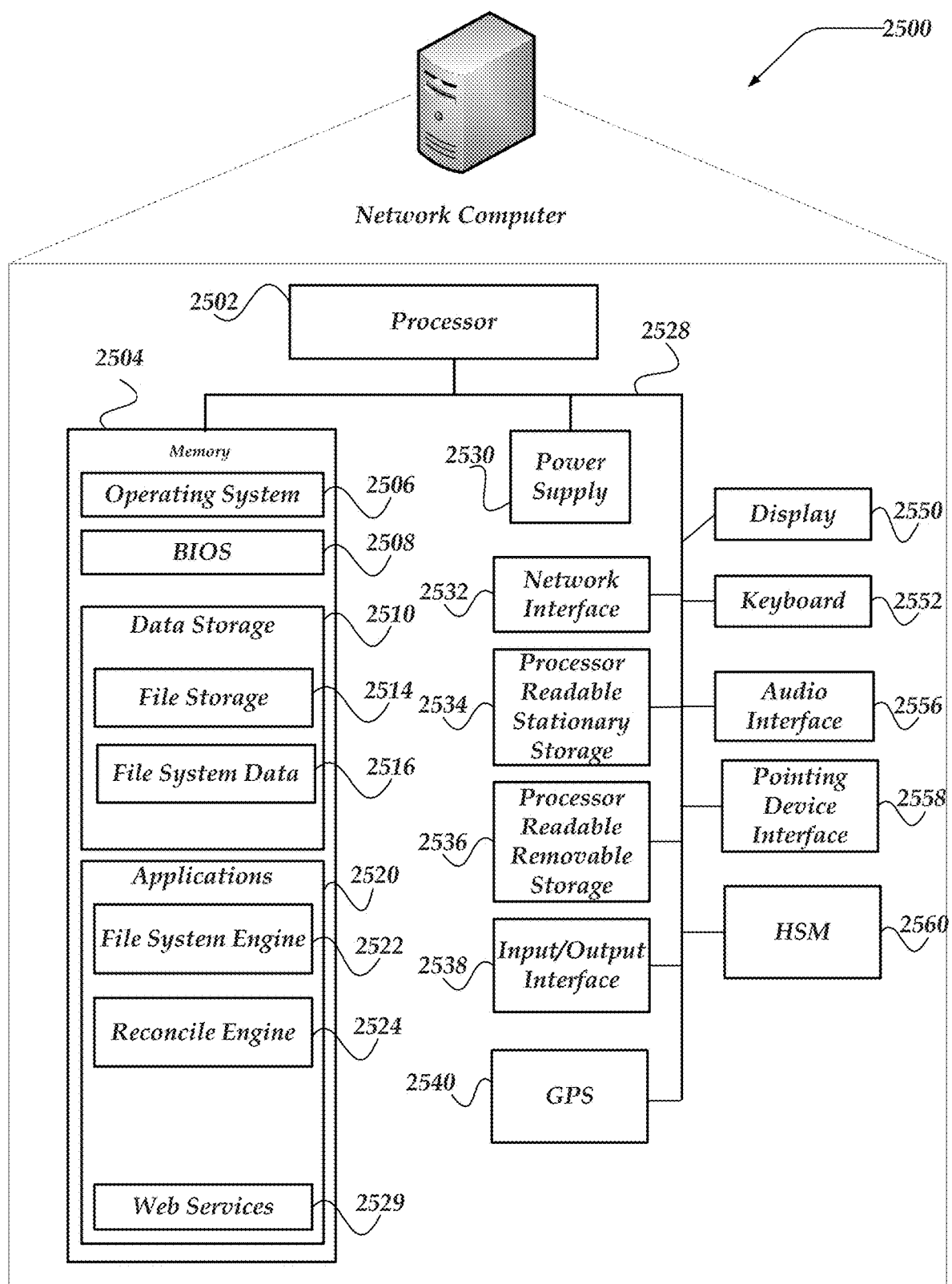
FIG. 25 illustrates a schematic embodiment of a network computer.

FIG. 25 shows one embodiment of network computer 2500 that may be included in a system implementing one or more of the various embodiments. Network computer 2500 may include many more or less components than those shown in FIG. 25. However, the components shown are sufficient to disclose an illustrative embodiment for practicing these innovations. Network computer 2500 may represent, for example, one or more embodiments of a file system management server computer such as application server computer 116, file system management server computer 118, file system management server computer 120, or the like, of FIG. 1.

Network computers, such as, network computer 2500 may include a processor 2502 that may be in communication with a memory 2504 via a bus 2528. In some embodiments, processor 2502 may be comprised of one or more hardware processors, or one or more processor cores. In some cases, one or more of the one or more processors may be specialized processors designed to perform one or more specialized actions, such as, those described herein. Network computer 2500 also includes a power supply 2530, network interface 2532, audio interface 2556, display 2550, keyboard 2552, input/output interface 2538, processor-readable stationary storage device 2534, and processor-readable removable storage device 2536. Power supply 2530 provides power to network computer 2500.

Network interface 2532 includes circuitry for coupling network computer 2500 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 2532 is sometimes known as a transceiver, transceiving device, or network interface card (NIC). Network computer 2500 may optionally communicate with a base station (not shown), or directly with another computer.

Audio interface 2556 is arranged to produce and receive audio signals such as the sound of a human voice. For example, audio interface 2556 may be coupled to a speaker and microphone (not shown) to enable telecommunication with others or generate an audio acknowledgment for some action. A microphone in audio interface 2556 can also be used for input to or control of network computer 2500, for example, using voice recognition.

Display 2550 may be a liquid crystal display (LCD), gas plasma, electronic ink, light emitting diode (LED), Organic LED (OLED) or any other type of light reflective or light transmissive display that can be used with a computer. In some embodiments, display 2550 may be a handheld projector or pico projector capable of projecting an image on a wall or other object.

Network computer 2500 may also comprise input/output interface 2538 for communicating with external devices or computers not shown in FIG. 25. Input/output interface 2538 can utilize one or more wired or wireless communication technologies, such as USB™, Firewire™ WiFi, WiMax, Thunderbolt™, Infrared, Bluetooth™, Zigbee™, serial port, parallel port, and the like.

Also, input/output interface 2538 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 2500. Human interface components can be physically separate from network computer 2500, allowing for remote input or output to network computer 2500. For example, information routed as described here through human interface components such as display 2550 or keyboard 2552 can instead be routed through the network interface 2532 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 2558 to receive user input.

GPS transceiver 2540 can determine the physical coordinates of network computer 2500 on the surface of the Earth, which typically outputs a location as latitude and longitude values. GPS transceiver 2540 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 2500 on the surface of the Earth. It is understood that under different conditions, GPS transceiver 2540 can determine a physical location for network computer 2500. In one or more embodiments, however, network computer 2500 may, through other components, provide other information that may be employed to determine a physical location of the client computer, including for example, a Media Access Control (MAC) address, IP address, and the like.

In at least one of the various embodiments, applications, such as, operating system 2506, file system engine 2522, reconcile engine 2524, web services 2529, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 2540. Also, in some embodiments, geolocation information may include information provided using one or more geolocation protocols over the networks, such as, wireless network 108 or network 111.

Memory 2504 may include Random Access Memory (RAM), Read-Only Memory (ROM), or other types of memory. Memory 2504 illustrates an example of computer-readable storage media (devices) for storage of information such as computer-readable instructions, data structures, program modules or other data. Memory 2504 stores a basic input/output system (BIOS) 2508 for controlling low-level operation of network computer 2500. The memory also stores an operating system 2506 for controlling the operation of network computer 2500. It will be appreciated that this component may include a general-purpose operating system such as a version of UNIX, or LINUX, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 2504 may further include one or more data storage 2510, which can be utilized by network computer 2500 to store, among other things, applications 2520 or other data. For example, data storage 2510 may also be employed to store information that describes various capabilities of network computer 2500. The information may then be provided to another device or computer based on any of a variety of methods, including being sent as part of a header during a communication, sent upon request, or the like. Data storage 2510 may also be employed to store social networking information including address books, friend lists, aliases, user profile information, or the like. Data storage 2510 may further include program code, data, algorithms, and the like, for use by a processor, such as processor 2502 to execute and perform actions such as those actions described below. In one embodiment, at least some of data storage 2510 might also be stored on another component of network computer 2500, including, but not limited to, non-transitory media inside processor-readable removable storage device 2536, processor-readable stationary storage device 2534, or any other computer-readable storage device within network computer 2500, or even external to network computer 2500. Data storage 2510 may include, for example, file storage 2514, file system data 2516, or the like.

Applications 2520 may include computer executable instructions which, when executed by network computer 2500, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 2520 may include file system engine 2522, reconcile engine 2524, web services 2529, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 2522, reconcile engine 2524, web services 2529, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 2522, reconcile engine 2524, web services 2529, or the like, may be provisioned and de-commissioned automatically.

Also, in one or more of the various embodiments, file system engine 2522, reconcile engine 2524, web services 2529, or the like, may be located in virtual servers running in a cloud-based computing environment rather than being tied to one or more specific physical network computers.

Further, network computer 2500 may also comprise hardware security module (HSM) 2560 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 2560 may be a stand-alone network computer, in other cases, HSM 2560 may be arranged as a hardware card that may be installed in a network computer.

Additionally, in one or more embodiments (not shown in the figures), network computer 2500 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

From the foregoing, it will be appreciated that specific embodiments of the invention have been described herein for purposes of illustration, but that various modifications may be made without deviating from the scope of the invention. For example, while various aspects of the facility are described with reference to filesystem subtrees (e.g., directory structures), one of ordinary skill in the art will recognize that this process can be applied to a variety of hierarchical structures, such as a b-tree, b+tree, b*-tree, binary tree, and so on. Accordingly, the invention is not limited except as by the appended claims.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data in a file system over a network using one or more processors that execute instructions to perform actions, comprising:
    providing a query to determine one or more characteristics associated with a portion of a file system and a sampling model;
    employing the sampling model to determine one or more objects in the file system based on a traversal of the portion of the file system, wherein a path of the traversal is based on the sampling model and the file system;
    employing the sampling model to determine one or more metrics associated with the one or more alternate data streams (ADSs) included in the one or more objects, wherein each of the one or more objects that includes a separate main data stream and the one or more ADSs is associated with one or more data blocks and the one or more ADSs are each associated with one or more other data blocks;
    employing the sampling model and the query to sample the one or more objects to provide one or more partial results;
    distributing the sampling between the one or more objects based on the sampling model and the one or more metrics by performing further actions, including:
        determining one or more first metrics of a first object, wherein the one or more first metrics are associated with each ADS that is included in the first object;
        determining one or more second metrics of a second object, wherein the one or more second metrics are associated with each ADS that is included in the second object; and
        determining a number of first samples to measure from the first object based on a ratio of the one or more first metrics and the one or more second metrics, wherein the number of first samples measured from the first object is greater than a number of second samples measured from the second object when values of the one or more first metrics are greater than values of the one or more second metrics; and
    providing a result to the query based on the one or more partial results.

2. The method of claim 1, wherein the sampling model includes one or more rules for a statistically fair sampling of the one or more objects based on the one or more metrics associated with the one or more ADSs.

3. The method of claim 1, wherein the one or more metrics associated with the one or more alternate data streams (ADSs), further comprise: one or more of an amount of ADSs in the object, or, a number of data blocks included in each ADSs in the object.

4. The method of claim 1, further comprising, terminating a descent traversal of the file system based on the one or more metrics matching one or more conditions defined in the sampling model, wherein the one or more conditions include, one or more values of the one or more metrics are less than a threshold value, an expiry of a timeout, a number of visited objects exceed a threshold value, or a proportion of visited objects relative to a number of objects in the portion of the file system exceed a threshold value.

5. A system for managing data in a file system comprising:
    a network computer, comprising:
        a transceiver that communicates over the network;
        a memory that stores at least instructions; and
        one or more processors that execute instructions that perform actions, including:
            providing a query to determine one or more characteristics associated with a portion of a file system and a sampling model;
            employing the sampling model to determine one or more objects in the file system based on a traversal of the portion of the file system, wherein a path of the traversal is based on the sampling model and the file system;
            employing the sampling model to determine one or more metrics associated with the one or more alternate data streams (ADSs) included in the one or more objects, wherein each of the one or more objects that includes a separate main data stream and the one or more ADSs is associated with one or more data blocks and the one or more ADSs are each associated with one or more other data blocks;
            employing the sampling model and the query to sample the one or more objects to provide one or more partial results, wherein the sampling is distributed between the one or more objects based on the sampling model and the one or more metrics;
            employing the sampling model and the query to sample the one or more objects to provide one or more partial results;
            distributing the sampling between the one or more objects based on the sampling model and the one or more metrics by performing further actions, including:
                determining one or more first metrics of a first object, wherein the one or more first metrics are associated with each ADS that is included in the first object;
                determining one or more second metrics of a second object, wherein the one or more second metrics are associated with each ADS that is included in the second object; and
                determining a number of first samples to measure from the first object based on a ratio of the one or more first metrics and the one or more second metrics, wherein the number of first samples measured from the first object is greater than a number of second samples measured from the second object when values of the one or more first metrics are greater than values of the one or more second metrics; and providing a result to the query based on the one or more partial results; and a client computer, comprising:
    a transceiver that communicates over the network;
    a memory that stores at least instructions; and
    one or more processors that execute instructions that perform actions, including, providing the query.

6. The system of claim 5, wherein the sampling model includes one or more rules for a statistically fair sampling of the one or more objects based on the one or more metrics associated with the one or more ADSs.

7. The system of claim 5, wherein the one or more metrics associated with the one or more alternate data streams (ADSs), further comprise: one or more of an amount of ADSs in the object, or, a number of data blocks included in each ADSs in the object.

8. The system of claim 5, wherein the one or more network computer processors execute instructions that perform actions, further comprising, terminating a descent traversal of the file system based on the one or more metrics matching one or more conditions defined in the sampling model, wherein the one or more conditions include, one or more values of the one or more metrics are less than a threshold value, an expiry of a timeout, a number of visited objects exceed a threshold value, or a proportion of visited objects relative to a number of objects in the portion of the file system exceed a threshold value.

9. A processor readable non-transitory storage media that includes instructions for managing data in a file system over a network, wherein execution of the instructions by one or more processors on one or more network computers performs actions, comprising:
    providing a query to determine one or more characteristics associated with a portion of a file system and a sampling model;
    employing the sampling model to determine one or more objects in the file system based on a traversal of the portion of the file system, wherein a path of the traversal is based on the sampling model and the file system;
    employing the sampling model to determine one or more metrics associated with the one or more alternate data streams (ADSs) included in the one or more objects, wherein each of the one or more objects that includes a separate main data stream and the one or more ADSs is associated with one or more data blocks and the one or more ADSs are each associated with one or more other data blocks;
    employing the sampling model and the query to sample the one or more objects to provide one or more partial results;
    distributing the sampling between the one or more objects based on the sampling model and the one or more metrics by performing further actions, including:
        determining one or more first metrics of a first object, wherein the one or more first metrics are associated with each ADS that is included in the first object;
        determining one or more second metrics of a second object, wherein the one or more second metrics are associated with each ADS that is included in the second object; and
        determining a number of first samples to measure from the first object based on a ratio of the one or more first metrics and the one or more second metrics, wherein the number of first samples measured from the first object is greater than a number of second samples measured from the second object when values of the one or more first metrics are greater than values of the one or more second metrics; and
    providing a result to the query based on the one or more partial results.

10. The media of claim 9, wherein the sampling model includes one or more rules for a statistically fair sampling of the one or more objects based on the one or more metrics associated with the one or more ADSs.

11. The media of claim 9, wherein the one or more metrics associated with the one or more alternate data streams (ADSs), further comprise: one or more of an amount of ADSs in the object, or, a number of data blocks included in each ADSs in the object.

12. The media of claim 9, further comprising, terminating a descent traversal of the file system based on the one or more metrics matching one or more conditions defined in the sampling model, wherein the one or more conditions include, one or more values of the one or more metrics are less than a threshold value, an expiry of a timeout, a number of visited objects exceed a threshold value, or a proportion of visited objects relative to a number of objects in the portion of the file system exceed a threshold value.

13. A network computer for managing data in a file system, comprising:
    a transceiver that communicates over the network;
    a memory that stores at least instructions; and
    one or more processors that execute instructions that perform actions, including:
        providing a query to determine one or more characteristics associated with a portion of a file system and a sampling model;
        employing the sampling model to determine one or more objects in the file system based on a traversal of the portion of the file system, wherein a path of the traversal is based on the sampling model and the file system;
        employing the sampling model to determine one or more metrics associated with the one or more alternate data streams (ADSs) included in the one or more objects, wherein each of the one or more objects that includes a separate main data stream and the one or more ADSs is associated with one or more data blocks and the one or more ADSs are each associated with one or more other data blocks;
        employing the sampling model and the query to sample the one or more objects to provide one or more partial results;
        distributing the sampling between the one or more objects based on the sampling model and the one or more metrics by performing further actions, including:
            determining one or more first metrics of a first object, wherein the one or more first metrics are associated with each ADS that is included in the first object determining one or more second metrics of a second object, wherein
        the one or more second metrics are associated with each ADS that is included in the second object; and
        determining a number of first samples to measure from the first object based on a ratio of the one or more first metrics and the one or more second metrics, wherein the number of first samples measured from the first object is greater than a number of second samples measured from the second object when values of the one or more first metrics are greater than values of the one or more second metrics; and providing a result to the query based on the one or more partial results.

14. The network computer of claim 13, wherein the sampling model includes one or more rules for a statistically fair sampling of the one or more objects based on the one or more metrics associated with the one or more ADSs.

15. The network computer of claim 13, wherein the one or more metrics associated with the one or more alternate data streams (ADSs), further comprise: one or more of an amount of ADSs in the object, or, a number of data blocks included in each ADSs in the object.

16. The network computer of claim 13, wherein the one or more processors execute instructions that perform actions, further comprising, terminating a descent traversal of the file system based on the one or more metrics matching one or more conditions defined in the sampling model, wherein the one or more conditions include, one or more values of the one or more metrics are less than a threshold value, an expiry of a timeout, a number of visited objects exceed a threshold value, or a proportion of visited objects relative to a number of objects in the portion of the file system exceed a threshold value.

* * * * *